(12) United States Patent
Shizuka et al.

(10) Patent No.: US 7,305,342 B2
(45) Date of Patent: Dec. 4, 2007

(54) TEXT-TO-SPEECH SYNTHESIS SYSTEM AND ASSOCIATED METHOD OF ASSOCIATING CONTENT INFORMATION

(75) Inventors: Utaha Shizuka, Tokyo (JP); Satoshi Fujimura, Kanagawa (JP); Yasuhiko Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 10/140,958

(22) Filed: May 8, 2002

(65) Prior Publication Data

US 2003/0014252 A1 Jan. 16, 2003

(30) Foreign Application Priority Data

May 10, 2001 (JP) ............................. 2001-139914

(51) Int. Cl.
*G10L 13/00* (2006.01)

(52) U.S. Cl. ................ 704/260; 379/88.16; 379/88.17; 379/88.23

(58) Field of Classification Search ................ 704/258, 704/260, 270, 270.1, 275; 379/88.04, 88.14, 379/88.16, 88.11, 88.17, 88.22, 88.23
See application file for complete search history.

(56) References Cited

U.S. PATENT DOCUMENTS

| | | | | |
|---|---|---|---|---|
| 5,479,411 A | * | 12/1995 | Klein | 379/88.13 |
| 5,555,343 A | * | 9/1996 | Luther | 704/260 |
| 5,634,084 A | * | 5/1997 | Malsheen et al. | 704/260 |
| 5,732,216 A | * | 3/1998 | Logan et al. | 709/203 |
| 5,864,868 A | * | 1/1999 | Contois | 707/104.1 |
| 5,930,768 A | * | 7/1999 | Hooban | 705/27 |
| 6,018,710 A | * | 1/2000 | Wynblatt et al. | 704/260 |
| 6,081,780 A | * | 6/2000 | Lumelsky | 704/260 |
| 6,448,485 B1 | * | 9/2002 | Barile | 84/609 |
| 6,507,643 B1 | * | 1/2003 | Groner | 379/88.14 |
| 6,553,341 B1 | * | 4/2003 | Mullaly et al. | 704/9 |
| 6,563,912 B1 | * | 5/2003 | Dorfman et al. | 379/88.13 |
| 6,937,986 B2 | * | 8/2005 | Denenberg et al. | 704/275 |
| 6,941,273 B1 | * | 9/2005 | Loghmani et al. | 705/26 |
| 6,944,591 B1 | * | 9/2005 | Raghunandan | 704/235 |
| 7,224,961 B2 | * | 5/2007 | Ishii | 455/412.1 |

* cited by examiner

*Primary Examiner*—Martin Lerner
(74) *Attorney, Agent, or Firm*—Oblon, Spivak, McClelland, Maier & Neustadt, P.C.

(57) ABSTRACT

A setting window that is displayed when a mail tab is selected includes check boxes for selecting items to read when an electronic mail is read, and a check box and a drop-down list box for setting automatic checking of electronic mails. Contents corresponding to checked boxes among the check boxes are converted into speech data. Furthermore, the contents corresponding to the checked boxes among the check boxes, except for the body of the electronic mail, are used for generating a title to be added when the speech data is output to an external apparatus, etc. If none of the check boxes is checked, a predetermined character string is set as a title.

14 Claims, 51 Drawing Sheets

FIG. 18

```
<!DOCTYPE HTML PUBLIC" -//W3C//DTD HTML 4.0 Transitional//EN">
<HTML><HEAD>
<META http-equiv=Content-Type content="text/html; charset=iso-2022-jp">
<META content="MSHTML 5.50.4134.600" name=GENERATOR>
<STYLE></STYLE>
</HEAD>
<BODY bgColor=#ffffff>
<DIV><FONT size=2>.$B!{!{MM (B<FONT></DIV>
<DIV><FONT size=2>.$B$$$D$b$*@$OC$K$J$C$F$*$J$^$9!#. (B<FONT></DIV>
<DIV> </DIV>
<DIV><FONT size=2>
<BLOCKQUOTE dir=ltr
style="PADDING-RIGHT: 0px; PADDING-LEFT: 5px; MARGIN-LEFT: 5px; BORDER-LEFT:
#000000 2px solid; MARGIN-RIGHT: 0px">
  <DIV><FONT size=2>.$B8f<R7?HV. (B<FONT
  size=4><STRONG>BA-.$B#1#2#3#4. (B#</STRONG>.$B$r. <B/FONT></FONT>.
  size=2>. $B#1#0#0%;%C%H. (B</FONT></DIV>
  <DIV><FONT size=2>.$BH<Cm$7$^$9!#. (B</FONT></DIV></FONT></BLOCKQUOTE></DIV>
<DIV><FONT size=2></FONT> </DIV>
<DIV><FONT size=2>.$B$"$j$,$H$&$4$6$$$^$7$?!#. (B</FONT></DIV>
<DIV><FONT size=2>.$B>&IJ$NH/Aw$0!"#1=54VDxEY$+$+$j$^$9!#. (B</FONT></DIV>
<DIV><FONT size=2>.$B@A5a=q$0!". (B</FONT></DIV>
<DIV><FONT
size=2>.$BJLESAwlU5$;$F$$$?$@$-$^$9!#. (B</DIV></FONT></BODY></HTML>
```

Return-Path:<aaaaaa@jp.××.com>
Delivered-To: ○○-associates_co-bbbbbbbb@domail13.so-net.ne.jp
Received: (qmail 14590 invoked by alias) ; 13 Apr 2001 11:02:58 +0900
Delivered-To: alias-○○-associated_co-bbbbbbbb@○○-associates.co.jp
Received: (qmail 14586 invoked from network) ; 13 Apr 2001 11:02:57 +0900
Received: (from ns5.××.co.jp(@202.238.80.5)
  by domail13.so-net.ne.jp with SMTP; 13 Apr 2001 11:02:57 +0900
Received: from mail2.××.co.jp(gatekeeper8.××.CO.JP[202.238.80.22])
    by ns5.××.co.jp(R8)with ESMTP id f3D22v393379
    for <bbbbbbbb@○○-associates.co.jp>; Fri, 13 Apr 2001 11:02:57 +0900 (JST)
Received: from mail2. ××co.jp(localhost[127.0.0.1])
    by mail2.××.co.jp(R8)with ESMTP id f3D22vY07872
    for <bbbbbbbb@○○-associates.co.jp>; Fri, 13 Apr 2001 11:02:57 +0900 (JST)
                                                   491                        492
Received: from sjp01037.meis. ××.co.jp(sjp01037.meis. ××co.jp[43.1.11.15])
    by mail2.××.co.jp((R8)with ESMTP id f3D22vv07862
    for <bbbbbbbb@○○-associates.co.jp>; Fri, 13 Apr 2001 11:02:57 +0900 (JST)
Received: from cjp25142. ××.co.jp(CJP25142[43.22.113.129])by sjp01037.meis. ××.co.jp with SMTP(Micro**Exch**Internet Mail Service Version) 5.5.2653.13)
       id 2RRMTHFS; Fri, 13 Apr 2001 11:02:56 +0900
Message-Id:<200104130202.AA01520@cjp25142××. co.jp>
From:aaaaaa<aaaaaa@jp.××.com>  —493
Date:Fri, 13 Apr 2001 11:02:28 +0900
To:
=?ISO-2022-JP?B?GyRCNUgxSiFKMHBLXDIx0l1GQzV2O3ZMMz1qlUsbKEl=
?=
<bbbbbbbb@○○-assoiates.co.jp>
Subject:Re:00005340 &=?ISO-2022-JP?B?MDAwMDU40DAbJEIkTjdvGyhC?=
In-Reply-To:<000801c0c316$78c8db60$1000a8c0@aterm>
References:<000801c0c316$78c8db60$1000a8c0@aterm>
                                          494
MIME-Version: 1.0
X-Mailer: AA-Mail32 Version 1, 10
Content-Type: text/plain; charset=iso-2022-jp
         495

FIG. 44

```
<html>
<head>
<meta http-equiv="Content-Type"
content="text/html ; charset=x-sjis">
<meta name="GENERATOR" content="Micro**** Front **** Exp **** 2.0">
<title> English Toy Box </title>
</head>

<body bgcolor="#BDFFFF" link="#0000FF" vlink="#800080">
<p align="center"><img src="b_shibas.gif" width="60" height="70"><font size="7"> English Toy Box </font><br>
</p>
<hr>
<p align="center"> Welcome! You are <img src="http://mc***.n***y.ne.jp/cgi-bin/counter.cgi?u=G***56&p=2&c=6"> visitor! </p>

<p align="center"> Feel free to link to this page. <br>
Please contact by e-mail if you have time. </p>

<p align="center"><img src="ojigi.19.gif" width="50" height="73"> E-mail to... <a href="mailto:aaaa@bbbb.ne.jp">aaaa@bbbb.ne.jp</a> </p>
</body>
</html>
```

L: { first block (head section) }

M: { body section }

TEXT-TO-SPEECH SYNTHESIS SYSTEM AND ASSOCIATED METHOD OF ASSOCIATING CONTENT INFORMATION

BACKGROUND OF THE INVENTION

1. Field of the Invention

The present invention relates to information processing apparatuses, information processing methods, recording media, and programs. More specifically, the present invention relates to an information processing apparatus, an information processing method, a recording medium, and a program that can be suitably used for converting text data into speech data by speech synthesis and for recording the speech data.

2. Description of the Related Art

Conventionally, when music data is managed, in particular, when speech data is recorded in, for example, a portable device for reproduction of music, data is distinguished based on additional information (e.g., song title, artist name, album name, etc.) accompanying the music data. The additional information is also displayed and used when a user selects music data to be recorded, reproduced, copied, or deleted.

Also, techniques of converting text data into speech data to reproduce and output speech, for example, software for synthesizing and outputting speech corresponding to text input to a personal computer via keys, have been known. The techniques are applied, for example, to browsing of Web pages, reading of electronic mails, or reading of text data specified by a user.

However, a title or other information for distinguishing speech data generated by converting text data has had to be input manually by a user. Thus, for example, when a plurality of text data is converted into speech data, a title must be set for each speech file, imposing laborious operations on the user.

Furthermore, when titles are set that way, arbitrary titles are set by the user; thus, it becomes quite difficult to distinguish speech data generated based on text data from ordinary sound data (e.g., music data) not generated from text data, possibly rendering management of music data very complex.

SUMMARY OF THE INVENTION

The present invention has been made in view of the situation described above, and an object thereof is to provide an information processing apparatus, an information processing method, a recording medium, and a program in which, in a case where speech data is obtained by converting text data and the speech data is recorded, the speech data generated can be managed by a method of managing ordinary music data, and additional information (e.g., title) that allows a user to intuitively know the content of the speech data can be automatically generated and added when the speech data is recorded.

To this end, the present invention, in one aspect thereof, provides an information processing apparatus including a text input unit for receiving input of text data; a speech generation unit for executing speech synthesis to generate speech data corresponding to the text data; a setting unit for setting predetermined information associated with the text data as additional information of the speech data generated by the speech generation unit; and a file creation unit for creating a single speech data file from the speech data generated by the speech generation unit and the additional information set by the setting unit.

The additional information may include information corresponding to an item representing a song title in a case where digital music data is managed.

The additional information may include information corresponding to an item representing an artist name in a case where digital music data is managed.

The text data may include data of an electronic mail, so that the setting unit sets the additional information of the speech data based on information included in header information of the electronic mail.

The information processing apparatus may further include a display control unit for controlling a display screen that aids a user to select a predetermined item in the header information of the electronic mail so that the item will be set as the additional information; and an input unit for receiving input of the item selected by the user with reference to the display screen controlled by the display control unit; so that the setting unit sets the item selected by the user, input via the input unit, as the additional information of the speech data.

The input unit may receive input of a plurality of items selected by the user, and the setting unit may generate single title information from the plurality of items selected by the user, input via the input unit, setting the title information as the additional information of the speech data.

The item may include information regarding a sender of the electronic mail.

The item may include a subject of the electronic mail.

The item may include information regarding date and time of transmission of the electronic mail.

The information processing apparatus may further include an information input unit for receiving input of information written in a markup language; a parsing unit for parsing tag information of the information written in the markup language, input via the information input unit; and an extraction unit for extracting text data from the information written in the markup language based on the result of the parsing by the parsing unit; so that the text input unit receives input of the text data extracted by the extraction unit, and so that the setting unit sets the additional information of the speech data based on the result of the parsing by the parsing unit.

The markup language may be Hypertext Markup Language (HTML).

The information written in the markup language, input via the information input unit, may include an electronic mail written in a markup language format.

The information written in the markup language, input via the information input unit, may include data of a Web page, and the setting unit may set a title of the Web page as the additional information of the speech data based on the result of the parsing by the parsing unit.

The additional information may include first information and second information, the setting unit setting title information as the first information and setting a predetermined character string for distinction from ordinary music data as the second information.

The first information may correspond to an item representing a song title in a case where digital music data is managed, and the second information may correspond to an item representing an artist name in a case where digital music data is managed.

The setting unit may use a name of an application program as the predetermined character string.

The information processing apparatus may further include a recording control unit for controlling recording of various information; an obtaining unit for obtaining additional information of the various information, recording of which is controlled by the recording control unit; an extraction unit for extracting information that has the predetermined character string as additional information from the additional information of the various information obtained by the obtaining unit; and a record deletion unit for deleting information, recording of which is controlled by the recording control unit, based on the result of the extraction by the extraction unit.

The present invention, in another aspect thereof, provides an information processing method including a text input step of receiving input of text data; a speech generation step of executing speech synthesis to generate speech data corresponding to the text data; a setting step of setting predetermined information associated with the text data as additional information of the speech data generated in the speech generation step; and a file creation step of creating a single speech data file from the speech data generated in the speech generation step and the additional information set in the setting step.

The present invention, in still another aspect thereof, provides a recording medium having recorded thereon a computer-readable program including a text input step of receiving input of text data; a speech generation step of executing speech synthesis to generate speech data corresponding to the text data; a setting step of setting predetermined information associated with the text data as additional information of the speech data generated in the speech generation step; and a file creation step of creating a single speech data file from the speech data generated in the speech generation step and the additional information set in the setting step.

The present invention, in yet another aspect thereof, provides a program for having a computer execute a process including a text input step of receiving input of text data; a speech generation step of executing speech synthesis to generate speech data corresponding to the text data; a setting step of setting predetermined information associated with the text data as additional information of the speech data generated in the speech generation step; and a file creation step of creating a single speech data file from the speech data generated in the speech generation step and the additional information set in the setting step.

According to the information processing apparatus, the information processing method, the recording medium, and the program of the present invention, text data is input, speech synthesis is executed to generate speech data corresponding to the text data, predetermined information associated with the text data is set as additional information of the speech data generated, and a single speech data file is created from the speech data and the additional information. Accordingly, the speech data generated can be managed by a method of managing ordinary music data. Furthermore, additional information (e.g., title) that allows a user to intuitively know the content of the speech data can be automatically generated and added when the speech data is recorded.

BRIEF DESCRIPTION OF THE DRAWINGS

FIG. 18 is a diagram for explaining tags of the electronic mail in HTML format;

FIG. 33 is an illustration of a header of an electronic mail;

FIG. 44 is an illustration of the source of a Web page;

DESCRIPTION OF THE PREFERRED EMBODIMENTS

Preferred embodiments of the present invention will now be described with reference to the accompanying drawings.

Figure 1:
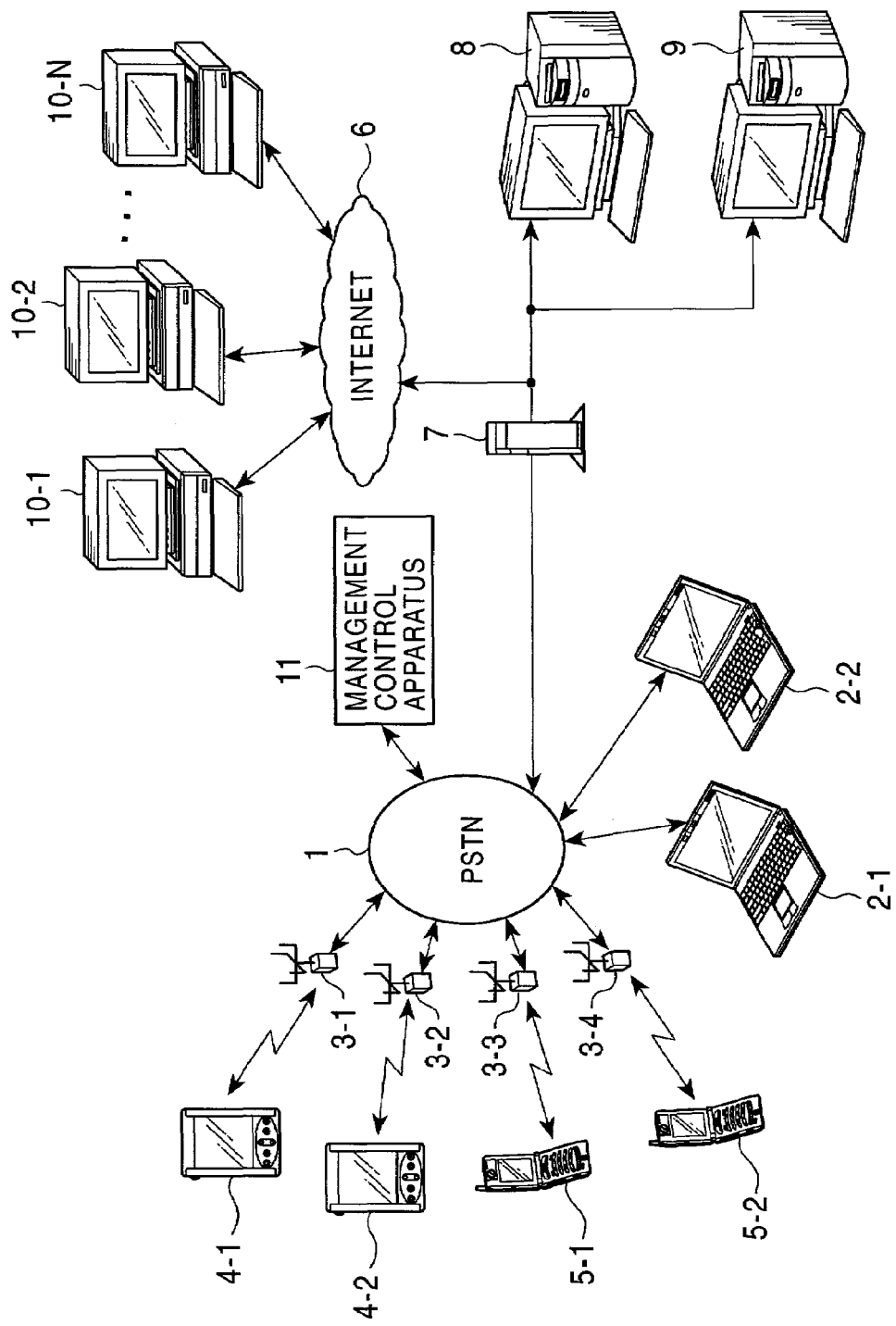
FIG. 1 is a diagram illustrating exchange of data of electronic mails and Web pages.

First, a network system for sending and receiving electronic mails and browsing web pages will be described with reference to FIG. 1.

To the public switched telephone network (PSTN) 1, personal computers 2-1 and 2-2 are connected. Furthermore, to the PSTN 1, PDAs 4-1 and 4-2, and camera-equipped digital cellular phones 5-1 and 5-2 are connected via base stations 3-1 to 3-4, which are stationary radio stations located respectively in cells into which communication service area is divided as desired.

The base stations 3-1 to 3-4 wirelessly link the PDAs 4-1 and 4-2 and the camera-equipped digital cellular phones 5-1 and 5-2, for example, by W-CDMA (Wideband Code Division Multiple Access), allowing high-speed transmission of a large amount of data at a maximum data transfer rate of 2 Mbps using a frequency band of 2 GHz.

The PDAs 4-1 and 4-2 and the camera-equipped digital cellular phones 5-1 and 5-2 are allowed to exchange a large amount of data with the base stations 3-1 to 3-4 at a high speed by W-CDMA, and thus are allowed to execute various data communications, such as sending and receiving electronic mails, browsing simple Web pages, and sending and receiving images, without limitation to speech communication.

Furthermore, the base stations 3-1 to 3-4 are connected to the PSTN 1 via wire lines. Also, the Internet 6, and subscriber line terminal apparatuses, computer networks, and corporate networks, not shown, are connected to the PSTN 1.

An access server 7 of an Internet service provider is connected to the PSTN 1, and also to a content server 8 and an electronic mail server 9 owned by the Internet service provider.

The content server 8 provides content such as a simple Web page in the form of an HTML (Hypertext Markup Language) file or a Compact HTML file in response to requests from the subscriber line terminal apparatuses, the PDAs 4-1 and 4-2, the camera-equipped digital cellular phones 5-1 and 5-2, and the personal computers 2-1 and 2-2.

The electronic mail server 9 manages transmission and reception of electronic mails. The electronic mail server 9 includes an SMTP server for transmission and a POP server for reception. An electronic mail transmitted from the SMTP server is delivered not directly to a destination POP server, but is passed through a large number of servers on the Internet 6 before reaching the destination POP server. The POP server on the receiving end temporarily stores the delivered electronic mail in a mailbox. Each time when a user is to receive electronic mails, the user accesses the electronic mail server 9 by a device such as the PDAs 4-1 and 4-2, the camera-equipped digital cellular phones 5-1 and 5-2, and the personal computers 2-1 and 2-2.

To the Internet 6, a large number of WWW (World Wide Web) servers 10-1 to 10-N is connected. The WWW servers 101 to 10-N are accessed from the subscriber line terminal apparatuses, the PDAs 4-1 and 4-2, the camera-equipped digital cellular phones 5-1 and 5-2, and the personal computers 2-1 and 2-2 based on TCP/IP (Transmission Control Protocol/Internet Protocol).

The PDAs 4-1 and 4-2 and the camera-equipped digital cellular phones 5-1 and 5-2 communicate with the base stations 3-1 to 3-4 based on a simple transport protocol at a rate of 2 Mbps, and the base stations 3-1 to 3-4 communicate with the WWW servers 10-1 to 10-N on the Internet 6 based on TCP/IP.

A management control apparatus 11 is linked to the subscriber line terminal apparatuses, the PDAs 4-1 and 4-2, the camera-equipped digital cellular phones 5-1 and 5-2, and the personal computers 2-1 and 2-2 via the PSTN 1, and it executes authentication processes, billing processes, etc. for the subscriber line terminal apparatuses, the PDAs 4-1 and 4-2, the camera-equipped digital cellular phones 5-1 and 5-2, and the personal computers 2-1 and 2-2.

Hereinafter, the personal computers 2-1 and 2-2 will be simply referred to as a personal computer 2 where distinction is not necessary, the base stations 3-1 to 3-4 will be simply referred to as a base station 3 where distinction is not necessary, the PDAs 4-1 and 4-2 will be simply referred to as a PDA 4 where distinction is not necessary, and the camera-equipped digital cellular phones 5-1 and 5-2 will be simply referred to as a camera-equipped digital cellular phone 5 where distinction is not necessary.

FIGS. 2 to 5 show external view of the personal computer 2.

Figure 2:
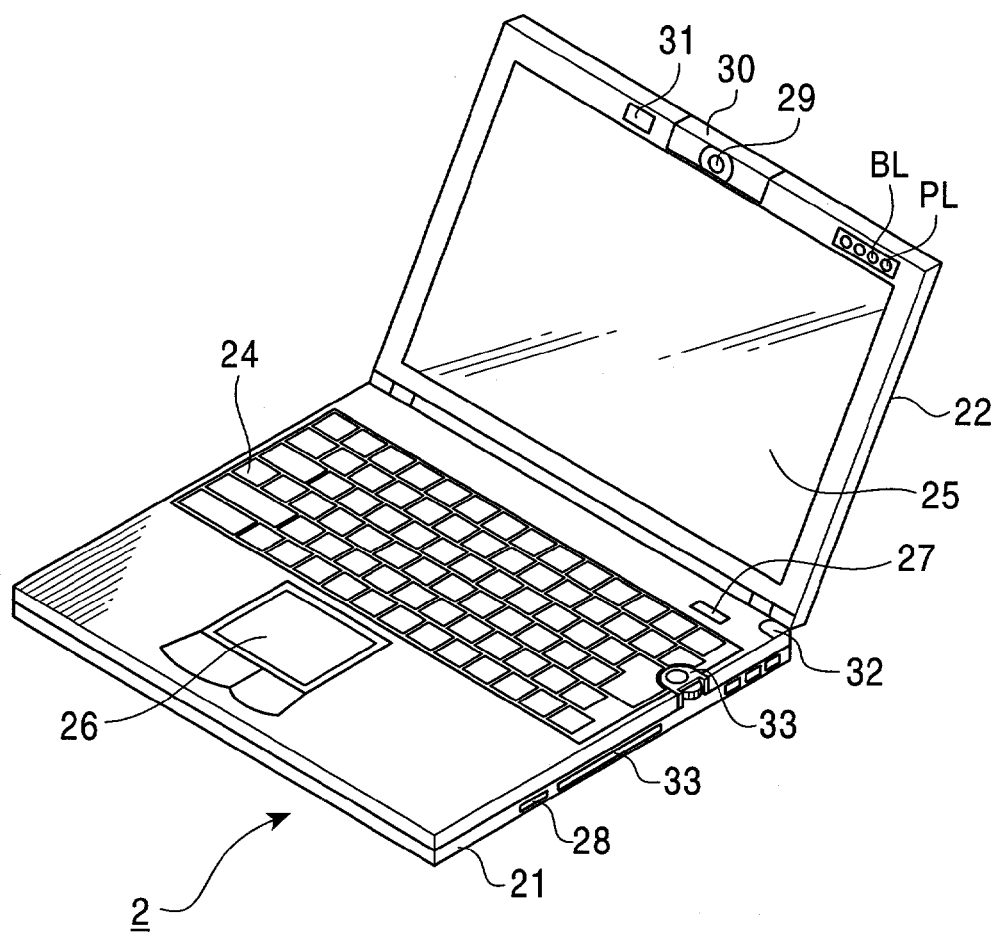
FIG. 2 is an external perspective view of a personal computer in FIG. 1.
Figure 3:
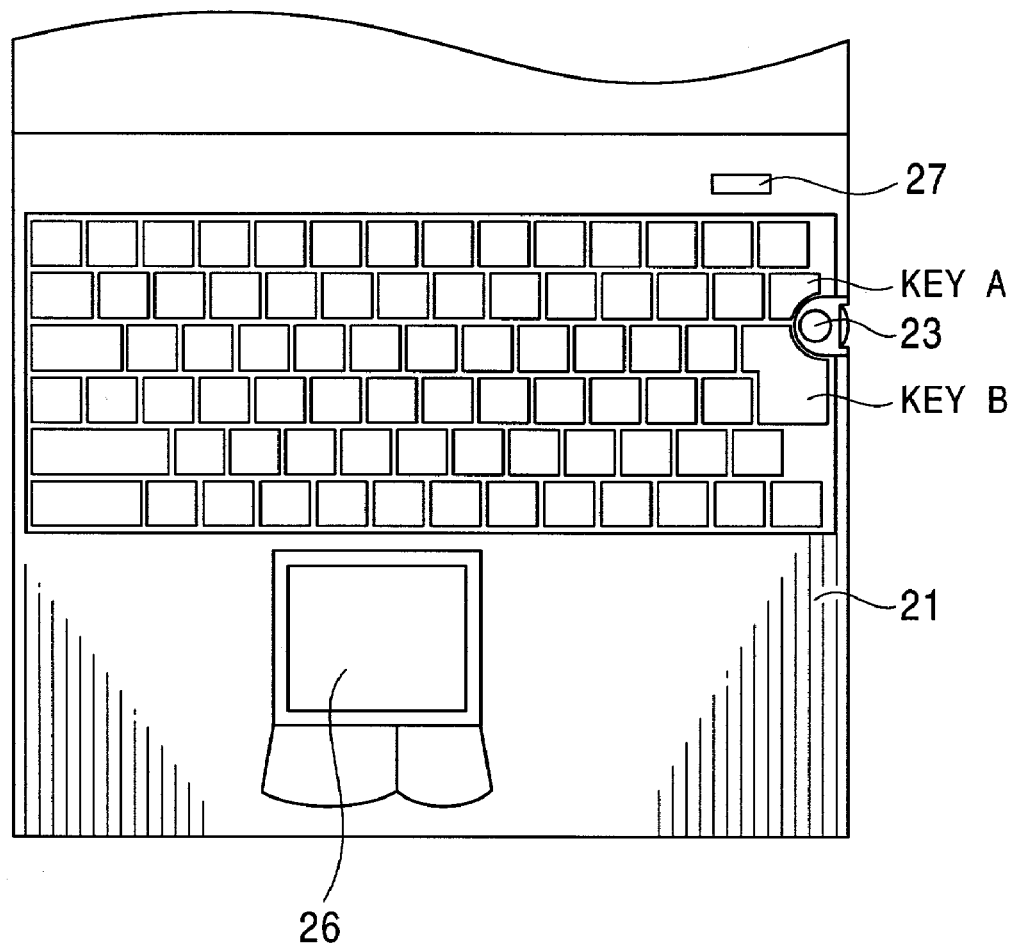
FIG. 3 is a plan view of a main unit of the personal computer in FIG. 1.
Figure 4:
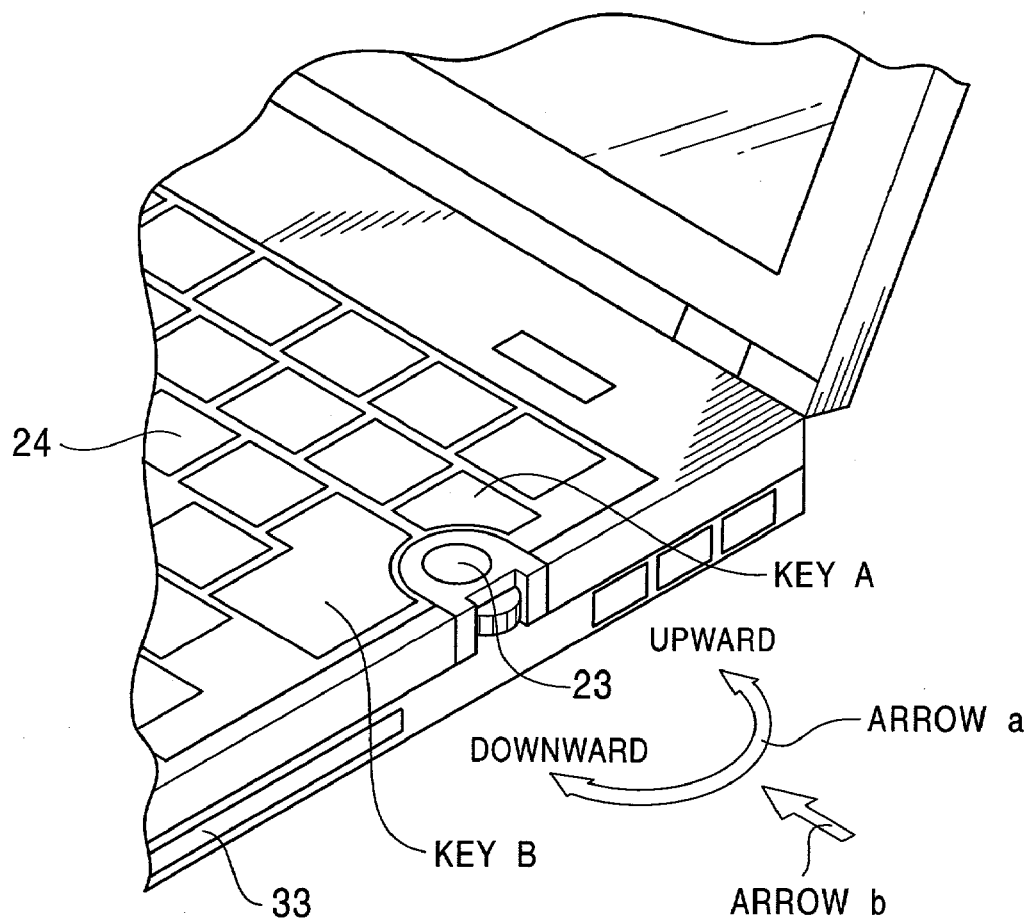
FIG. 4 is an enlarged view of the vicinity of a jog dial of the personal computer in FIG. 1.
Figure 5:
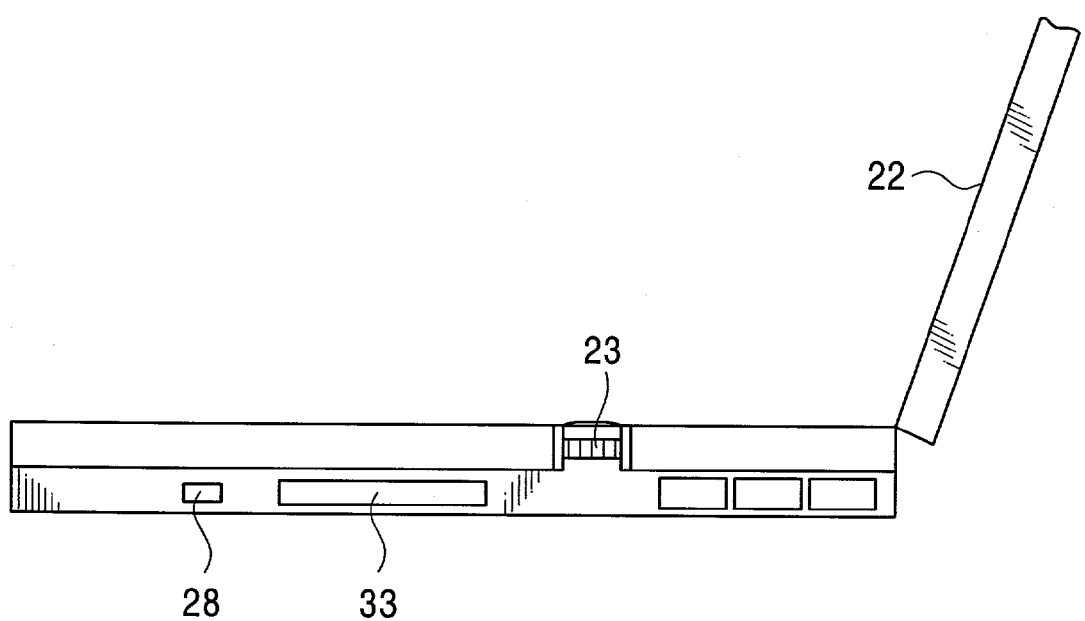
FIG. 5 is a right side view showing the configuration on the right side of the personal computer in FIG. 1.

The personal computer 2 is constructed mainly of a main unit 21 and a display unit 22 that can be opened and closed with respect to the main unit 21. FIG. 2 is an external perspective view in which the display unit 22 is shown as opened with respect to the main unit 21. FIG. 3 is a plan view of the pain unit 21. FIG. 4 is an enlarged view of a jog dial 23 provided on the main unit 21, which will be described later. FIG. 5 is a side view of the jog dial 23 provided on the main unit 21.

On the top surface of the main unit 21, a keyboard 24 that is used to input various characters and symbols, a touch pad 26, which is a pointing device used, for example, when moving a pointer (mouse cursor) displayed on an LCD 25, and a power switch 27 are provided. On a side surface of the main unit 21, the jog dial 23, an IEEE (Institute of Electrical and Electronic Engineers) 1394 port 28, etc. are provided. As an alternative to the touch pad 26, a stick-type pointing device may be provided.

At the front of the display unit 22, the LCD 25 (Liquid Crystal Display) for displaying images is provided. On a top right portion of the display unit 22, a power lamp PL, a battery lamp BL, a message lamp (not shown) and other LED lamps as needed are provided. Furthermore, on a top center portion of the display unit 22, an imaging unit 30 including a CCD video camera 29 having a CCD (solid-state imaging device), and a microphone 31 are provided. On a top right portion of the main unit 21 as viewed in FIG. 2, a shutter button 32 for operating the CCD video camera 29 is provided.

The imaging unit 30 is rotatably fixed to the display unit 22. The imaging unit 30 is rotated by an operation by a user of the personal computer 2, for example, from a position that allows imaging of the user to a position that allows imaging in the same direction as the user is viewing.

The jog dial 23 is attached, for example, between a key A and a key B disposed on the right side of the keyboard 24 on the main unit 21 as viewed in FIG. 3 so that the top surface thereof is substantially at the same height as the keys A and B. When the jog dial 23 is rotated as indicated by an arrow a in FIG. 4, a predetermined process (e.g., scrolling the screen) is executed, and when the jog dial 23 is moved as indicated by an arrow b, a corresponding process (e.g., determination of selection of an icon) is executed.

The IEEE 1394 port 28 is constructed in compliance with IEEE 1394 Standard so that a cable compliant with IEEE 1394 Standard can be connected.

Next, an example internal construction of the personal computer 2 will be described with reference to FIG. 6.

A central processing unit (CPU) 51 is implemented, for example, by a Pentium (trademark) processor manufactured by Intel Corporation, and is connected to a host bus 52. Furthermore, a bridge 53 (so-called North bridge) is connected to the host bus 52. The bridge 53 has an AGP (Accelerated Graphics Port) 50, and is connected to a PCI (Peripheral Component Interconnect/Interface) bus 56.

The bridge 53 is implemented, for example, by 400BX, which is an AGP host bridge controller manufactured by Intel Corporation, and it controls the CPU51, a RAM (Random Access Memory) 54 (so-called main memory), etc. Furthermore, the bridge 53 controls a video controller 57 via the AGP 50. The bridge 53 and a bridge (so-called South bridge, or PCI-ISA bridge) 58 constitute so-called a chipset.

The bridge 53 is also connected to a cache memory 55. The cache memory 55 is implemented by a memory device such as an SRAM (Static RAM) that allows faster writing and reading operations compared with the RAM 54, and it caches (temporarily stores) program and data used by the CPU 51.

The CPU 51 includes a primary cache that is under the control of the CPU 51 itself, which operates even faster than the cache memory 55.

The RAM 54 is implemented, for example, by a DRAM (Dynamic RAM), and it stores programs to be executed by the CPU 51 and data required for operations of the CPU 51. More specifically, the RAM 54 stores, for example, an electronic mail program 54A, an autopilot program 54B, a jog dial status monitoring program 54C, a jog dial driver 54D, an operating system (OS) 54E, a communication program 54F, a Web browser 54G, and other application programs 54H (including a mail watcher application, a Web reader application, a mail reader application, and a text reading application to be described later) loaded from an HDD 67.

The electronic mail program 54A is used to exchange messages (electronic mails) via a model 75, the PSTN 1, an Internet service provider, the electronic mail server 9, and the Internet 6.

The autopilot program 54B sequentially activates and executes a plurality of preset processes or programs in a preset order.

The jog dial status monitoring program 54C receives a notice from each of the application programs mentioned above as to whether the application program is compatible with the jog dial 23. If one of the application programs is compatible with the jog dial 23, the jog dial status monitoring program 54C displays operations that can be executed via the jog dial 23 on the LCD 25.

Furthermore, the jog dial status monitoring program 54C detects an event of the jog dial 23 (operations such as the jog dial 23 being rotated in the direction indicated by the arrow a in FIG. 4 or the jog dial 23 being pressed in the direction indicated by the arrow b in FIG. 4), and executes a process corresponding to the detected event. The jog dial driver 54D executes various functions in accordance with the operations of the jog dial 23.

The OS 54E, for example, Windows (trademark) 95 or Windows (trademark) 98 from Microsoft Corporation, or MAC OS from Apple Computer, Inc., controls basic operations of a computer.

The communication program 54F executes a process for peer-to-peer communication. Furthermore, in order to establish a connection for the communication, the communication program 54F controls the electronic mail program 54A to send an electronic mail with an IP address of the personal computer 2 attached thereto and to acquire an IP address from a received electronic mail.

The communication program 54F also controls the Web browser 54G to execute communications based on the functionality of the Web browser 54G.

The Web browser 54G executes a process for browsing (displaying on the display unit 22) data of a Web page under the control of the communication program 54F.

The application programs 54H includes various application programs, for example, a mail watcher application, a Web reader application, a mail reader application, and a text reading application to be described later.

The video controller 57 is connected to the bridge 53 via the AGP 50. The video controller 57 receives data (image data, text data, etc.) supplied from the CPU 51 via the AGP 50 and the bridge 53, and generates image data corresponding to the received data, storing the generated image data or the received data itself in an internal video memory. The video controller 57 displays an image corresponding to the image data stored in the video memory on the LCD 25 of the display unit 22.

Furthermore, the video controller 57 supplies video data supplied from the CCD video camera 29 to the RAM 54 via the PCI bus 56.

Furthermore, a sound controller 64 is connected to the PCI bus 56. The sound controller 64 acquires sound from a microphone 31 and generates data corresponding to the sound, outputting the data to the RAM 54. Furthermore, the sound controller 54 drives a speaker 65 to output sound by the speaker 65.

Furthermore, the modem 75 is connected to the PCI bus 56. The modem 75 is connected to the PSTN 1, and it executes a process for communications via the PSTN 1 or the Internet 6.

Furthermore, a PC card slot interface 111 is connected to the PCI bus 56. The PC card slot interface 111 supplies data supplied from an interface card 112 mounted in a slot 33 to the CPU 51 or the RAM 54, and outputs data supplied from the CPU 51 to the interface card 112. A drive 113 is connected to the PCI bus 56 via the PC card slot interface 111 and the interface card 112.

The drive 113 reads data recorded on a magnetic disk 121, an optical disk 122, a magneto-optical disk 123, or a semiconductor memory 124 (such as a memory stick (trademark) 131 to be described later with reference to FIG. 7) mounted thereon, supplying the data to the RAM 54 via the interface card 112, the PC card slot interface 111, and the PCI bus 56. Furthermore, the drive 113 can store data generated by a process by the CPU 51 (e.g., speech data generated by a process to be described later) on the magnetic disk 121, the optical disk 122, the magneto-optical disk 123, or the semiconductor memory 124 (the memory stick 131) mounted thereon.

It is to be understood that a memory stick slot may be provided separately so that the memory stick 131 can be connected without the interface card 112 and the drive 113 in the middle.

Thus, the personal computer 2, constructed such that the memory stick 131 can be mounted, allows sharing of data with other electronic apparatuses such as the PDA 4, the camera-equipped digital cellular phone 5, a portable music reproduction apparatus 271 to be described later with reference to FIG. 14, etc.

Furthermore, the bridge 58 (so-called South bridge) is connected to the PCI bus 56. The bridge 58 is implemented, for example, by PIIX4E manufactured by Intel Corporation, and it includes an IDE (Integrated Drive Electronics) controller/configuration register 59, an IDE interface 61, and a USB interface 68. The bridge 58 controls various I/O (input/output) operations to and from devices connected via an IDE bus 62, an ISA/EIO (Industry Standard Architecture/Extended Input Output) bus 63, an I/O interface 69, etc.

The IDE controller/configuration register 59 includes two IDE controllers, i.e., so-called primary IDE controller and secondary IDE controller, a configuration register, etc., which are not shown.

The primary IDE controller is connected to the HDD 67 via the IDE bus 62. The secondary controller is electrically connected to an IDE device, for example, a CD-ROM drive or an HDD, not shown, when the IDE device is connected to another IDE bus.

The HDD 67 stores an electronic mail program 67A, an autopilot program 67B, a jog dial status monitoring program 67C, a jog dial driver 67D, an OS 67E, a communication program 67F, a Web browser 67G, other application programs 67H, etc.

The electronic mail program 67A to the application programs 67H, etc. stored in the HDD 67 are loaded into the RAM 54 as needed.

Furthermore, the I/O interface 69 is connected to the ISA/EIO bus 63. The I/O interface 69 is implemented by an embedded controller, in which a ROM 70, a RAM 71, and a CPU 72 are connected with each other.

The ROM 70 stores in advance an IEEE 1394 interface program 70A, an LED control program 70B, a touch pad input monitoring program 70C, a key input monitoring program 70D, a wakeup program 70E, a jog dial status monitoring program 70F, etc.

The IEEE 1394 interface program 70A sends and receives data (in packets) compliant with IEEE 1394 Standard via the IEEE 1394 port 28. The LED control program 70B controls the power lamp PL, the battery lamp BL, the message lamp ML provided and other LED lamps provided as needed. The touch pad input monitoring program 70C monitors input from the touch pad 26 corresponding to user operations.

The key input monitoring program 70D monitors input from the keyboard 24 or other keys. The wakeup program 70E checks whether a preset time has come based on data representing the current time, supplied from a timer circuit (not shown) in the bridge 58. When the preset time has come, the wakeup program 70E supplies power to each chip constituting the personal computer 2 to activate a predetermined process or program. The jog dial status monitoring program 70F constantly monitors whether a rotary encoder of the jog dial 23 has been rotated and whether the jog dial 23 has been pressed.

Furthermore, a BIOS (Basic Input/Output System) 70G is written to the ROM 70. The BIOS 70G controls exchange (inputs and outputs) of data between OS or application programs with peripheral devices such as the touch pad 26, the keyboard 24, the HDD 67.

The RAM 71 includes registers 71A to 71F, such as an LED control register, a touch pad input status register, a key input status register, a time setting register, a jog dial status monitoring I/O register, and an IEEE 1394 I/F register. For example, when the jog dial 23 is pressed to activate the electronic mail program 54A, a predetermined value is stored in the LED control register, so that the message lamp ML is controlled according to the stored value. When the jog dial 23 is pressed, a predetermined operation key flag is stored in the key input status register. In the time setting register, a predetermined time corresponding to user operation on the keyboard 24, etc. is set.

Furthermore, the jog dial 23, the touch pad 26, the keyboard 24, the IEEE 1394 port 28, the shutter button 32, etc. are connected to the I/O interface 69 via a connector not shown, so that the I/O interface 69 outputs signals corresponding to operations on the jog dial 23, the touch pad 26, the keyboard 24, and the shutter button 32, respectively, to the ISA/EIO bus 63. Furthermore, the I/O interface 69 controls exchange of data with a device connected via the IEEE 1394 port 28. Furthermore, the power lamp PL, the battery lamp BL, the message lamp ML and other LED lamps, and a power control circuit 73 are connected to the I/O interface 69.

The power supply control circuit 73 is connected to an internal battery 74 or an AC power source, and it supplies power to each block as needed and controls charging of the internal battery 74 or a secondary battery of a peripheral device. Furthermore, the I/O interface 69 monitors the power switch 27, which is operated when turning the power on or off.

The I/O interface 69 executes the IEEE 1394 interface program 70A to the jog dial status monitoring program 70F using an internal power source even when the power is off. That is, the IEEE 1394 interface program 70A to the jog dial status monitoring program 70F are constantly in operation.

Thus, even when the power switch 27 is turned off and the CPU 51 is not running the OS 54E, the I/O interface 69 executes the jog dial status monitoring program 70F. Thus, for example, when the jog dial 23 is pressed when in power saving mode or when the power is off, the personal computer 2 activates predetermined software or process of a script file.

As described above, in the personal computer 2, since the jog dial 23 has programmable power key (PPK) function, a dedicated key need not be provided.

Figure 7:
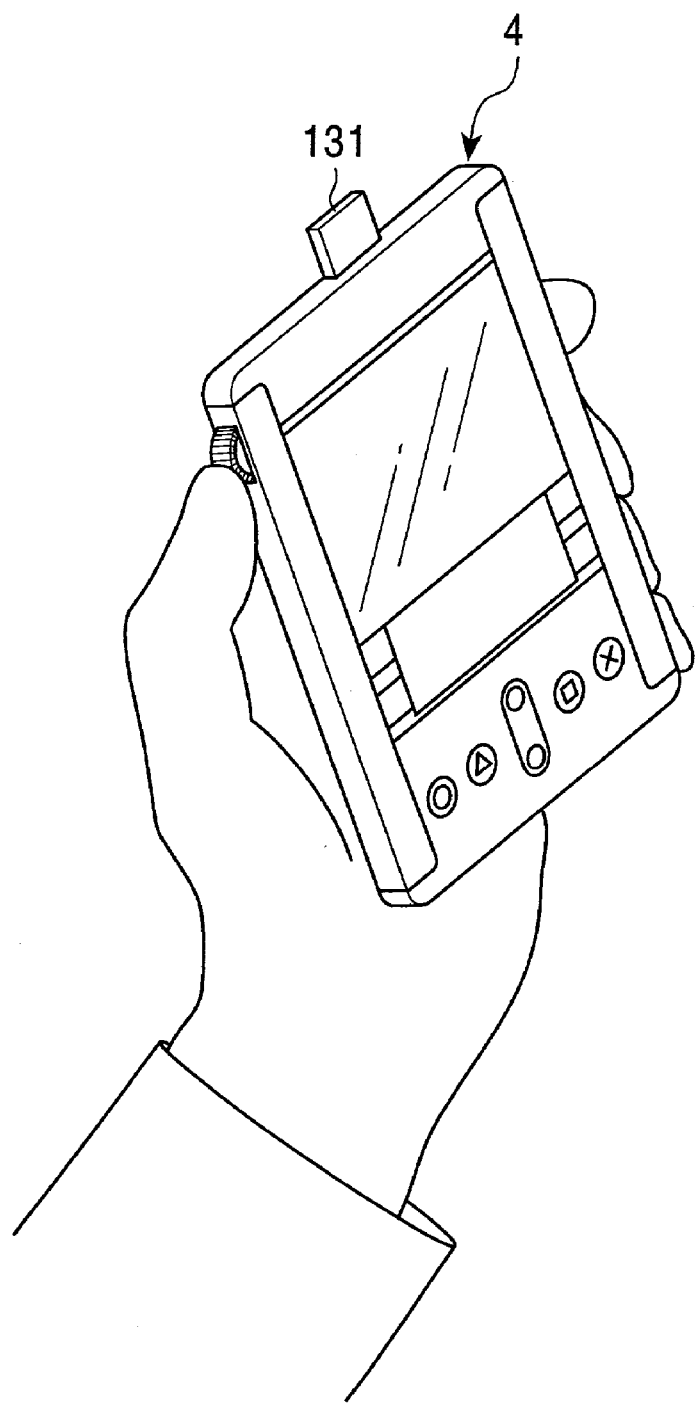
FIG. 7 is an external view of a PDA.
Figure 8:
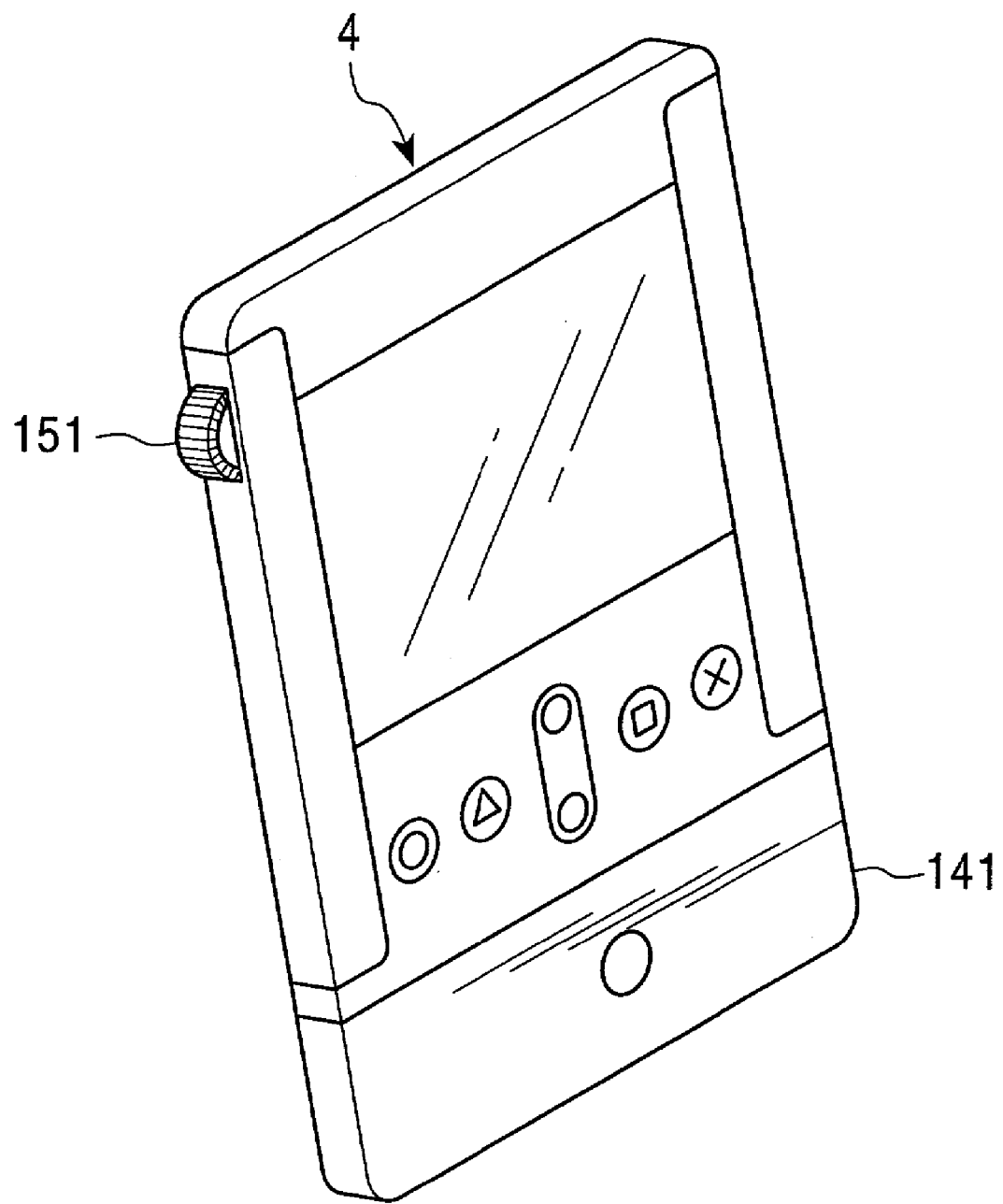
FIG. 8 is an external view of the PDA as mounted on a cradle.
Figure 9:
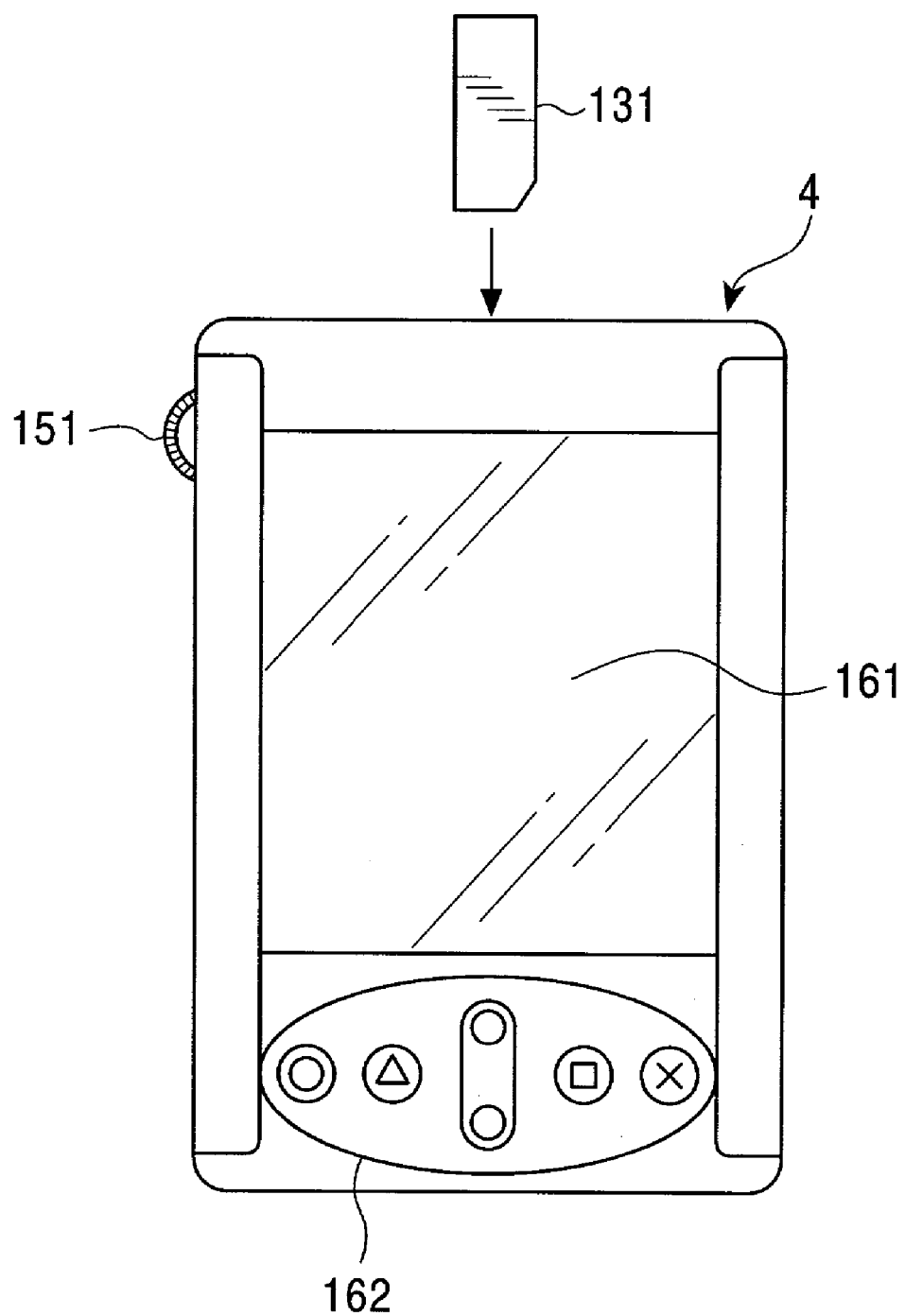
FIG. 9 is an external view of the PDA.

FIGS. 7 to 9 are illustrations showing external views of the PDA 4. FIG. 7 is a perspective view of the PDA 4 as held by a hand. FIG. 8 is a perspective view of the PDA 4 as mounted on a cradle 141. FIG. 9 is a front view of the PDA 4.

The casing of the PDA 4 is formed in such a size that the PDA 4 can be held and operated by one hand. On a top portion of the PDA 4, a slot for inserting a memory stick 131 incorporating a semiconductor memory is provided.

The memory stick 131 is a type of flash memory card developed by Sony Corporation, which is the assignee of this application. The memory stick 131 incorporates an EEPROM (Electrically Erasable and Programmable Read Only Memory), which is a non-volatile memory that allows rewriting and erasing electrically, in a small and thin plastic case of a size 21.5×50×2.8 (mm), and it allows writing and reading of various data such as image, speech, and music via a ten-pin terminal.

The memory stick 131 employs a unique serial protocol that ensures compatibility with devices to be used even when specifications of internal flash memory change, for example, when capacity is increased. The memory stick 131 achieves a maximum writing speed as fast as 1.5 MB/S and a maximum reading speed as fast as 2.45 MB/S, and also achieves high reliability by providing a switch for preventing erasure by mistake.

As shown in FIG. 8, the PDA 4 is mounted on the cradle 141 with the bottom surface of the PDA 4 and the top surface of the cradle 141 in contact with each other. On the bottom surface of the PDA 4, for example, a USB (Universal Serial Bus) port (not shown) for connection with the cradle 141 is provided. The cradle 141 functions as a docking station when the PDA 4 and the personal computer 2 are connected by wire to exchange information, updating data on each of them to the latest data (i.e., data synchronization by so-called hot sync).

On the PDA 4, a display unit 161, keys 162, a jog dial 151, etc. are provided.

The display unit 161 is implemented by a thin display apparatus such as a liquid crystal display apparatus, and it displays images of icons, thumbnails, text, etc. On the top side of the display unit 161, a touch pad is provided, which is pressed by a finger or a pen when inputting data or an operation instruction to the PDA 4.

The keys 162 include input keys, which are used to select an icon or a thumbnail displayed on the display unit 161.

The jog dial 151 is rotated or pressed towards the main unit when selecting an icon or a thumbnail displayed on the display unit 161.

Next, the internal structure of the PDA 4 will be described with reference to FIG. 10.

A CPU (Central Processing Unit) 171 executes various programs, such as an operating system and application programs, stored in a Flash ROM (Read Only Memory) 173 or an EDO DRAM (Extended Data Out Dynamic Random Access Memory) 174, in synchronization with a clock signal supplied from an oscillator 172.

The Flash ROM 173 is implemented by a flash memory, which is a type of EEPROM (Electrically Erasable Programmable Read Only Memory), and it typically stores programs to be executed by the CPU 171 and substantially constant data in operation parameters. The EDO DRAM 174 stores programs to be executed by the CPU 171 and parameters that changes during execution.

A memory stick interface 175 reads data from the memory stick 131 mounted on the PDA 4, and also writes data supplied from the CPU 171 to the memory stick 131.

The PDA 4, on which the memory stick 131 can be mounted, allows sharing of data with other electronic apparatuses such as the personal computer 2, the camera-equipped digital cellular phone 5, a portable music reproduction apparatus 271 to be described later with reference to FIG. 14, etc., via the memory stick 131.

A USB (Universal Serial Bus) interface 176 inputs data or program from a drive 183 in connection, which is a USB device, and supplies data supplied from the CPU 171 to the drive 183, in synchronization with a clock signal supplied from an oscillator 177. The USB interface 176 also inputs data or program from the cradle 141 in connection, which is a USB device, and supplies data supplied from the CPU 171 to the cradle 141, in synchronization with the clock signal supplied from the oscillator 177.

Furthermore, the USB interface 176 is also connected to the drive 183. The drive 183 reads data or program recorded on a magnetic disk 191, an optical disk 192, a magneto-optical disk 193, or a semiconductor memory 194 mounted thereon, and supplies the data or program to the CPU 171 or the EDO DRAM 174 in connection via the USB interface 176. Furthermore, the drive 183 records data or program supplied from the CPU 171 on the magnetic disk 191, the optical disk 182, the magneto-optical disk 193, or the semiconductor memory 194 mounted thereon.

The Flash ROM 173, the EDO DRAM 174, the memory stick interface 175, and the USB interface 176 are connected to the CPU 171 via an address bus and a data bus.

The display unit 161 receives data from the CPU 171 via an LCD bus, and displays an image, text, etc. corresponding to the data. A touch pad control unit 178 receives data corresponding to an operation of the touch pad provided on the top side of the display unit 161 (e.g., indicating the coordinate point of touching), and supplies a signal corresponding to the data to the CPU 171 via a serial bus.

An EL (Electroluminescence) driver 179 drives an electroluminescence device provided at the back of the liquid crystal display unit of the display unit 161, controlling brightness of display on the display unit 161.

An infrared communication unit 180 transmits data received from the CPU 171 to other apparatuses, not shown, via a UART (Universal Asynchronous Receiver Transmitter) by infrared rays, and receives data transmitted from other apparatuses by infrared rays and supplies the data to the CPU 171. That is, the PDA 4 is allowed to communicate with other apparatuses via the UART.

A speech reproduction unit 182 includes a speaker, a speech data decoding circuit, etc., and it decodes speech data stored in advance or received via the Internet 6 to reproduce and output speech. For example, the speech reproduction unit 182 reproduces speech data supplied from the CPU 171 via a buffer 181 to output speech corresponding to the data.

The keys 162 include input keys, which are operated by a user when inputting various instructions to the CPU 171.

The jog dial 151, when rotated or pressed towards the main unit, supplies data corresponding to the operation to the CPU 171.

A power supply circuit 186 converts a power supply voltage supplied from a mounted battery 184 or an AC (Alternating Current) adapter 185 in connection, supplying a power to each of the CPU 171 to the speech reproduction unit 182.

Figure 11:
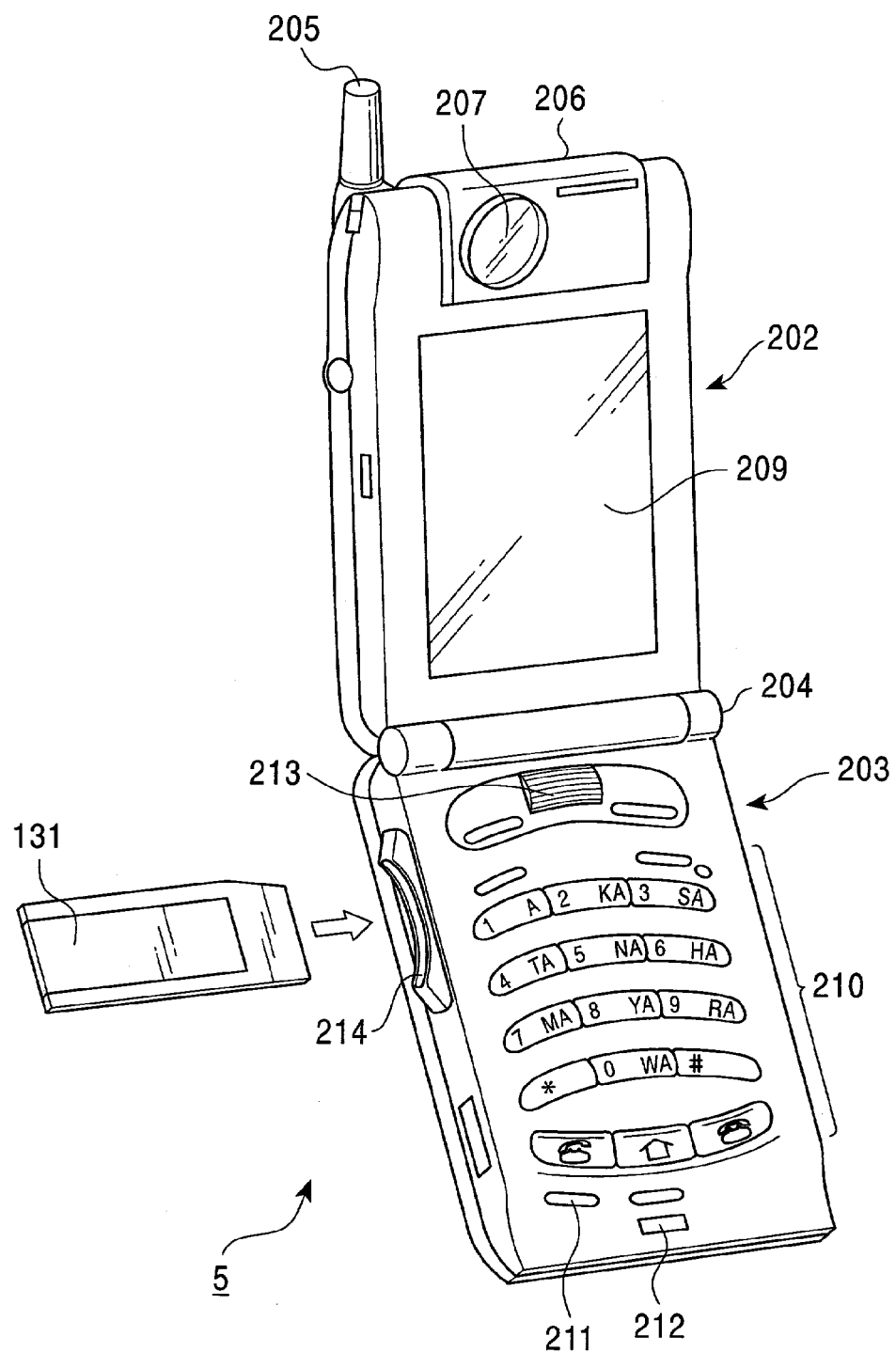
FIG. 11 is an external view of a camera-equipped digital cellular phone.

Next, the external configuration of the camera-equipped digital cellular phone 5 will be described. As shown in FIG. 11, the camera-equipped digital cellular phone 5 is constructed of a display unit 202 and a main unit 203, and can be folded by a hinge 204 therebetween.

The display unit 202 has an antenna 205 for transmission and reception, which can be pulled out from and contained in a top left portion. The camera-equipped digital cellular phone 5 transmits and receives radio waves to and from one of the base stations 3-1 to 3-4, which are stationary radio stations.

Furthermore, the display unit 202 has a camera unit 206 in a top center portion, which can be rotated substantially over a range of 180 degrees. The camera-equipped digital cellular phone 5 images a desired target by a CCD camera 207 of the camera unit 206.

Figure 12:
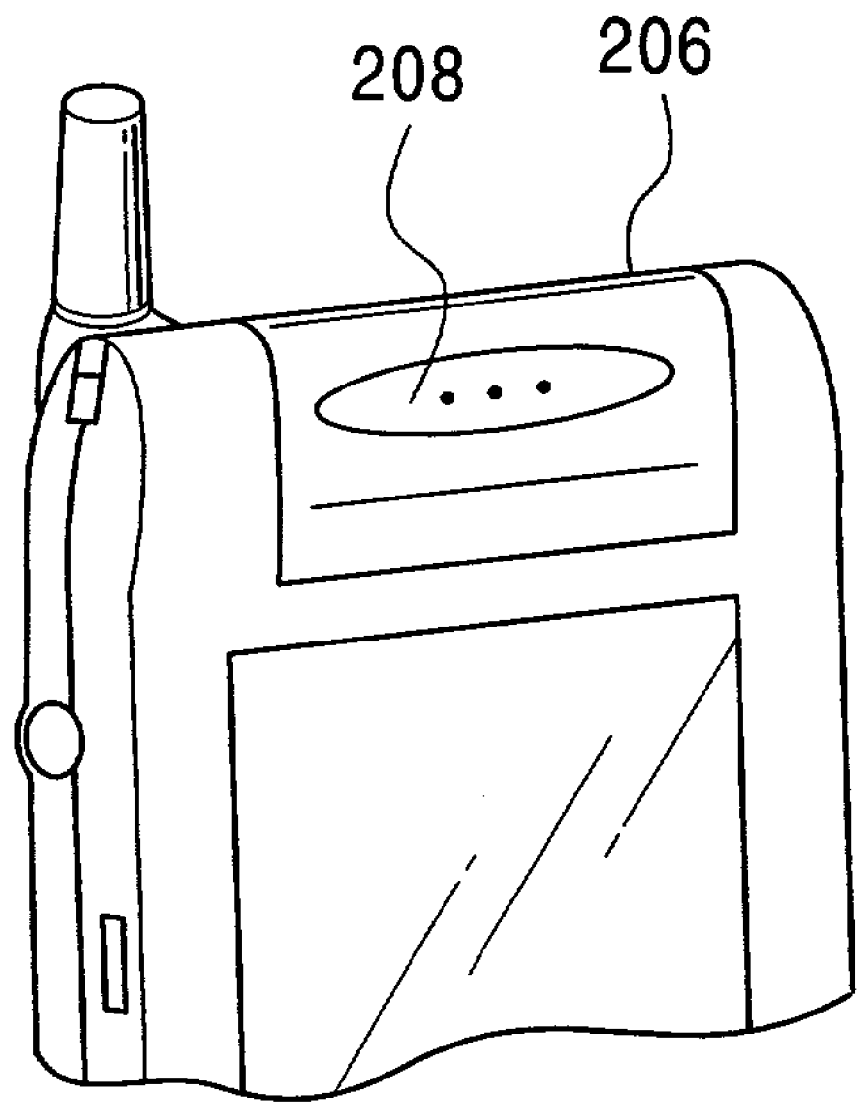
FIG. 12 is an external view of a camera unit of the camera-equipped digital cellular phone.

When the camera unit 206 is rotated substantially 180 degrees by a user, in the display unit 202, a speaker 208 provided at a central portion of the back side of the camera unit 206 comes in front, as shown in FIG. 12, whereby the camera-equipped digital cellular phone 5 is switched to normal speech communication mode.

Furthermore, a liquid crystal display 209 is provided on the front of the display unit 202. The liquid crystal display 209 displays status of radio wave reception, remaining battery capacity, a list of registered names and associated phone numbers, call records, contents of electronic mails, simple Web pages, images captured by the CCD camera 207 of the camera unit 206, etc.

The main unit has on its surface operation keys 210 including numeric keys from "0" to 9", a call key, a redialing key, a call termination and power key, a clear key, an electronic mail key, etc. Instructions corresponding to various operations of the operation keys 210 are input to the camera-equipped digital cellular phone 5.

Furthermore, a memo button 211 and a microphone 212 are provided in a portion below the operation keys 210 on the main unit 203. When the memo button 211 is operated, the camera-equipped digital cellular phone 5 records speech by the other party on the call. The camera-equipped digital cellular phone 5 collects speech of the user during a call by the microphone 212.

Furthermore, a jog dial 213, which is rotatable, is provided above the operation keys 210 on the main unit 203 so as to slightly project from the surface of the main unit 203. In accordance with rotation of the jog dial 213, the camera-equipped digital cellular phone 5 executes various operations such as scrolling a list of phone numbers or an electronic mail, moving through pages of a simple Web page, and moving forward or backward in an image displayed on the liquid crystal display 209.

For example, when the jog dial 213 is rotated by the user, the main unit 203 selects a desired phone number from a list of phone numbers displayed on the liquid crystal display 209, and when the jog dial 213 is pressed towards inside of the main unit 203, the main unit 203 determines selection of the phone number and automatically calls the determined phone number.

The main unit 203 has a battery pack, not shown, mounted on the back side thereof, so that when the call termination/power key is turned on, the main unit 203 supplies power to and activates each circuit unit.

On a top left side portion of the main unit 203, a memory stick slot 214 is provided so that the memory stick 131 can be inserted therein and pulled out therefrom. When the memo button 211 is pressed, the camera-equipped digital cellular phone 5 records speech of the other party on the call on the inserted memory stick 131. In accordance with user operations, the camera-equipped digital cellular phone 5 records an electronic mail, a simple Web page, an image captured by the CCD camera 207, or speech data generated by a process to be described later on the inserted memory stick 131.

Thus, the camera-equipped digital cellular phone 5, on which the memory stick 131 can be mounted, allows sharing of data with other electronic apparatuses such as the personal computer 2, the PDA 4, a portable music reproduction apparatus to be described later, etc., via the memory stick 131.

Figure 13:
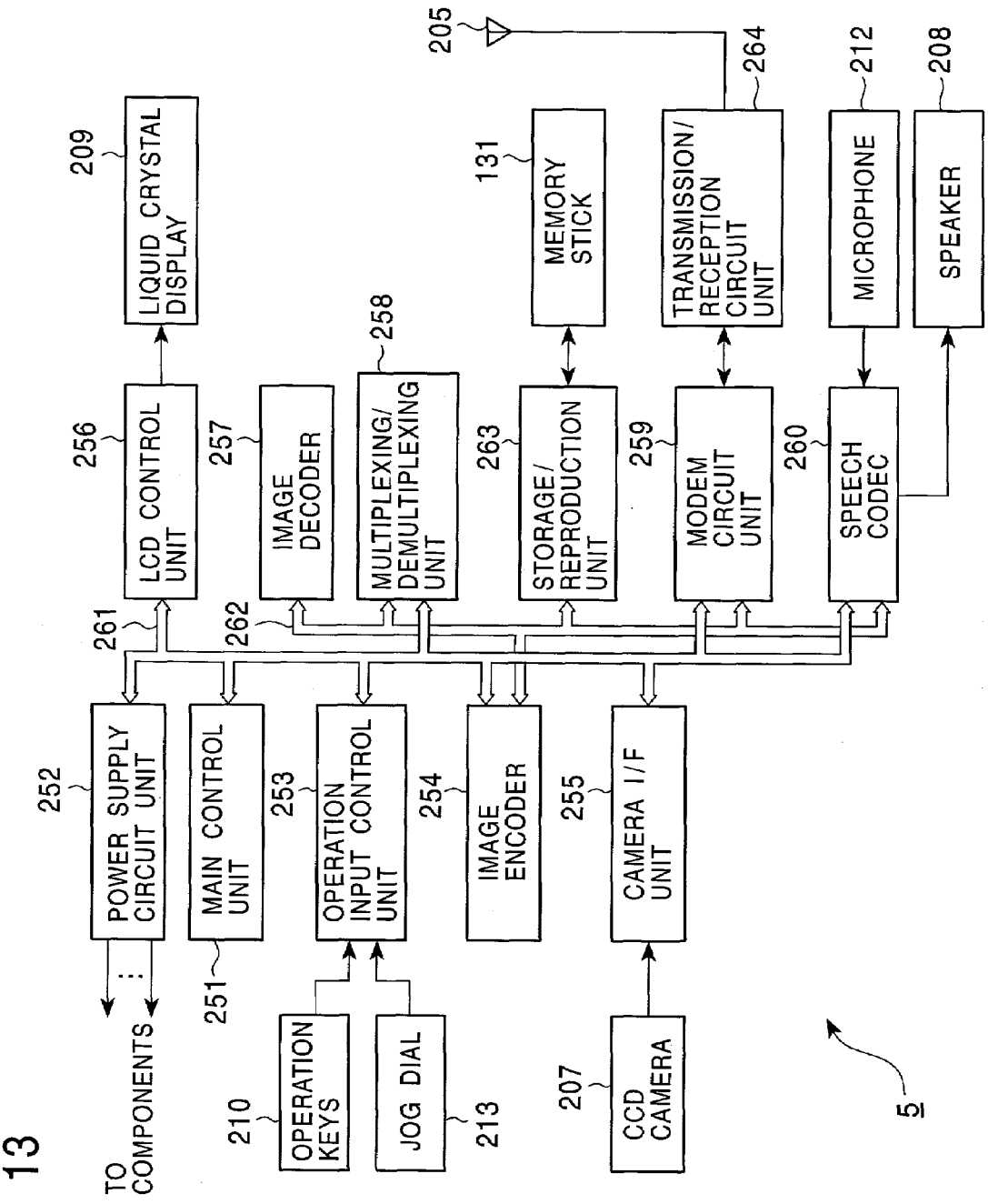
FIG. 13 is a block diagram showing the construction of the camera-equipped digital cellular phone.

FIG. 13 is a block diagram showing the internal construction of the camera-equipped digital cellular phone 5.

As shown in FIG. 13, in the camera-equipped digital cellular phone 5, a main control unit 251 that generally controls the components of the display unit 202 and the main unit 203 is connected via a main bus 261 to each of a power supply circuit unit 252, an operation input control unit 253, an image encoder 254, a camera I/F (interface) unit 255, an LCD (Liquid Crystal Display) control unit 256, a multiplexing/demultiplexing unit 258, a modem circuit unit 259, and a speech codec 260. Furthermore, the image encoder 254, an image decoder 257, the multipexing/demultiplexing unit 258, a storage/reproduction unit 263, the modem circuit unit 259, and the speech codec 260 are connected to each other via a synchronization bus 262.

When the call termination/power key is turned on by a user operation, the power supply circuit unit 252 supplies power to each component from the battery pack, activating the camera-equipped digital cellular phone 5.

The camera-equipped digital cellular phone 5, when in speech communication mode, converts speech a signal collected by the microphone 212 into digital speech data in the speech coded 260, under the control of the main control unit 251 including a CPU, a ROM, a RAM, etc. The camera-equipped digital cellular phone 5 performs a spectrum spreading process on the digital speech data in the modem circuit unit 259, performs a digital-to-analog conversion process and a frequency conversion process in a transmission/reception circuit unit 264, and then transmits the result via the antenna 205.

Furthermore, the camera-equipped digital cellular phone 5, when in speech communication mode, amplifies a reception signal received via the antenna 205 and performs a frequency conversion process and an analog-to-digital conversion process in the transmission/reception circuit unit 264, performs a reverse spectrum spreading process in the modem circuit unit 259, and coverts the result into an analog speech signal in the speech codec 260. The camera-equipped digital cellular phone 5 outputs speech corresponding to the analog speech signal by the speaker 208.

Furthermore, the camera-equipped digital cellular phone 5, when transmitting an electronic mail in data communication mode, forwards text data of an electronic mail, input by an operation of the operation keys 210 or the jog dial 213, to the main control unit 251 via the operation input control unit 253.

The main control unit 251 performs a spectrum spreading process on the text data in the modem circuit unit 259, performs a digital-to-analog conversion process and a frequency conversion process in the transmission/reception circuit unit 264, and then transmits the result to the base station 3 via the antenna 205.

On the other hand, when receiving an electronic mail in data communication mode, the camera-equipped digital cellular phone 5 performs a reverse spectrum spreading process on a reception signal received from the base station 3 via the antenna 205, outputting restored original text data to the LCD control unit 256. The LCD control unit 256 controls the liquid crystal display 209 so as to display the electronic mail thereon.

The camera-equipped digital cellular phone 5 also allows an electronic mail received in accordance with a user operation, or the electronic mail converted into speech data by a process to be described later, to be recorded on the memory stick 131 via the storage/reproduction unit 263.

The camera-equipped digital cellular phone 5, when transmitting image data in data communication mode, supplies image data captured by the CCD camera 207 to the image encoder 254 via the camera interface unit 255.

The camera-equipped digital cellular phone 5 also allows the image data captured by the CCD camera 207 to be displayed directly on the liquid crystal display 209 via the camera interface 255 and the LCD control unit 256, instead of transmitting the image data.

The image encoder 254 compresses and encodes the image data supplied from the CCD camera 207 based on a predetermined encoding method, for example, MPEG (Moving Picture Experts Group) 2 or MPEG 4, transmitting the encoded image data to the multiplexing/demultiplexing unit 258.

At the same time, the camera-equipped digital cellular phone 5 also forwards speech collected by the microphone 212 while the image is captured by the CCD camera 207 to the multiplexing/demultiplexing unit 258 via the speech codec 260 in the form of digital speech data.

The multiplexing/demultiplexing unit 258 multiplexes the encoded image data supplied from the image encoder 254 and the speech data supplied from the speech codec 260 by a predetermined method, performs a spectrum spreading process on the resulting multiplexed data in the modem circuit unit 259, performs a digital-to-analog conversion process and a frequency conversion process in the transmission/reception circuit unit 264, and transmits the result via the antenna 205.

On the other hand, for example, when receiving data of a motion picture file linked to a simple Web page in data communication mode, the camera-equipped digital cellular phone 5 performs, in the modem circuit unit 259, a reverse spectrum spreading process on a reception signal received from the base station 3 via the antenna 205, forwarding the multiplexed data to the multiplexing/demultiplexing unit 258.

The multiplexing/demultiplexing unit 258 demultiplexes the multiplexed data into the encoded image data and the speech data, supplying the encoded image data to the image decoder 257 and the speech data to the speech codec 260 via the synchronization bus 262.

The image decoder 257 decodes the encoded image data by a decoding method corresponding to the predetermined encoding method, for example, MPEG 2 or MPEG 4, and supplies reproduced motion picture data to and displays it on the liquid crystal display 209 via the LCD control unit 256. Thus, for example, the camera-equipped digital cellular phone 5 displays the motion picture data included in the motion picture file linked to the simple Web page.

At the same time, the speech codec 260 converts the speech data into an analog speech signal, which is supplied to the speaker 208 for output. Thus, for example, the camera-equipped digital cellular phone 5 reproduces the speech data included in the motion picture file linked to the simple Web page.

Also in this case, similarly to the case of an electronic mail, the camera-equipped digital cellular phone 5 allows data of the received simple Web page, etc., or the text data of the simple Web page converted into speech data by a process to be described later, to be recorded on the memory stick 131 via the storage/reproduction unit 263 by a user operation.

Figure 14:
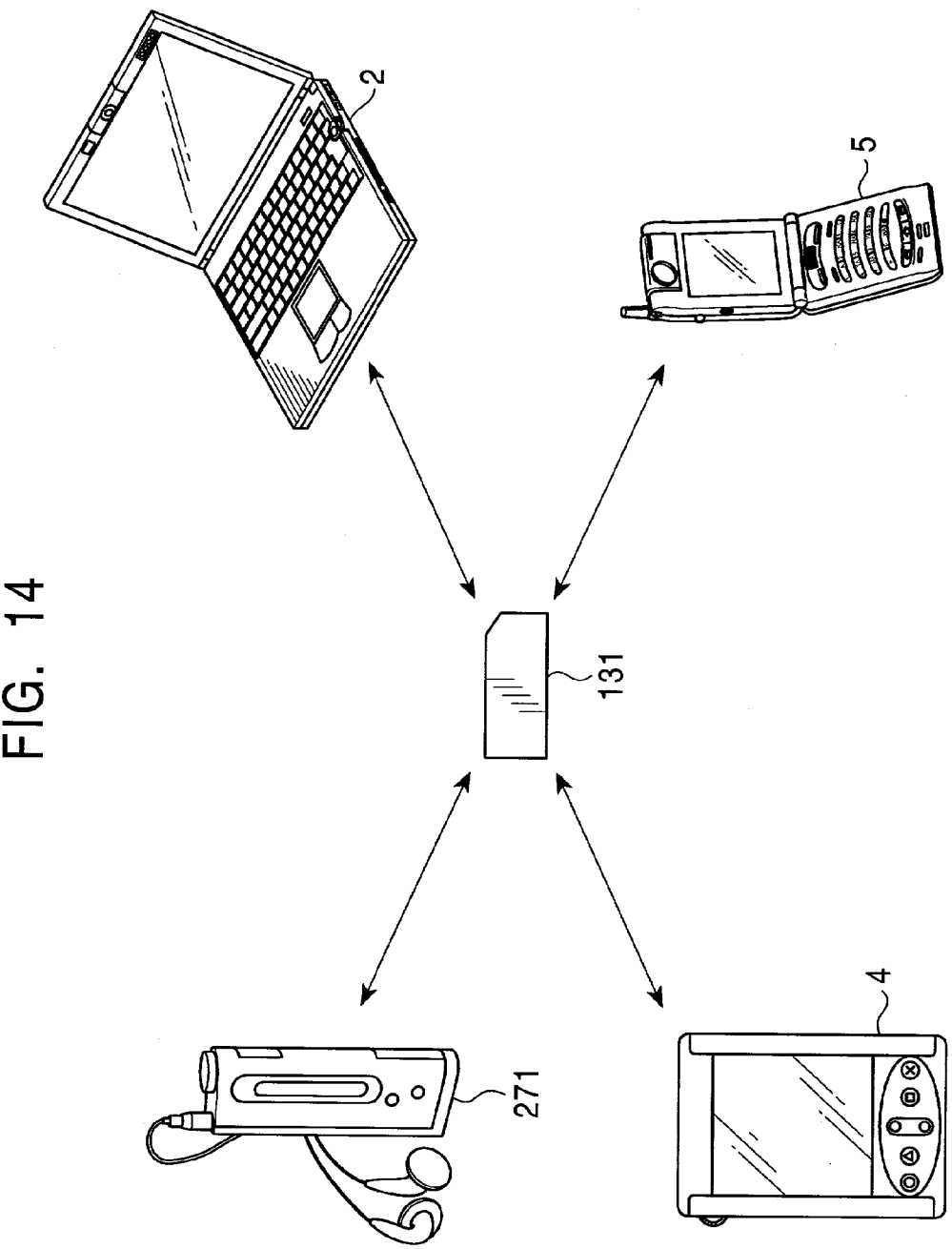
FIG. 14 is an illustration showing sharing of information using a memory stick.

That is, each of the personal computer 2, the PDA 4, the camera-equipped digital cellular phone 5, and the portable music reproduction apparatus 271, on which the memory stick 131 can be mounted and which allows speech data recorded on the memory stick 131 to be reproduced, information can be shared via the memory stick 131, as shown in FIG. 14. For example, data generated by the personal computer 2, the PDA 4, or the camera-equipped digital cellular phone 5 can be recorded on the memory stick 131 and reproduced by the portable music reproduction apparatus 271.

Although the description has been made with reference to FIG. 14 in relation to a case where information is shared via the memory stick 131, it is to be understood that the personal computer 2, the PDA 4, the camera-equipped digital cellular phone 5, and the portable music reproduction apparatus 271 may be connected with each other by wire or by wireless so as to allow exchange of data so that information can be shared.

Figure 15:
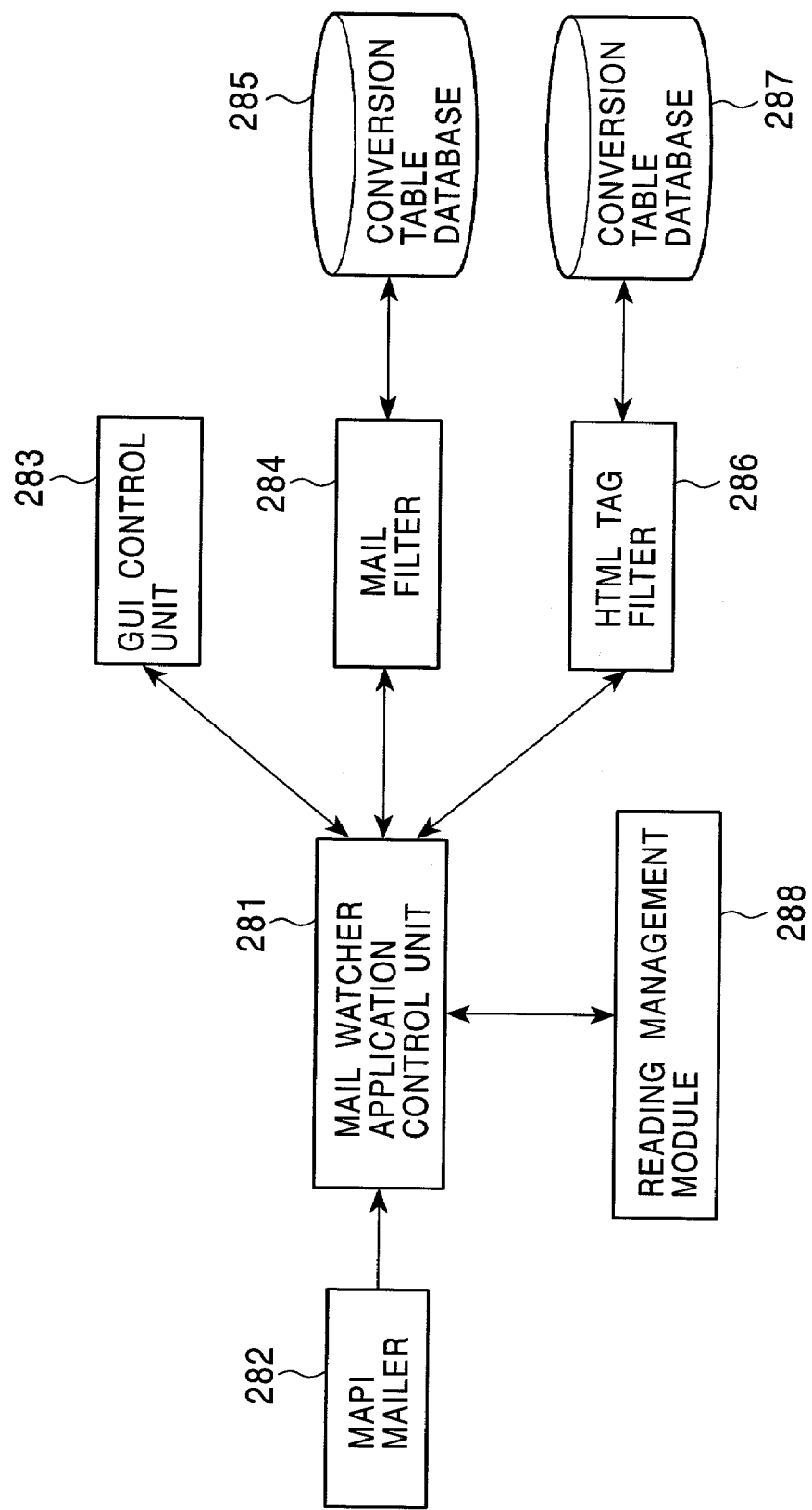
FIG. 15 is a functional block diagram in relation to a mail watcher application being activated.

FIG. 15 is a functional block diagram in relation to a mail watcher application, which is one of the application programs 67H recorded in the HDD 67 described with reference to FIG. 6, being loaded in the RAM 54 and executed by the CPU 51.

A mail watcher application control unit 281 reads electronic mail data from an MAPI mailer 282 (corresponding to the electronic mail program 67A in FIG. 6) employing MAPI (Messaging Application Program Interface), which is a standard system interface for electronic messaging applications, standardized as part of WOSA (Windows (trademark) Open System Architecture) by Microsoft Corporation, and executes various processes based on user settings supplied from a GUI (Graphical User Interface) control unit 283.

When the mail watcher application control unit 281 executes the processes, the MAPI mailer 282 need not be activated (i.e., need not be loaded in the RAM 54 and executed by the CPU 51).

The GUI control unit 283, under the control of the mail watcher application control unit 281, controls display of GUI components such as dialog boxes and windows for making various settings of a mail watcher application to be described later. The GUI control unit 283 also generates a signal indicating an operation input executed by the user on the GUI in display, supplying the signal to the mail watcher application control unit 281.

A mail filter 284 filters electronic mails written in text format, supplied from the mail watcher application control unit 281, based on a conversion table stored in a conversion table database 285.

In the conversion table database 285, symbols that are added to indent portions, indicating quotations in a body of an electronic mail when an electronic mail is replied to or transferred, such as ">", "|", and ":", are recorded.

Figure 16:
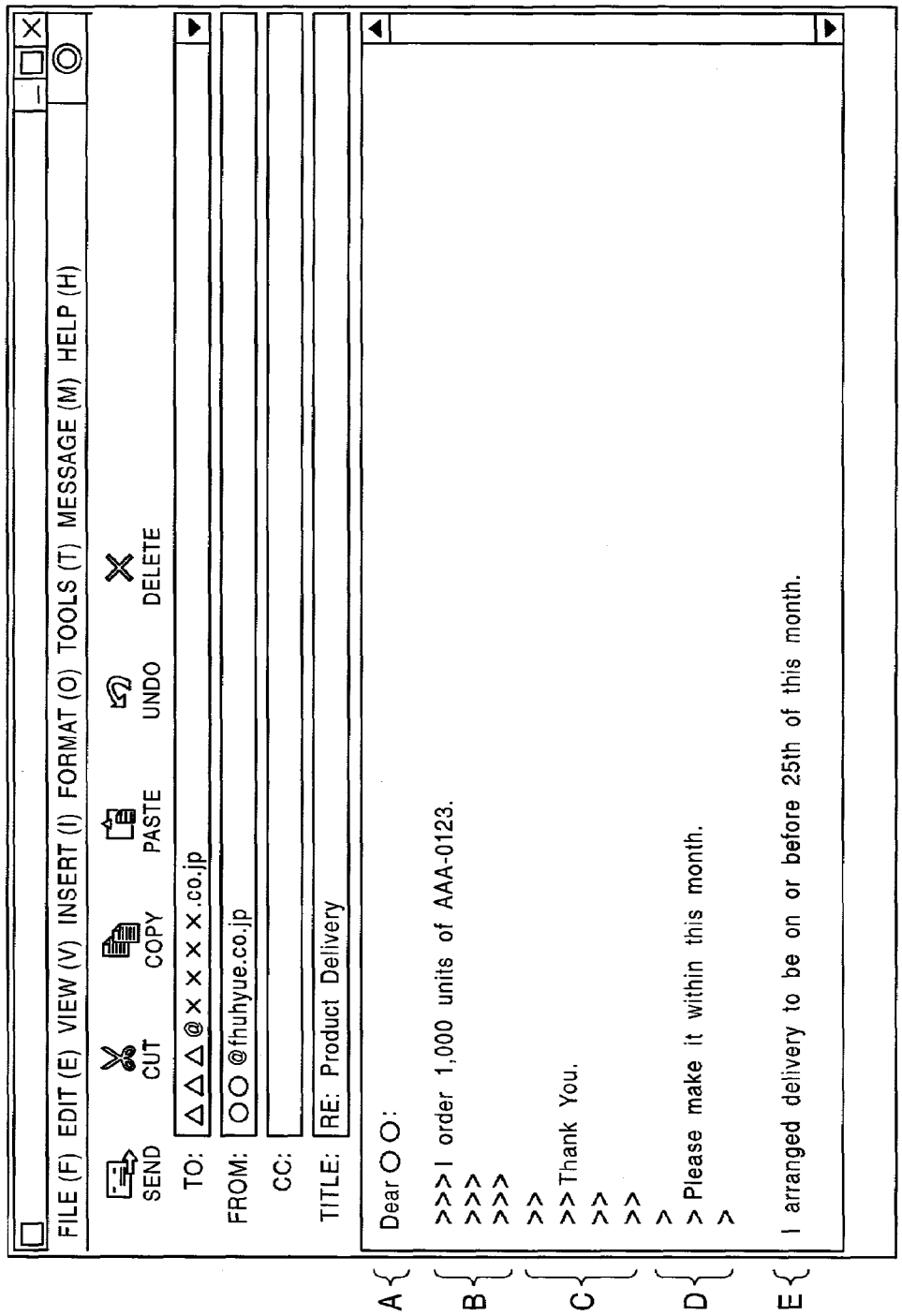
FIG. 16 is an illustration of an electronic mail in text format.

The mail filter 284 classifies the body of the electronic mail by authors based on symbols added to each line of the body of the electronic mail and the number of the symbols. For example, when an electronic mail shown in FIG. 16 is supplied, the mail filter 284 divides it into a text A (a portion written by the sender herein), which is the beginning portion of the body of the electronic mail; a text B (a quotation herein), which differs from the text A; a text C, which differs from the text B (in the number of symbols in quotation); a text D, which differs from the text C (in the number of symbols in quotation); and a text E (a portion written by the sender herein), which differs from the text D.

An HTML (Hypertext Markup Language) tag filter 286 filters electronic mails written in HTML format, supplied from the mail watcher application control unit 281, based on a conversion table stored in a conversion table database 287.

Figure 17:
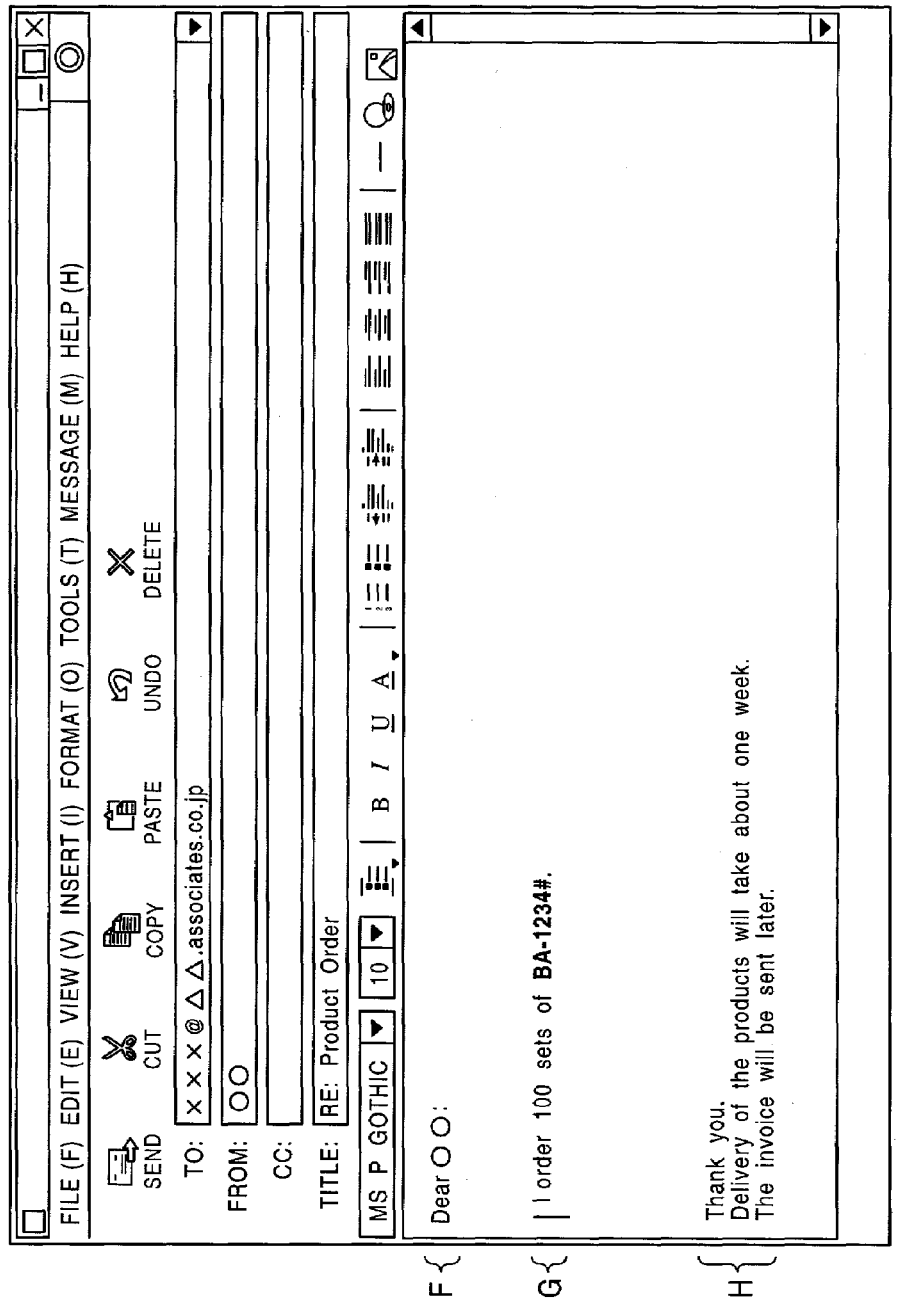
FIG. 17 is an illustration of an electronic mail in HTML format.

FIG. 17 shows an example of electronic mail written in HTML format. FIG. 18 shows the source of the electronic mail written in HTML format, shown in FIG. 17. In contrast to an electronic mail written in text format, in an electronic mail written in HTML format, for example, the color of the background can be changed, image data can be used as the background, character fonts can be set, adding a color to highlight a particular portion, using larger character point, using a bold font, or using an italic font.

In the source of the electronic mail, shown in FIG. 18, the portion enclosed between <HTML> and </HTML> corresponds to the entire electronic mail written in HTML format. The portion enclosed between <HEAD> and </HEAD> (indicated by I in FIG. 18) corresponds to the header of the electronic mail.

The portion enclosed between <BODY bgcolor=#ffffff> and </BODY> (indicated by J in FIG. 18) corresponds to the body of the electronic mail. bgcolor=ffffff represent the color of the background of the body. In the body, each portion enclosed between <DIV> and </DIV> corresponds to a line of the body. Beginning from <BLOCKQUOTE dir=ltr . . . 0px">, each portion for which <DIV> indicating the beginning of a line is indented (portion indicated by K) corresponds to a quotation, i.e., the portion indicated by G in FIG. 17. <BLOCKQUOTE dir=ltr . . . 0px> is an HTML tag for displaying a quotation symbol (straight line) added to the indent portions in the portion indicated by G in FIG. 17.

The HTML tag filter 286, with reference to HTML tags (portions enclosed between < >) and based on the conversion table stored in the conversion table database 287, for example, divides the electronic mail into the body and the header, further divides the body into quotation and non-quotation (including nested quotation), and further into lines, adding predetermined information to each line so that text data of each line can be distinguished between quotation and non-quotation (including nested quotation), so that the reading management module 288 can process the data. Other methods of conversion may be used by modifying the conversion table stored in the conversion table database 287.

Although the description has been made in relation to an electronic mail written in text format or HTML format, markup languages other than HTML may also be used by providing corresponding conversion tables in the conversion table database 287.

Figure 19:
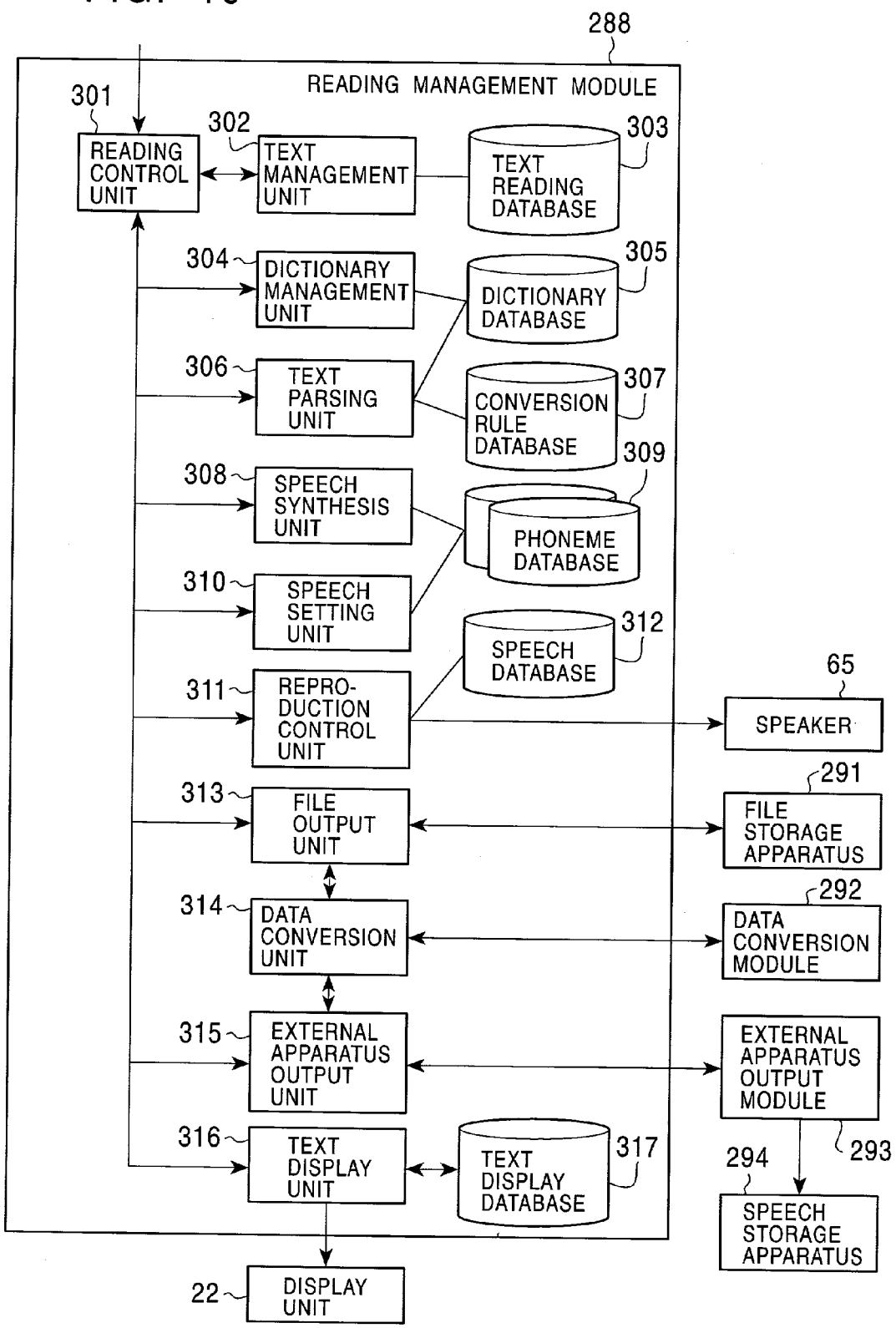
FIG. 19 is a more detailed functional block diagram of, a reading management module in FIG. 15.

FIG. 19 is a more detailed functional block diagram of the reading management module 288.

A reading control unit 301 controls the entire reading management module 288, and it supplies various signals and data to corresponding parts so that corresponding processes will be executed.

A text management unit registers text data for reading, supplied from the reading control unit 301, in a reading text database 303, and reads text data corresponding to an electronic mail, according to a reading instruction, from the reading text database 303 according to a process by the reading control unit 301, outputting the text data to the reading control unit 301.

A dictionary management unit 304 receives instructions for input of data to be registered in a user dictionary set by a user, updating of the dictionary, and deletion, and manages dictionary data registered in a dictionary database 305.

A text parsing unit 306 receives input of the text data corresponding to the electronic mail according to the reading instruction, which has been read from the reading text database 303 by the reading control unit 301 via the text management unit 302, parses the text data with reference to the dictionary database 305 and a conversion rule database 307 to breaks the text data into words, and generates and outputs prosody information (sound information like phonetic symbols) to a speech synthesis unit 308. The conversion rule database 307 stores rules for generating the prosody information.

The speech synthesis unit 308 generates synthetic speech data with reference to a phoneme database 309, based on the prosody information input from the text parsing unit 306 (concatenates the input prosody information to form synthetic speech data). The phoneme database 309 may be provided in plurality, each storing phonemes respectively corresponding to phoneme data provided in advance and generated by processes to be described later. The speech synthesis unit 308 selects a phoneme selected by a user, and generates synthetic speech data.

A speech setting unit 310 receives input of information representing speed and pitch of speech, set by the user by a process to be described later, from the reading control unit 301, and modifies phoneme data recorded in the phoneme database 309 as required.

A reproduction control unit 311 records generated speech data in a speech database 312. Furthermore, upon receiving input of an instruction for reproducing speech data from the reading control unit 301, the reproduction control unit 311 reads corresponding speech data from the speech database 312, outputting the speech to the speaker 65 for reproduction. The format of speech data recorded in the speech database 312 is, for example, PCM (Pulse Code Modulation), and the format may differ from the format for recording in an external apparatus or external recording medium, for example, WAVE data, ATRAC (Advanced TRansform Acoustic Coding) 3, ADPCM (Adaptive Differential Pulse Code Modulation).

The file output unit 313 receives input of a control signal for recording speech data in a file storage apparatus 291 (e.g. HDD 67) inside the apparatus, receives input of speech data from the speech database 312 via the reproduction control unit 311, converts the data format (e.g., from PCM data into ADPCM data) as required in the data conversion unit 314, adds a header, changes the frequency (e.g., from 22 KHz into 11 KHz or 16 KHz), and outputs the result to the file storage apparatus 291 for recording thereon.

An external apparatus output unit 315 receives a control signal for outputting speech data to outside (recording apparatus or recording medium), receives input of speech data from the speech database 312 via the reproduction control unit 311, converts the data format as required (e.g., from PCM data into ADPCM data).in the data conversion unit 314, adds a header, changes the frequency (e.g., 22 KHz to 11 KHz or 16 KHz), and outputs the result to an external apparatus output module 293.

The data conversion unit 314 receives input of data from the file output unit 313 or the external apparatus output unit 315, converts, for example, PCM data into ADPCM data, if the converted format is, for example, ATRAC 3, and if the data conversion module 293 outside the reading management module 288 is capable of converting PCM data into ATRAC 3, outputs data to be converted to the data conversion module 293, and receives input of the data after the conversion process.

The data conversion module 293, when the speech data is to be converted into a data format not supported by the data conversion unit 314, for example, when converting data in PCM format into ATRAC 3 format, receives input of speech data from the data conversion unit 314, converts the speech data into the supported format, and outputs the result to the data conversion unit 314.

Figure 6:
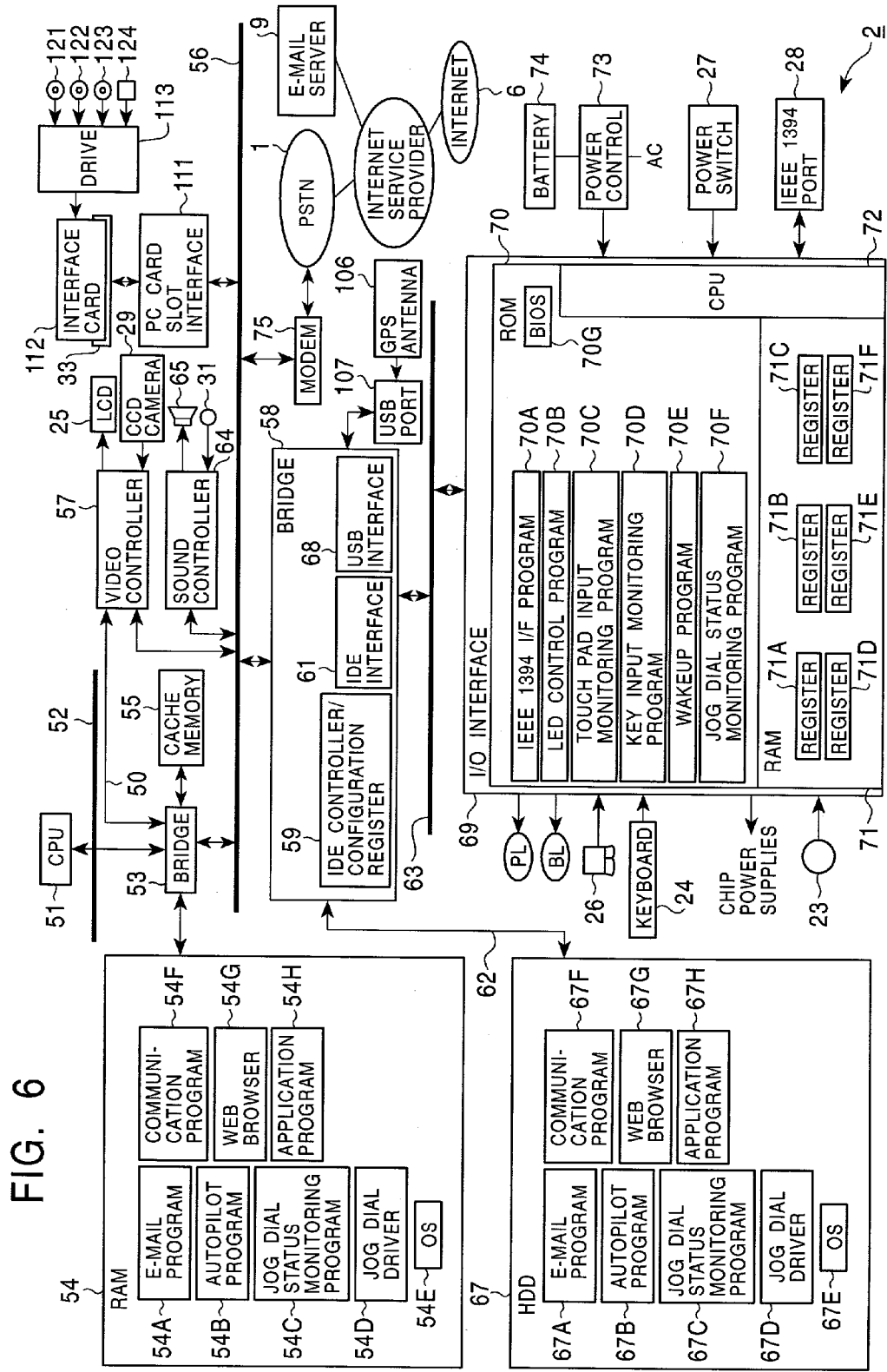
FIG. 6 is a block diagram showing an example internal construction of the personal computer in FIG. 1.

The external apparatus output module 293 outputs speech data to an external apparatus connected to the personal computer 2, for example, via the USB interface 68 or the PC card slot interface 111 in FIG. 6, and executes a process for recording the speech data in the speech storage apparatus 294, i.e., a mounted recording medium such as the memory stick 131, or a memory in an external apparatus such as the PDA 4.

The processes executed by the data conversion module 292 and the external apparatus output module 293 may be implemented by processes of application software for conversion and management of music data, for example, OPEN MG (trademark) developed by Sony Corporation, which is the assignee of this application.

The speech storage apparatus 294 may be of any type as long as speech data can be recorded thereon, and may be, for example, the PDA 4, the camera-equipped digital cellular phone 5, or the portable music reproduction apparatus 271.

A text display unit 316 receives input of text for display, input from the reading control unit 301, registers it in the display text database 317, reads the text data corresponding to an electronic mail instructed for display from the display text database 317 under the control of the reading control unit 301, outputting and displaying it on the display unit 22.

Figure 20:
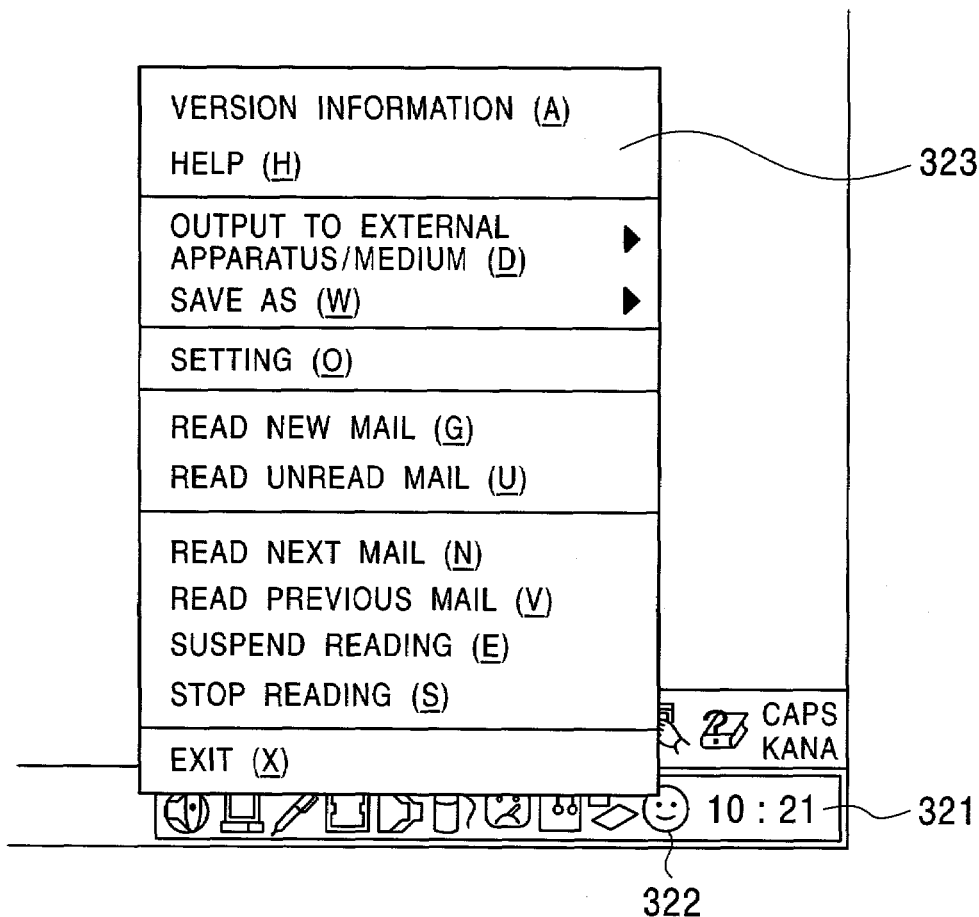
FIG. 20 is an illustration of a command box of the mail watcher application.

For example, the mail watcher application is activated simultaneously when the personal computer 2 is activated (i.e., the mail watcher application is made resident), and an icon 322 corresponding to the mail watcher application is displayed on a tool bar 321, as shown in FIG. 20. The user is allowed to display a command box 323 by selecting the icon 322.

When the user is to make various settings of the mail watcher application, the user selects a "setting" item from the command box 323. A signal representing the operation by the user is supplied to the mail watcher application control unit 281 from the GUI control unit 283. Upon receiving input of the signal indicating that the user has selected the "setting" item from the command box 323, the mail watcher application control unit 281 generates a control signal for displaying a setting window 331 shown in FIG. 21, outputting it to the GUI control unit 283.

Figure 21:
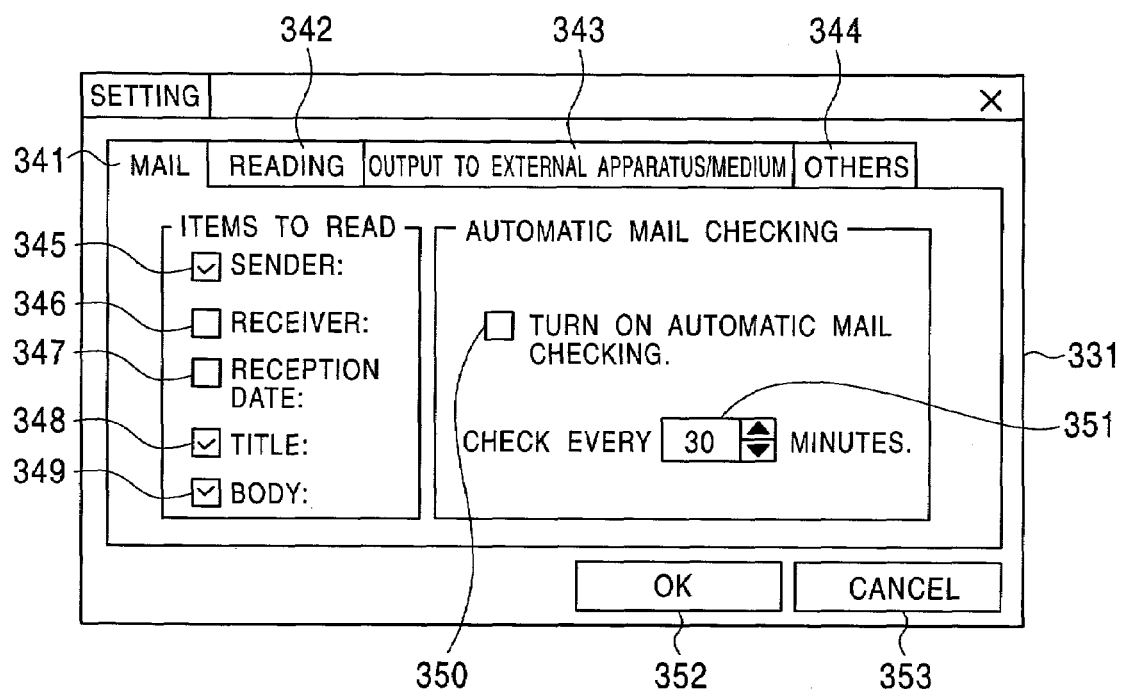
FIG. 21 is an illustration of a setting window that is displayed when a mail tab is selected.

FIG. 21 shows the setting window 331 that is displayed when a mail tab 341 is selected. In the setting window 331, several setting screens can be displayed by selecting tabs. The setting window 331 includes the mail tab 341, a reading tab 342, an output to external apparatus/medium tab 343, and an others tab 344, for switching of setting screens.

The setting window 331 displayed when the mail tab 341 is selected includes check boxes 345 to 349 for selecting items to read when an electronic mail is read, a check box 350 and a drop-down list box 351 for setting of automatic mail checking.

Of the check boxes 345 to 349, items corresponding to boxes checked by the user are converted into speech data by a process to be described later. Furthermore, of the check boxes 345 to 348 (i.e., items except for the body), items corresponding to boxes checked by the user are used for generating a title when speech data is output to an external apparatus, etc. If none of the items except for the body is checked, that is, if none of the check boxes 345 to 348 is checked, a predetermined character string is set as a title.

Furthermore, the mail watcher application lets the MAPI mailer 282 execute automatic mail checking at a predetermined time interval (i.e., establish a dial-up connection with a predetermined Internet service provider to access its mail server, checking any electronic mail to be received is present in the reception mail server). If the check box 350 is checked, the mail watcher application control unit 281 lets the MAPI mailer 282 execute automatic mail checking at a time interval specified in the drop-down list box 351.

If the MAPI mailer 282 finds no electronic mail to be received, the mail watcher application control unit 281 may output a speech message saying "No new mail arrived" or displays a similar message in a dialog box. If the MAPI mailer finds any mail to be received, the mail watcher application control unit 281 executes a process for reading the electronic mail received.

The setting window 331 also includes an OK button 352 that is selected when exiting the display of the setting window 331, and a cancel button 353 for cancelling the setting and then exiting the display of the setting window 331.

Figure 22:
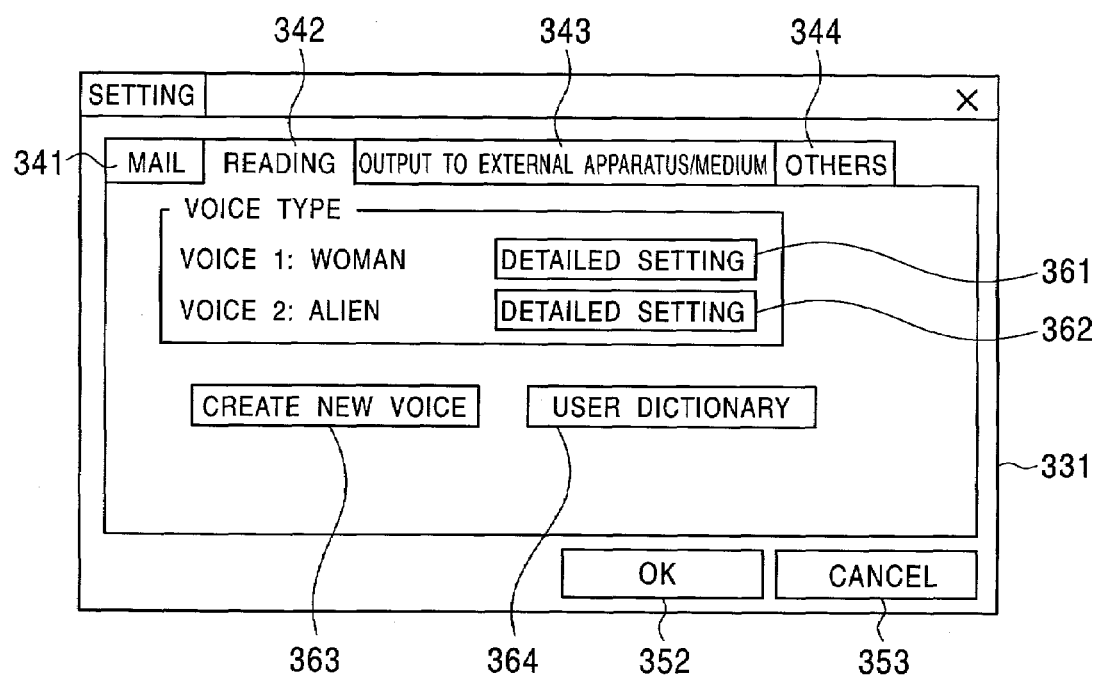
FIG. 22 is an illustration of a setting window that is displayed when a reading tab is selected.

FIG. 22 shows an example of the setting window 331, which is displayed when the reading tab 342 is selected. The setting window 331 includes, in addition to the OK button 352 and the cancel button 353, a detailed setting button 361 that is selected when making detailed setting of voice 1, a detailed setting button 362 that is selected when making detailed setting of voice 2, a create new voice button 363 that is selected when creating a new voice, and a user dictionary button 364 that is selected when editing a user dictionary.

Two types of voices, namely, "voice 1" and "voice 2", can be set for reading of text data of an electronic mail. When the user wishes to change setting of the voice 1 or the voice 2, the user selects the corresponding detailed setting button 361 or 362, displaying a voice setting window 371 shown in FIG. 23.

The voice setting window 371 includes a drop-down list box 381 for setting the type of voice, a setting lever 382 for setting the reading speed, a setting lever 383 for setting the voice pitch for reading, a setting lever 384 for setting the strength of stress for reading, a test button 385 for reproducing a sample voice in the current voice, an OK button 386 for registering the contents that have been set and exiting the voice setting window 371, a cancel button 387 for cancelling contents that have been set and exiting the voice setting window 371, and a help button 388 for displaying, for example, a help window showing guidance of operations.

The drop-down list box 381 allows selection of preset voice types such as woman, man, child, robot, and alien, and names of voice types created by the user in a voice creating window shown in FIG. 24 to be described later, which is displayed when the user selects the create new voice button 363 in FIG. 22. In relation to the voice type selected from the drop-down list box 381, the reading speed, the voice pitch, and strength of stresses are set by moving the positions of the setting levers 382 to 384, respectively.

Although the description has been made in the context that reading speed, voice pitch, and strength of stresses are set by the setting levers 382 to 384, respectively, it is to be understood that settings may be made with respect to other parameters.

The test button 385 is clicked on when the user wishes to know what voice 1 or voice 2 having been set using the setting levers 382 to 384 is like. When the test button 385 is clicked on, for example, a predetermined massage saying "This is the voice you have set" is reproduced in the voice that has been set. The user clicks on the OK button 386 to determine the voice setting, and clicks on the cancel button 387 to cancel the voice setting.

Figure 24:
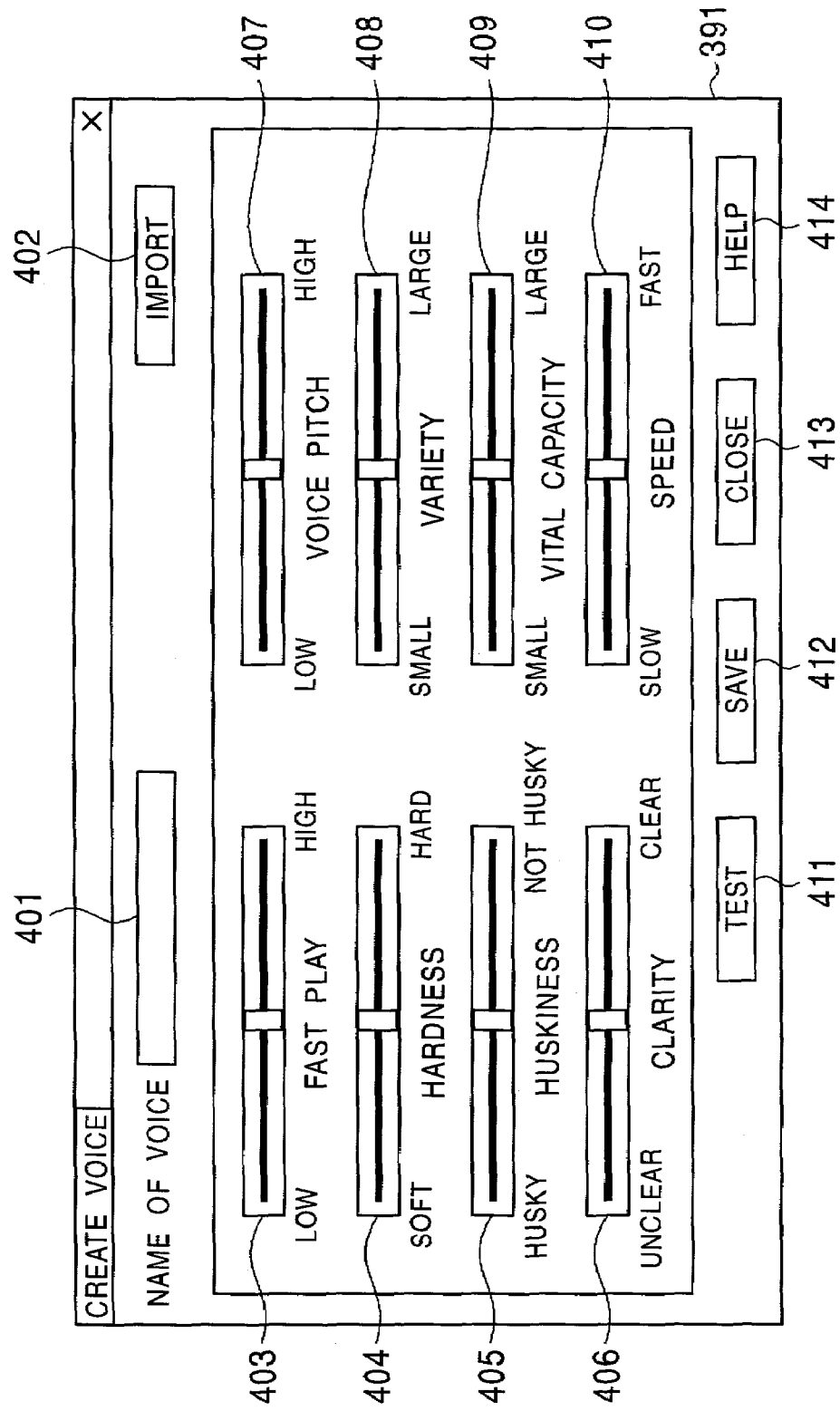
FIG. 24 is an illustration of a voice creation window that is displayed when a create new voice button is selected.

FIG. 24 shows a voice creation window 391 that is displayed when the create new voice button 363 is selected. The voice creation window 391 includes a text box 401 for inputting a name of a voice that has been created, an import button 402, setting levers 403 to 410, a test button 411, a save button 412, a close button 413, and a help button 414.

Figure 23:
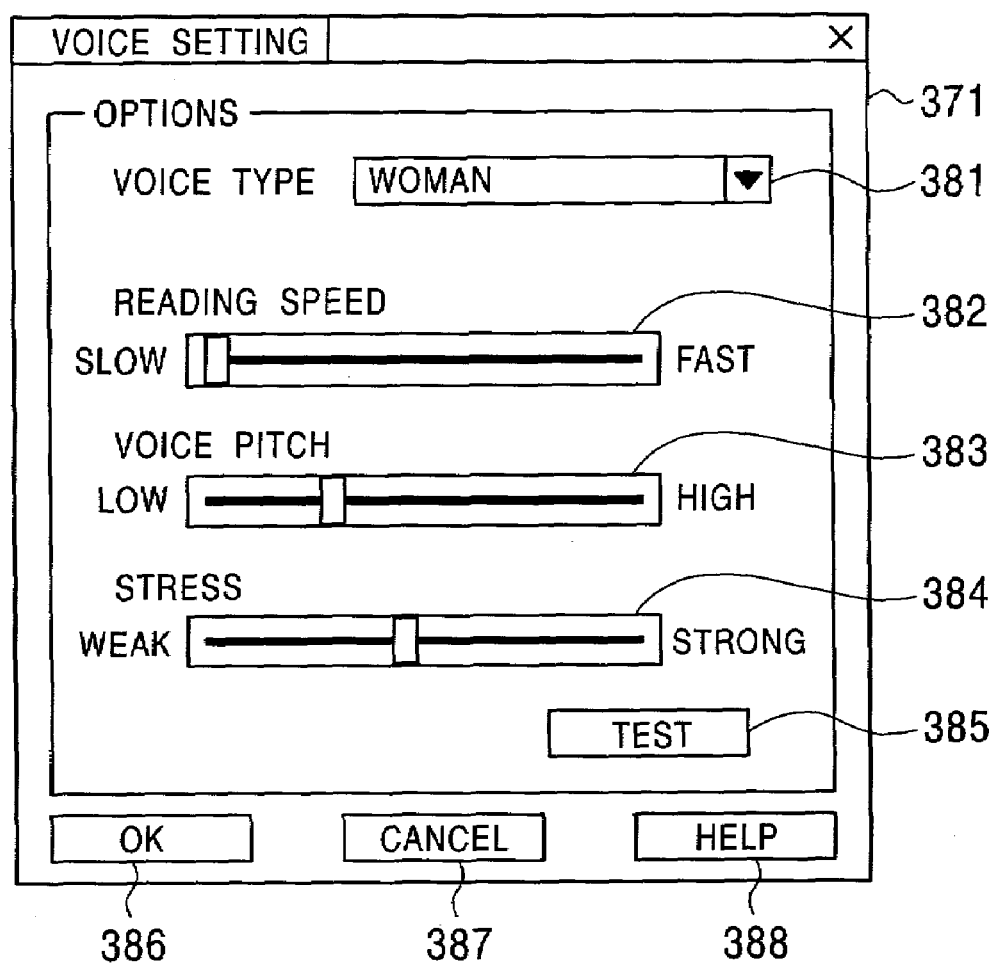
FIG. 23 is an illustration of a voice setting window that is displayed when a detailed setting button is selected.

The import button 402 is used to reflect setting of an existing voice on the positions of the setting levers 403 to 410 when creating a new voice. For example, when the import button 402 is selected, a list of existing voices as shown in the drop-down list box 381 in FIG. 23 is displayed, from which the user is allowed to select a desired voice.

The setting lever 403 is used to set a speed for fast play to thereby set voice pitch. The setting lever 404 is used to set hardness of voice. The setting lever 405 is used to set huskiness of voice. The setting voice 406 is used to set clarity of voice. The setting lever 407 is used to set voice pitch. The setting lever 408 is used to set variety of voice. The setting lever 409 is used to set a voice parameter corresponding to vital capacity. The setting lever 410 is used to set reading speed (reproduction speed that does not affect voice pitch).

Although the description has been made in the context that fast play speed, hardness, huskiness, clarity, pitch, variety, vital capacity, and reading speed are set using the setting levers 403 to 410, respectively, it is to be understood that other voice parameters may be set. When the user wishes to know what the voice having been set using the setting levers 403 to 410 is like, the user selects the test button 411.

The user enters a name of the voice that has been created in the text box 401. The save button 412 becomes active when a text has been entered in the text box 401. The user selects the save button 412 when the user wishes to save the voice that has been created.

The close button 413 is used when exiting the voice creation window 391. The help button 41 is selected when displaying a help window showing guidance as to creation of voice or usage of the application.

The voice that has been newly created can be used not only by the mail watcher application but also by a Web reader application, a mail reader application, and a text reading application to be described later. Thus, the mail watcher application control unit 281 outputs the settings of the newly created voice to the reading management module 288. The information regarding the newly created voice is registered in the phoneme database 309 by a process by the reading control unit 301.

Figure 25:
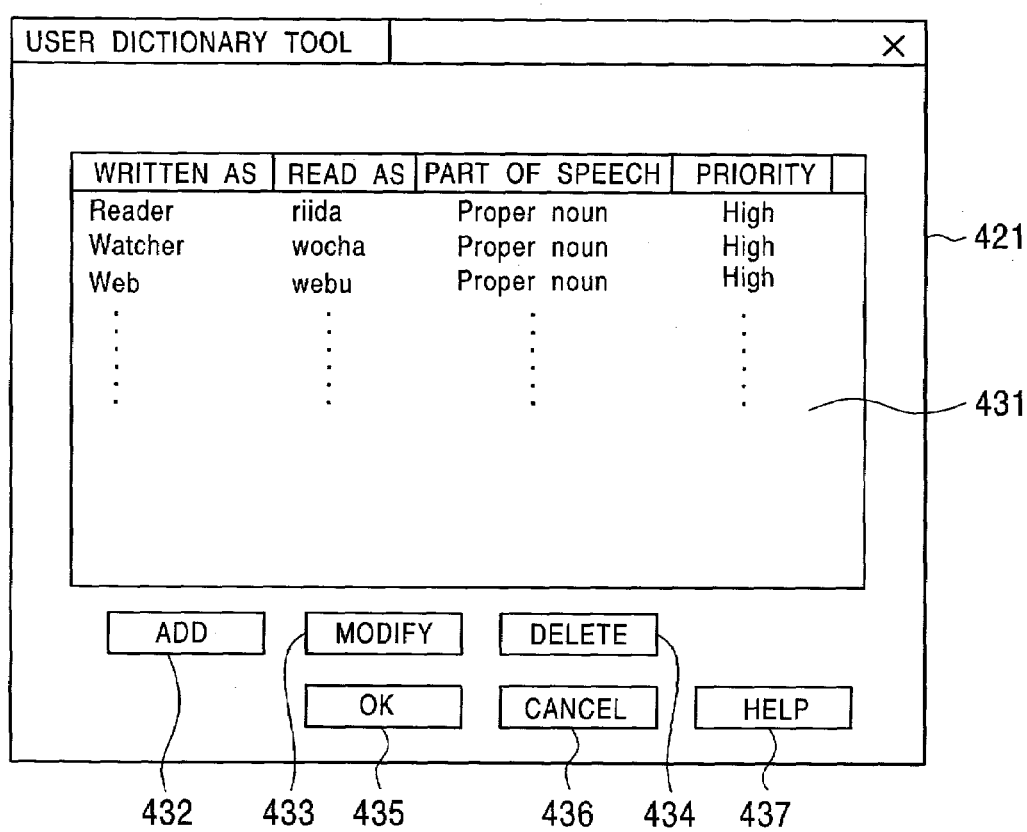
FIG. 25 is an illustration of a user dictionary tool window that is displayed when a user dictionary button is selected.

When the user dictionary button 364 is selected in the setting window 331 in FIG. 22, a user dictionary tool window 421 shown in FIG. 25 is displayed.

The user dictionary tool window 421 includes a word display window 431, an add button 432, a modify button 433, a delete button 434, an OK button 435, a cancel button 436, and a help button 437.

The word display window 431 displays text of each registered word to be displayed, reading of the word, the part of speech, and priority of reading when a word or phrase that can be read in different ways is input.

Figure 26:
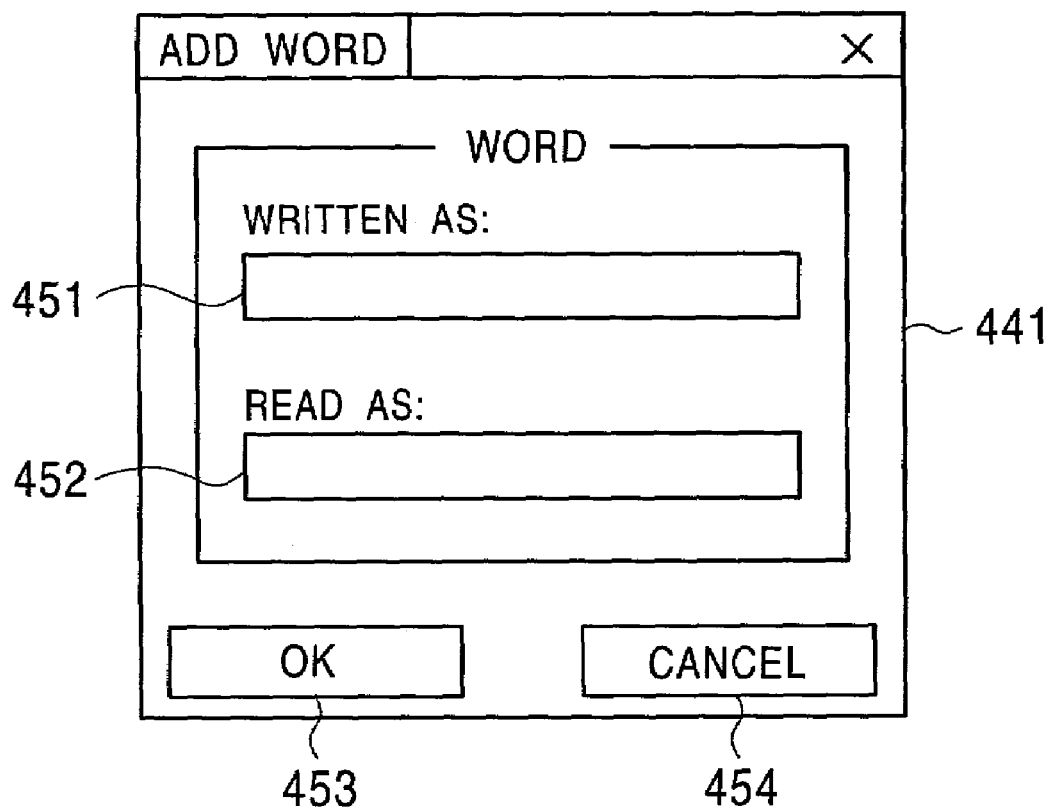
FIG. 26 is an illustration of an add word window that is displayed when an add button is selected.

When the add button 432 is selected, a word addition window 441 shown in FIG. 26 is displayed. The word addition window 441 includes a text box 451 for entering a word to be added, a text box 452 for entering reading of the word entered in the text box 451, using a text that represents speech (the same text always corresponds to the same speech, unlike Chinese characters), for example, Japanese hiragana, katakana, and Roman characters, an OK button 453 that is selected when registering contents that have been entered, and a cancel button 454 that is selected when cancelling registration of contents that have been entered.

Referring back to the user dictionary tool window 421 in FIG. 25, the modify button is selected when displaying a dictionary modifying window, not shown, for modifying a word, reading, part of speech, or priority selected (highlighted) from the list of words shown in the dictionary display window 431.

The delete button 434 is used when deleting a word selected (highlighted) from the list of words shown in the word display window 431.

The OK button 435 is selected when registering a word with contents shown in the word display window 431 and exiting the user dictionary tool window 421. The cancel button 436 is used to cancel a new registration or a modified content of registration and exiting the user dictionary tool window 421. The help button 437 is used when displaying a help window, not shown, showing guidance as to registration in the user dictionary.

The user dictionary that has thus been set can be used not only by the mail watcher application but also by a Web reader application, a mail reader application, and a text reading application to be described later, thus, the mail watcher application control unit 281 outputs words newly registered in the user dictionary or modified contents of the user dictionary to the reading management module 288, registering them in the dictionary database 305 described with reference to FIG. 19.

Figure 27:
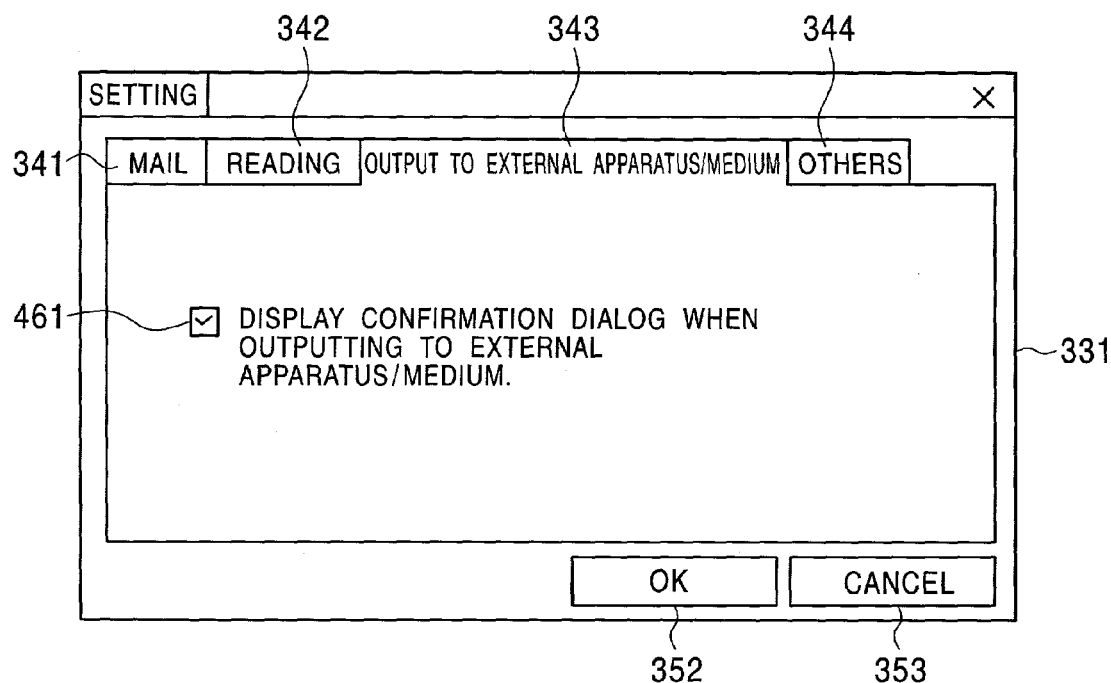
FIG. 27 is an illustration of a setting window that is displayed when an output to external apparatus/medium tab is selected.

FIG. 27 shows the setting window 331 that is displayed when the output to external apparatus/medium tab 343 is selected.

A check box 461 is used to set whether or not to display a confirmation dialog box to be described later with reference to FIG. 36, so that data recorded in advance in an external apparatus or medium will not be overwritten by mistake when the user outputs and records speech data to the external apparatus or medium (recording medium that allows recording of information). The dialog box is displayed if the check box 461 is checked.

Figure 28:
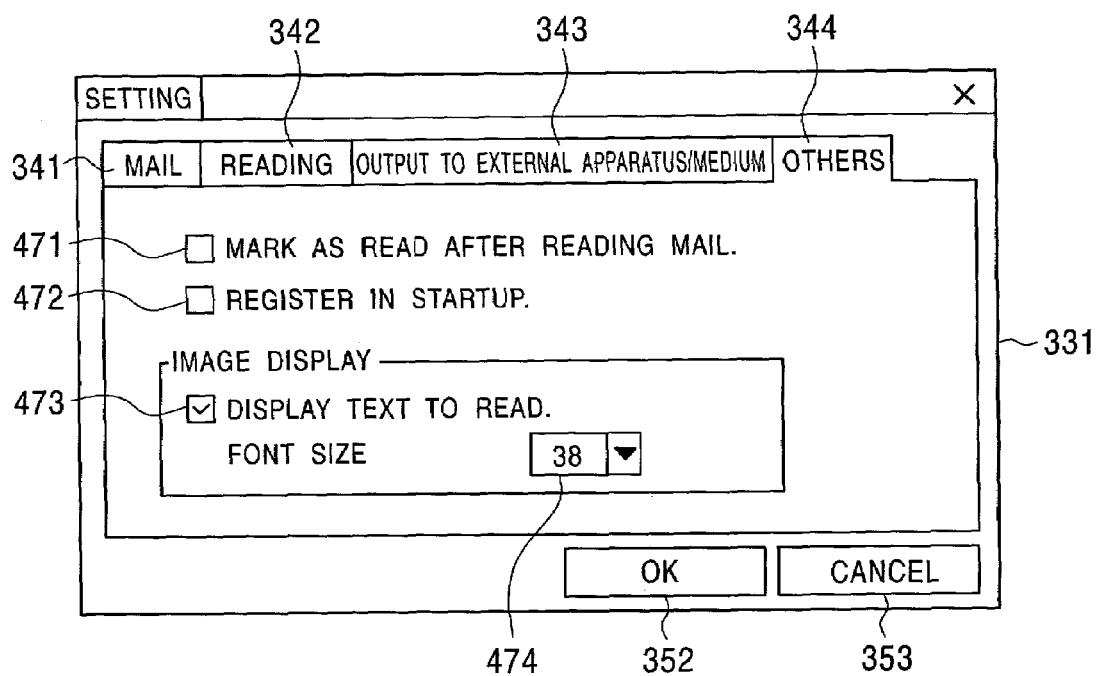
FIG. 28 is an illustration of a setting window that is displayed when an others tab is selected.

FIG. 28 shows the setting window 331 that is displayed when the others tab 344 is selected.

A check box 471 is used to set whether an electronic mail that has been read should be marked as a read mail in the electronic mail program 67A installed on the personal computer 2. A check box 472 is used to set the mail watcher application in startup if the personal computer 2 uses an OS that has startup function, such as Windows (trademark) 98.

Figure 31:
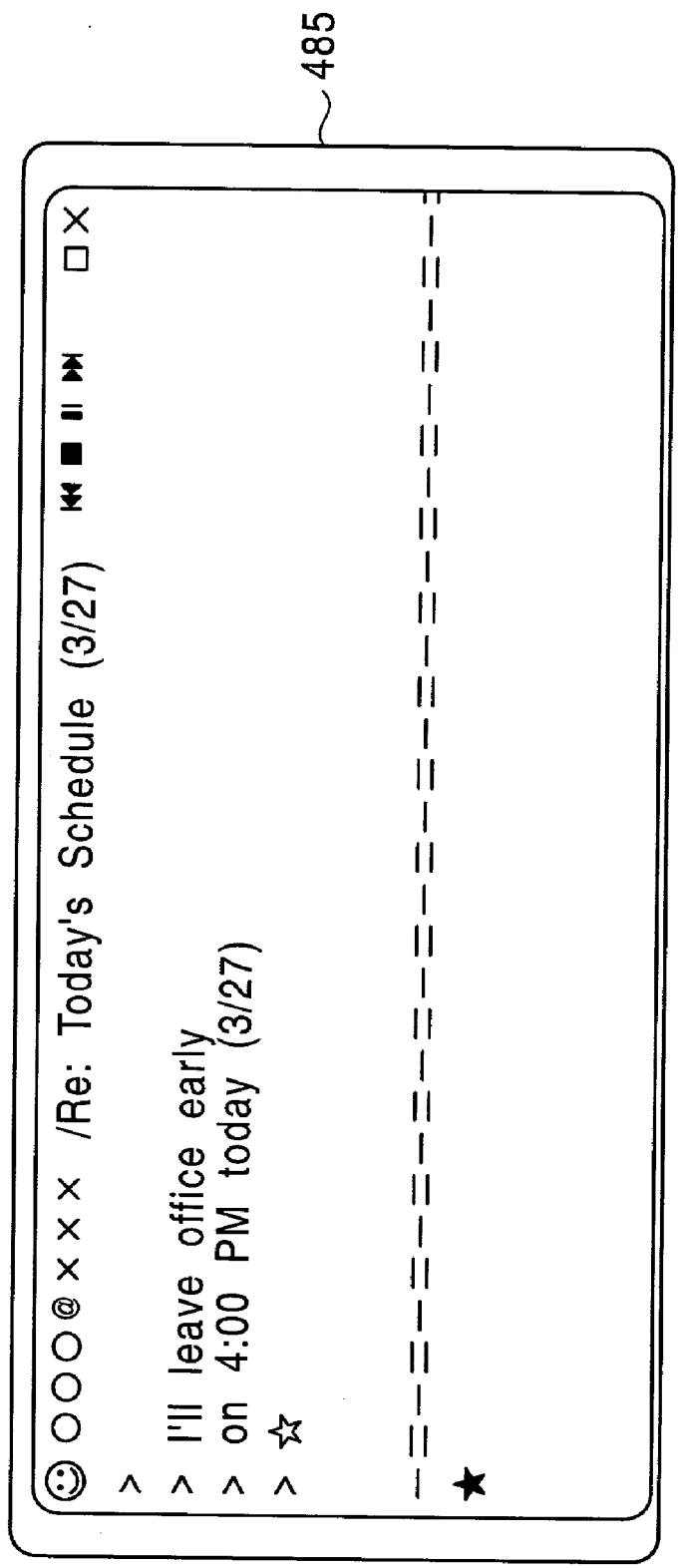
FIG. 31 is an illustration of a text display window.

A check box 473 is used to set whether text data should be displayed as the electronic mail is read, in a text display window to be described with reference to FIG. 31. If the check box 472 is checked (i.e., display of text is set), a drop-down list box 474 becomes active, allowing setting of font size of text to be displayed.

As described above, the mail watcher application control unit 281 executes various processes based on the contents set in the setting window 331, and executes a process for reading (converting into speech data for output) an electronic mail in accordance with a signal indicating a user operation, input from the GUI control unit 283.

Thus, by making setting so that reading speed will be faster, a user who wishes to reproduce a large number of electronic mails is allowed to reduce time for reproduction of the electronic mails. By making setting so that the reading speed will be slower, the speech can be accurately heard. Furthermore, for example, if the user is aged and has more trouble in listening low-frequency speech than high-frequency speech, voice type is set to woman, voice pitch is individually set to be higher so as to fall in a range easy to listen to, the reading speed is made slower, and clarity is added. Thus, speech setting can be adjusted to maximize ease of listening for the listener.

For example, when the command box 323 described with reference to FIG. 20 is displayed and one of the items is selected, the mail watcher application is activated, executing a process according to an operation input by the user.

Next, a process by the mail watcher, executed when an instruction for reading an unread mail or outputting an unread mail to an external apparatus is received, will be described with reference to a flowchart shown in FIG. 29.

In step S1, the mail watcher application control unit 281 determines whether a signal indicating an operation input corresponding to an instruction for reading an unread mail or outputting an unread mail to an external apparatus has been made by the user from the GUI control unit 283. If it is determined in step S1 that an operation input corresponding to an instruction for reading an unread mail or outputting an unread mail to an external apparatus has not been made, step S1 is repeated until the operation input is made.

Figure 30:
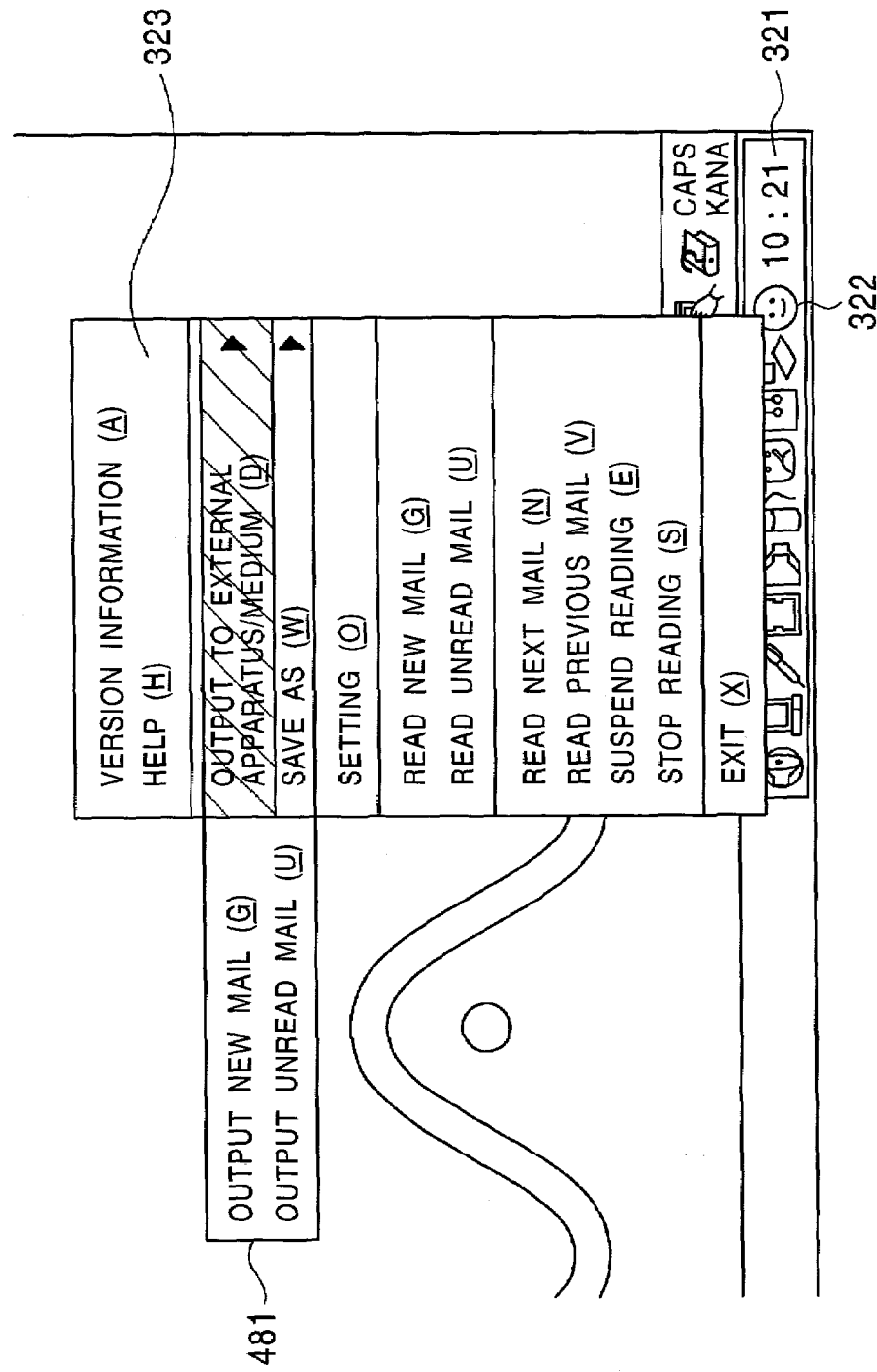
FIG. 30 is an illustration for explaining an operation input for instructing output of unread mails.

An operation input for instructing reading of an unread mail is selection of the "read unread mail" item in the command box 323 described with reference to FIG. 20. In order to make an instruction for outputting an unread mail to an external apparatus, the "output to external apparatus/medium" tab in the command box 323 described with reference to FIG. 20 is selected, and "output unread mail" item is selected from the command box 481 shown in FIG. 30. When "output new mail" is selected from the command box 481, a new mail is output and recorded on an external apparatus or external recording medium in connection. The following description will deal with a case of an unread mail.

If it is determined in step S1 that an operation instruction for reading an unread mail or outputting an unread mail to an external apparatus has been made, in step S2, the mail watcher application control unit 281 determines whether any unread mail is present in the MAPI mailer 282.

The process of step S2 is also executed at predetermined timing if the check box 350 described with reference to FIG. 21 is checked to turn on automatic mail checking.

Figure 32:
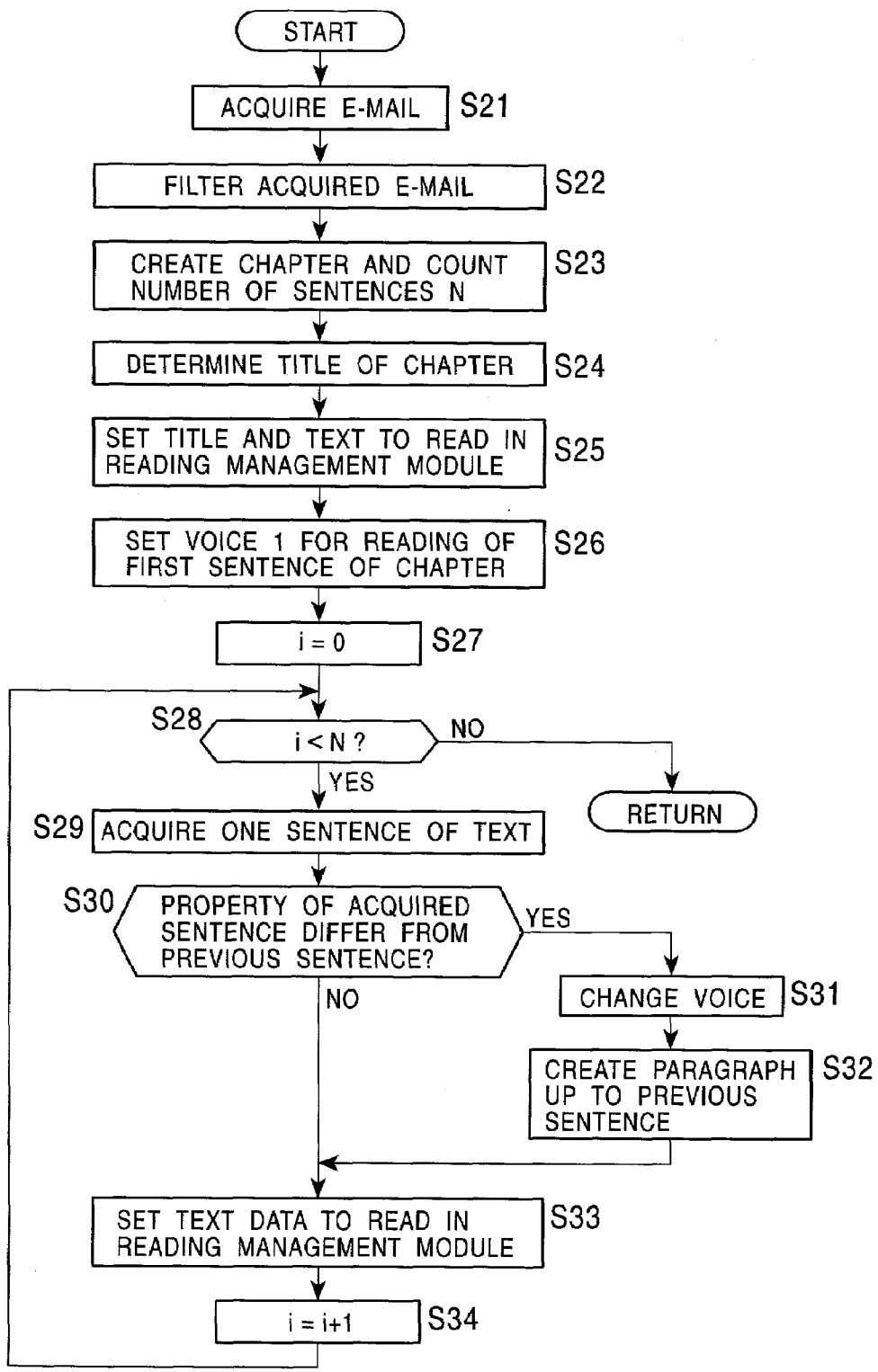
FIG. 32 is a flowchart of a reading speech setting process.

If it is determined in step S2 that an unread mail is present in the MAPI mailer 282, in step S3, a reading speech setting process to be described later with reference to a flowchart shown in FIG. 32 is executed.

In step S4, the mail watcher application control unit 281 determines whether a next mail is present in the MAPI mailer 282. If it is determined that a next mail is present, the process returns to step S3, repeating the process of step S3 until no unread mail is present.

If it is determined in step S4 that no next mail is present, that is, when the reading speech setting process has been executed for all unread mails, in step S5, the mail watcher application control unit 281 determines whether the user instruction is for speech reproduction of an electronic mail based on a signal input from the GUI control unit 283.

If it is determined in step S5 that the user instruction is for speech reproduction of an electronic mail, in step S6, the mail watcher application control unit 281 notifies the reading management module 288 of whether display of text is set based on the check box 473 described with reference to FIG. 28 is checked.

If display of text to read is set in the setting window 331 described with reference to FIG. 28, the reading control unit 301 of the reading management module 288 controls the text display unit 316 based on a signal supplied from the mail watcher application control unit 281 so that corresponding text data will be read from the display text database 317, displaying a text display window 485 shown in FIG. 31.

In step S7, the mail watcher application control unit 281 generates and outputs a signal requesting reproduction of corresponding speech data to the reading management module 288.

Figure 34:
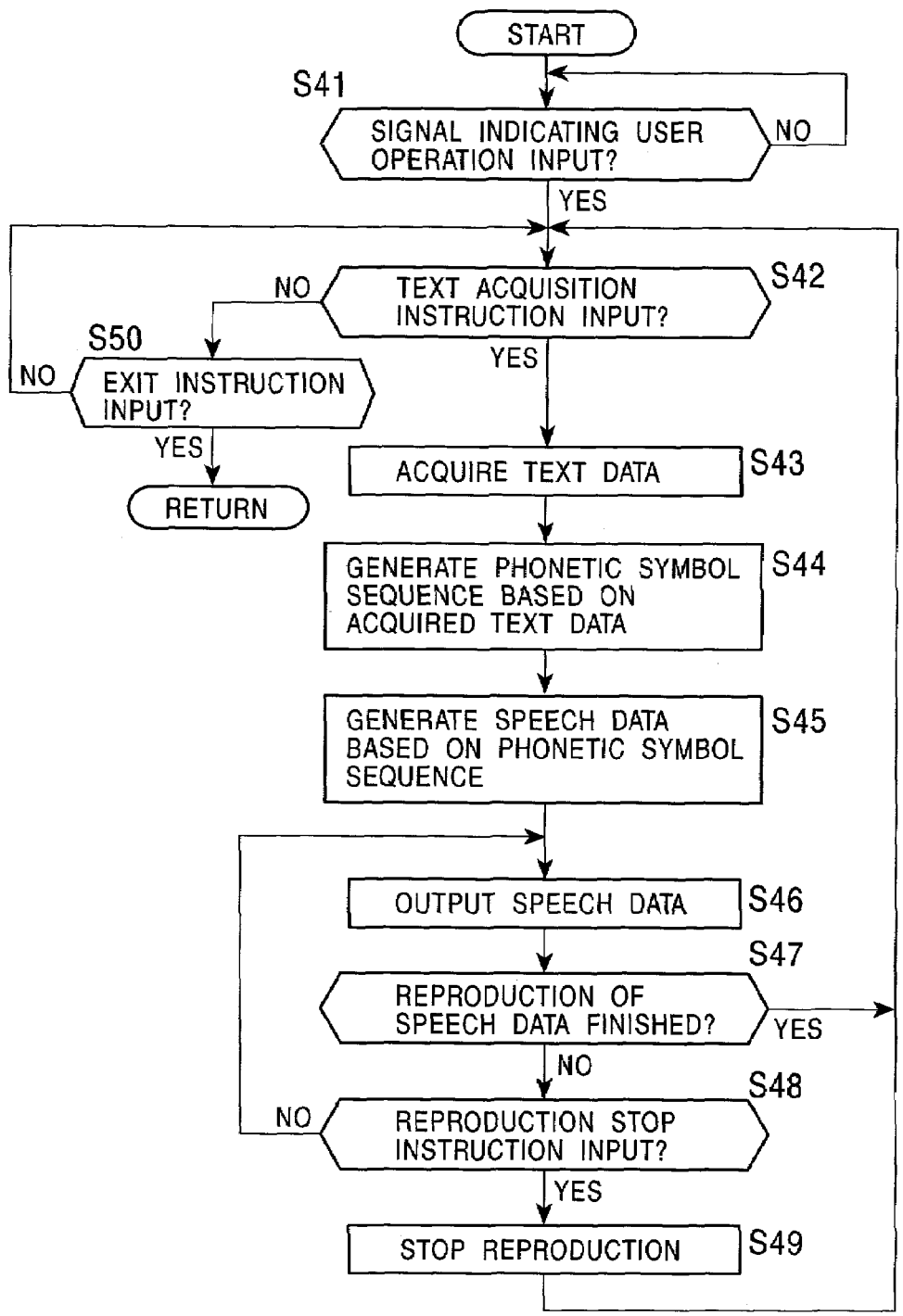
FIG. 34 is a flowchart of a speech reproduction process.

In step S8, a speech reproduction process to be described later with reference to FIG. 34 is executed, and the process is then exited.

If it is determined in step S5 that the user instruction is not for speech reproduction of an electronic mail, the user instruction is for output of speech data to an external apparatus. Thus, in step S8, the mail watcher application control unit 281 generates and outputs a signal requesting output of the corresponding speech data to an external apparatus to the mail watcher application control unit 281.

Figure 35:
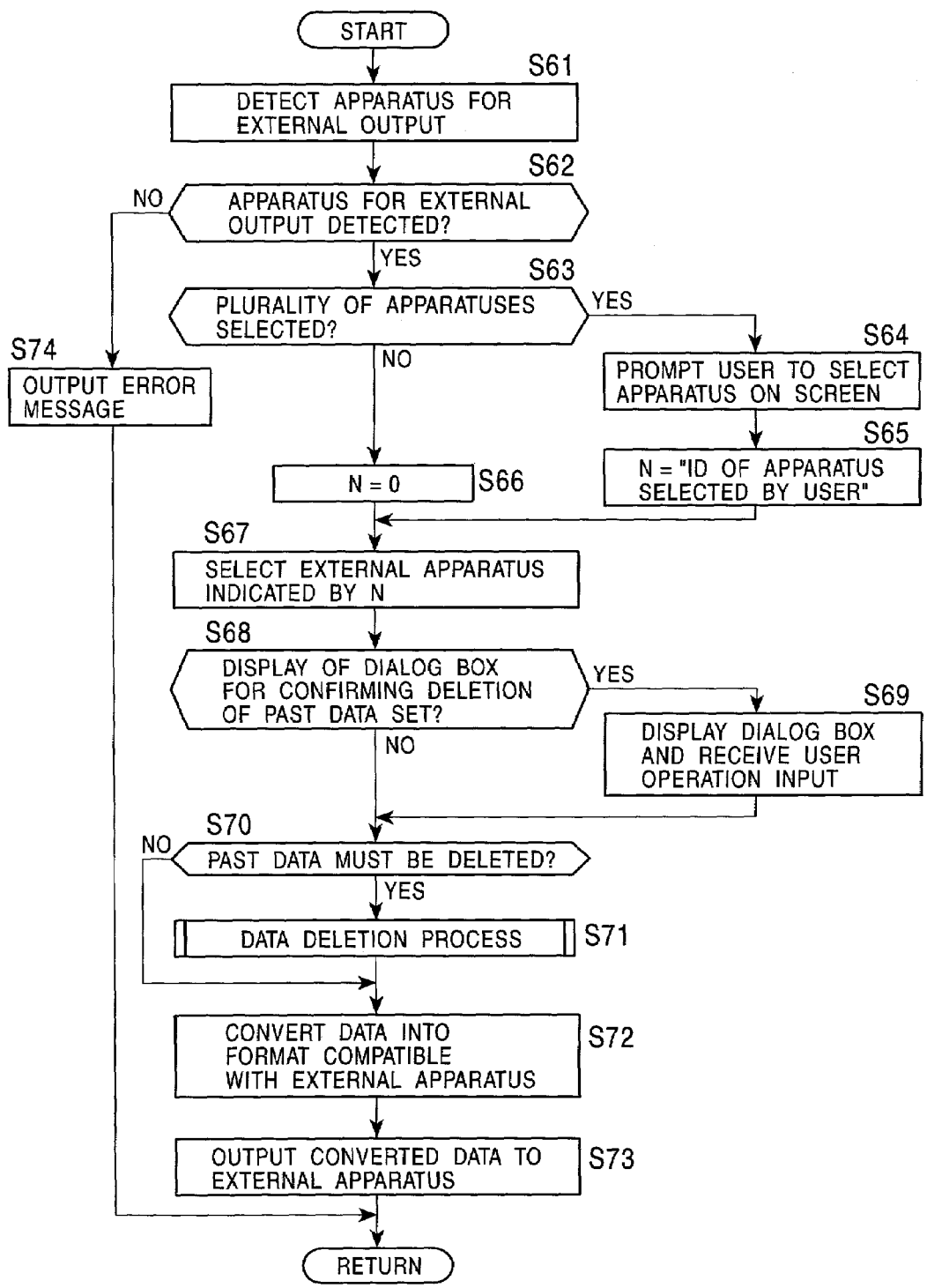
FIG. 35 is a flowchart of an external apparatus output process.

In step S10, an external apparatus output process to be described later with reference to FIG. 35 is executed, and the process is then exited.

If it is determined in step S2 that no unread mail is present in the MAPI mailer 282, in step S11, the mail watcher application control unit 281 generates a control signal for displaying a message saying "No unread mail," outputting it to the GUI control unit 283. The GUI control unit 283 displays a message window, not shown, showing a message saying "No unread mail," and the process is then exited.

Although the description has been made in relation to a case where an instruction for reading an unread mail or for outputting an unread mail to an external apparatus is received so that an unread mail is read from the MAPI mailer 282 and processed. In the case of reading a new mail or outputting a new mail to an external apparatus, substantially the same process is executed except that the MAPI mailer 282 reads a new mail, and thus description thereof will be omitted.

Next, a reading speech setting process, executed in step S3 in FIG. 29, will be described with reference to a flowchart shown in FIG. 32.

Figure 42:
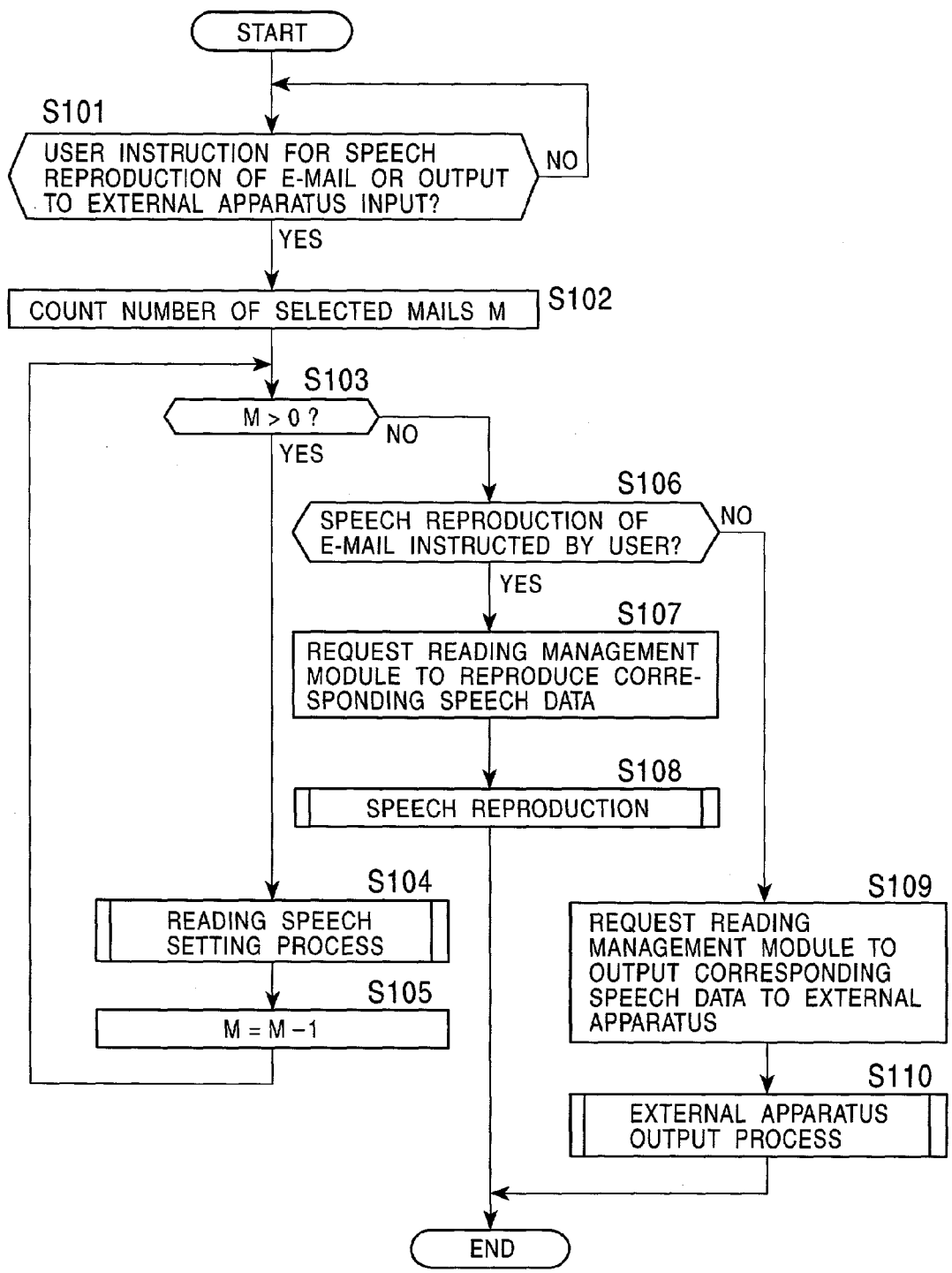
FIG. 42 is a flowchart of a process by a mail reader.

Although the following description will be made in relation to a reading speech setting process in a case where the mail watcher application control unit 281 converts an unread mail into speech data, for example, in a process by a mail reader, which will be described later with reference to FIG. 42, a mail reader application control unit 531 to be described later with reference to FIG. 38 executes substantially the same reading speech setting process.

In step S21, the mail watcher application control unit 281 acquires an electronic mail (an unread mail in this case) from the MAPI mailer 282.

In step S22, the mail watcher application control unit 281 outputs the acquired electronic mail to the mail filter 284 if the acquired electronic mail is in text format, and to the HTML tag filter 286 if the acquired electronic mail is in HTML format. The mail filter 284 and the HTML tag filter 286 filters the electronic mail with reference to the conversion table databases 285 and 287, respectively, outputting the result of the filtering to the mail watcher application control unit 281.

In step S23, the mail watcher application control unit 281 creates a chapter based on the result of the filtering and counts the number of sentences N. A chapter is a unit of information that forms a single unit of speech data (corresponding to a single file of speech data), and one chapter is created for each electronic mail. The electronic mail is separated sentence by sentence by the filtering by the mail filter 284 or the HTML tag filter 286, allowing the mail watcher application control unit 281 to count the number of sentences N.

In step S24, based on the result of the filtering, the mail watcher application control unit 281 determines a title of the chapter, i.e., information corresponding to song title or artist name in music data. In this case, the artist name is designated as "ONSEI" so that speech data generated from text data by speech synthesis can be distinguished from other types of information. It is to be understood, however, that the artist name can be any character string as log as it can be distinguished from other types of information, for example, the name of an application used for generating speech data from text data.

The title is determined with reference to the header of the electronic mail and items corresponding to checked ones of the check boxes 345 to 348 described with reference to FIG. 21. FIG. 33 shows an example of a header of an electronic mail.

A header of an electronic mail includes various information other than the body of the electronic mail. Main information in a header of an electronic mail includes, for example, destination address of the electronic mail (text 491 in FIG. 33), transmission time of the electronic mail (text 492), the source address of the electronic mail (text 493), the subject of the electronic mail (text 494), and the format of the electronic mail, i.e., information indicating text format or HTML format (text 495). The title is generated, for example, by concatenating text portions corresponding to checked ones of the check boxes 345 to 348 described with reference to FIG. 21 using "/" to form a single text.

If none of the check boxes 345 to 348 is checked, a predetermined character string (e.g. "ONSEI") is set as the title. If a predetermined character string is to be used as titles of a plurality of speech data, the speech data may be distinguished from each other by adding numerals after the predetermined character string, such as "AAA", "AAA2", and "AAA3".

Although the description is being made in relation to a case where the mail watcher application control unit 281 converts an unread mail into speech data, it is to be understood that, since the method of filtering differs from application to application, the method of determining a title may differ from application to application.

The title that has thus been set is used, for example, in a display for selecting speech data when the corresponding speech data is output to and reproduced by the portable music reproduction apparatus 271 or other apparatuses, similarly to the title of ordinary sound data (e.g., music data).

In step S25, the mail watcher application control unit 281 sets the title and text data for display in the reading management module 288. The reading control unit 301 of the reading management module 288 records the title and the text data for display that have been supplied in the display text database 317 via the text display unit 316.

In step S26, the mail watcher application control unit 281 sets voice 1 for reading of the first sentence of the chapter.

In step S27, the mail watcher application control unit 281 sets the value of a register i that indicates the line number of the line under processing in the chapter to 0.

In step S28, the mail watcher application control unit 281 determines whether the value of the register i is smaller than the number of sentences in the chapter N.

If it is determined in step S28 that the value of the register i is smaller than the number of sentences in the chapter N, in step S29, the mail watcher application control unit 281 acquires the next one sentence of text.

In step S30, the mail watcher application control unit 281 determines whether the text acquired has property different from that of the previous sentence (i.e., quotation or not, or at different nesting level of quotation) with reference to marks, etc. that have been attached at the time of filtering.

If it is determined in step S30 that the text acquired has property different from that of the previous sentence, in step S31, the mail watcher application control unit 281 changes voice from that for the previous sentence. That is, if the voice before the change in property is voice 1, the voice for the text acquired is changed to voice 2; conversely, if the voice before the change in property is voice 2, the voice for the text acquired is changed to voice 1.

In step S32, the mail watcher application control unit 281 forms a paragraph with the previous sentence as the last sentence thereof (the portion reproduced with the same voice without changing voice), starting a new paragraph with the text acquired in step S29.

If it is determined in step S30 that the text acquired does not have property different from that of the previous sentence, or after completion of the process of step S32, in step S33, text data for reading, generated by the processes of steps S29 to S32, is set in the reading management module 288. The reading control unit 301 of the reading management module 288 records the text data for reading in the reading text database 303 via the text management unit 302.

In step S34, the mail watcher application control unit 281 increments the value of the register i by one. The process then returns to step S28, repeating the subsequent processing steps.

Figure 29:
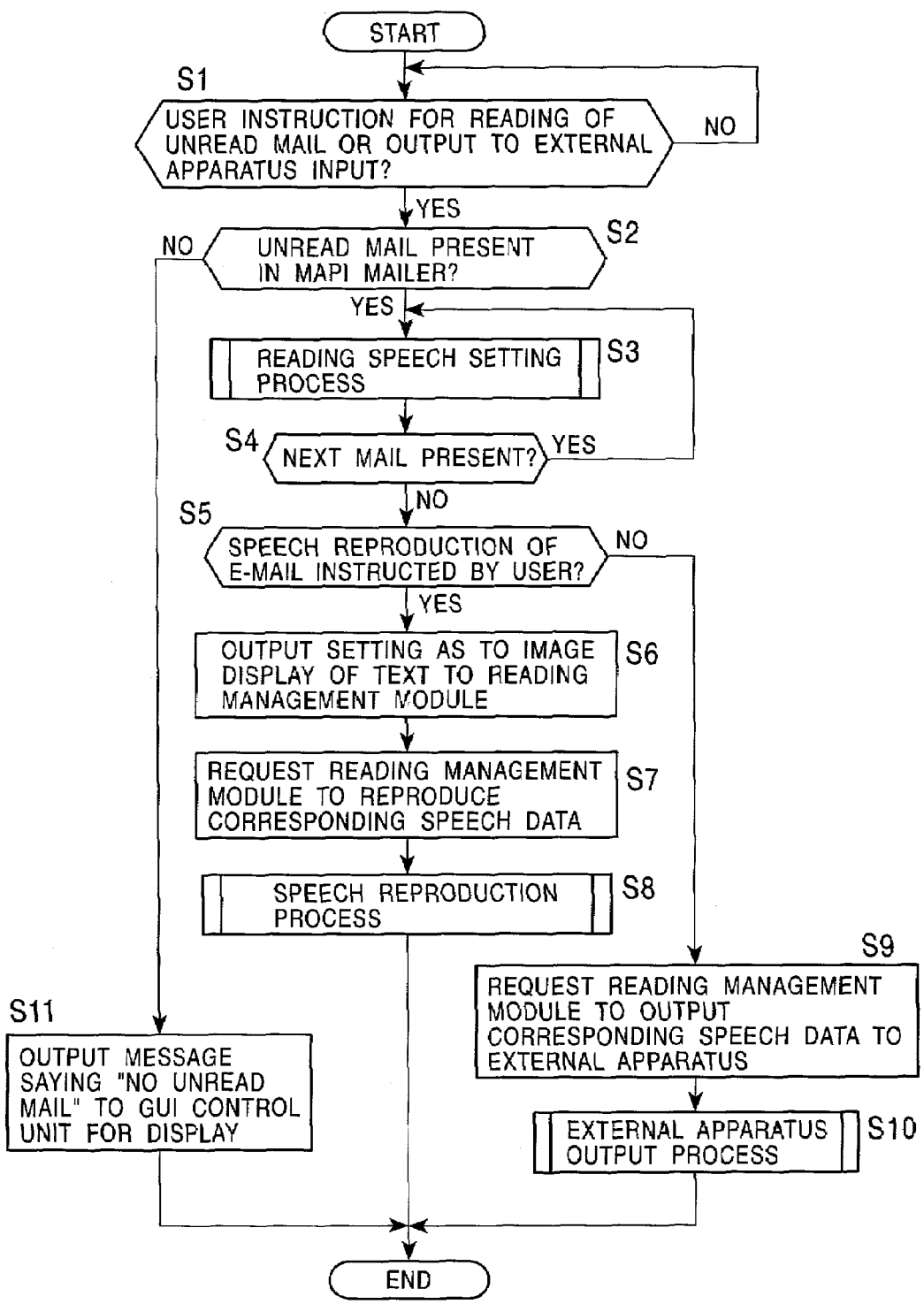
FIG. 29 is a flowchart of a process by a mail watcher.

If it is determined in step S28 that the value of the register i is not smaller than the number of sentences in the chapter N, the process proceeds to step S4 in FIG. 29. (If the reading speech setting process is executed in step S104 in FIG. 42 to be described later, the process proceeds to step S105 in FIG. 42.)

By the above process, the voice for reading an electronic mail is changed based on the property of text (in this example, quotation or not, or the nesting level of quotation).

Although the description has been made in relation to a case where two types of voice are used for reading of an electronic mail, it is to be understood that three or more types of voice may be used for reading.

Thus, since a quotation is often a part written by the user himself or a part hat has already been read, setting can be made such that the quotation part is read faster, reducing the time to be taken to read the electronic mail while allowing sufficient understanding of the content of the electronic mail.

Next, a speech reproduction process, executed in step S8 in FIG. 29, will be described with reference to a flowchart shown in FIG. 34.

Figure 47:
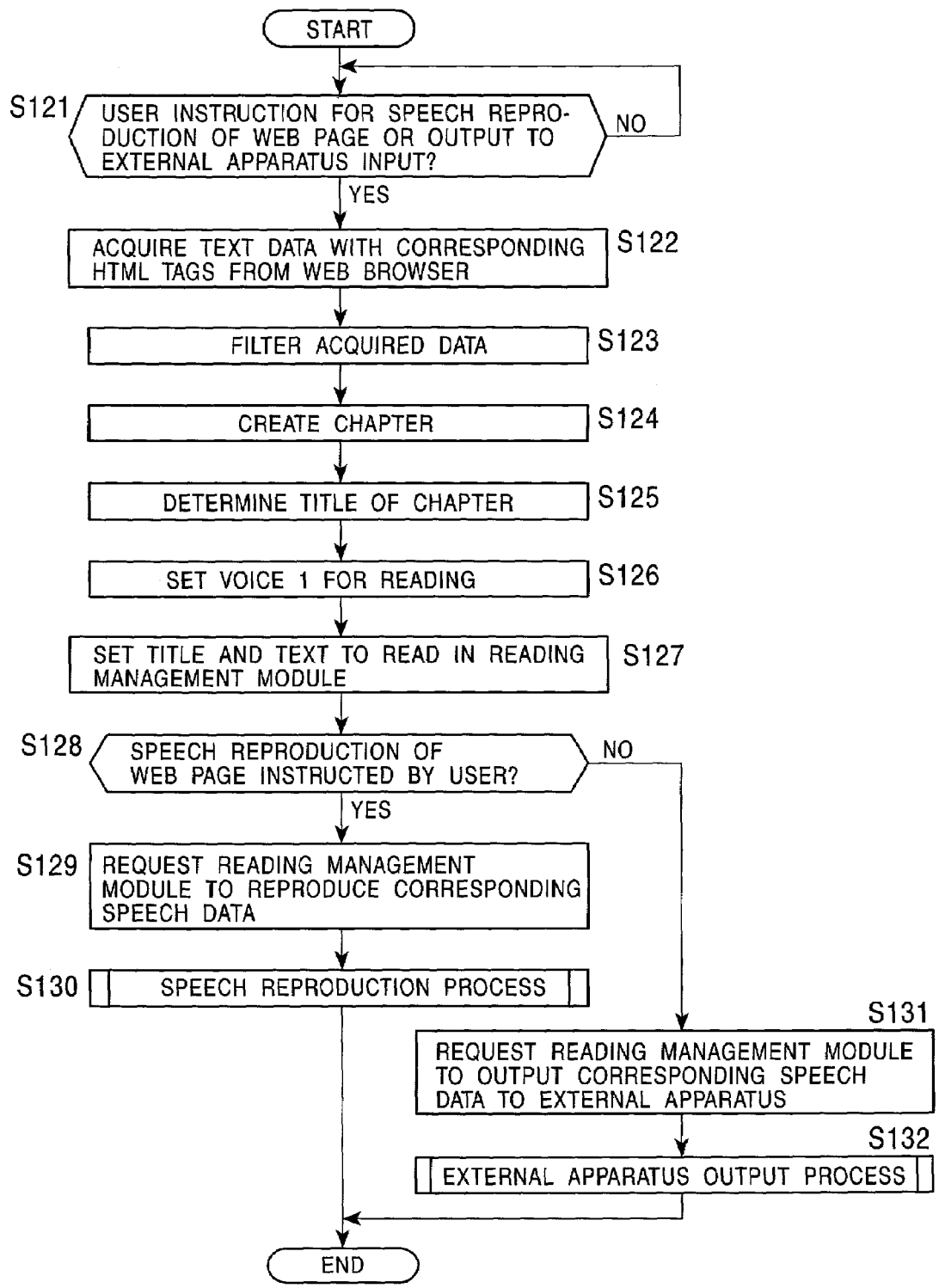
FIG. 47 is a flowchart of a process by a Web reader.
Figure 52:
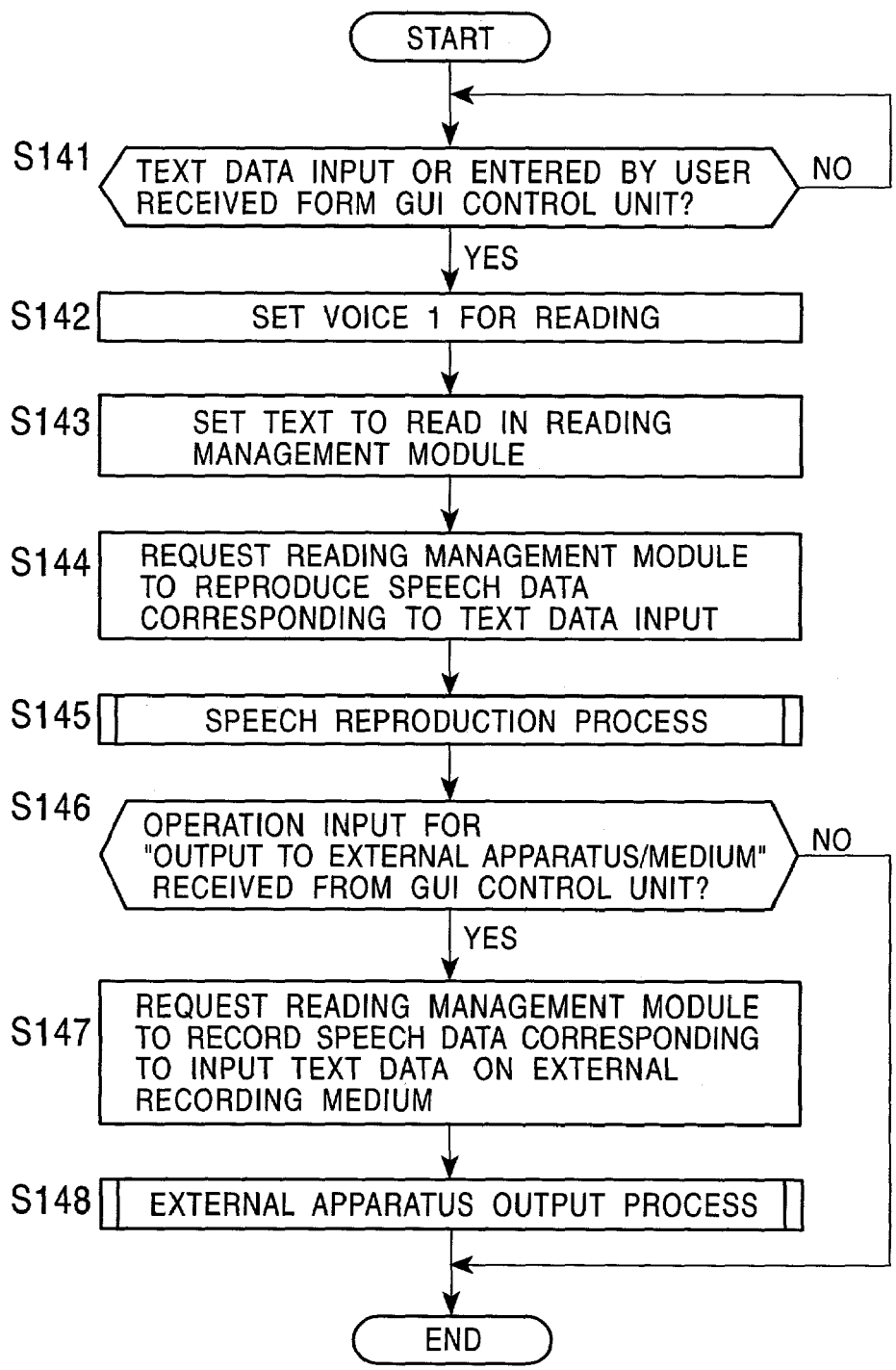
FIG. 52 is a flowchart of a text reading process.

Although the following description will be made in relation to a speech reproduction process in a case where the mail watcher application control unit 281 reproduces speech data corresponding to an electronic mail, substantially the same speech reproduction process is executed, for example, in step S108 in a process by a mail reader to be described later with reference to FIG. 42, in step S130 in a process by a Web reader to be described later with reference to FIG. 47, and in step S145 in a text reading process to be described later with reference to FIG. 52.

In step S41, the reading control unit 301 of the reading management module 288 determines whether a signal indicating a user operation has been input. If it is determined in step S41 that a signal indicating a user operation has not been input, the process of step S41 is repeated until input is detected.

Since the description is being made in relation to a speech reproduction process executed in step S8 in FIG. 29, a signal indicating a user operation is input from the mail watcher application control unit 281. In the case of a speech reproduction process executed in step S108 in a process by a mail reader to be described with reference to FIG. 42, a signal indicating a user operation is input from a mail reader application control unit 531 to be described later with reference to FIG. 38. Similarly, in the case of a speech reproduction process executed in step S130 in a process by a Web reader to be described later with reference to FIG. 47 or in step S145 in a text reading process to be described later with reference to FIG. 52, a signal indicating a user operation is input from a Web reader application control unit 591 to be described later with reference to FIG. 43 or a text reading application control unit 641 to be described later with reference to FIG. 49.

If it is determined in step S41 that a signal indicating a user operation has been input, in step S42, the reading control unit 301 determines whether an instruction for acquiring text has been input based on the signal indicating a user operation.

If it is determined in step S42 that an instruction for acquiring text has been input, in step S43, the reading control unit 301 generates a control signal for acquiring text data from the reading text database 303, and outputting it to the text management unit 302. The text management unit 302 acquires text data from the reading text database 303, outputting it to the reading control unit 301.

In step S44, the text parsing unit 306 receives input of the text data acquired from the reading control unit 301, parses the text data to divide it into words, and generates a phonetic symbol sequence (prosody information) with reference to dictionary data registered in the dictionary database 305 and the conversion rule registered in the conversion rule database 307, outputting it to the speech synthesis unit 308.

In step S45, the speech synthesis unit 308 generates synthetic speech data based on phoneme data registered in the phoneme database 309 according to the phonetic symbol sequence supplied from the text parsing unit 306, outputting it to the speech setting unit 310. The speech setting unit 310 adjusts the synthetic speech data in accordance with the detailed speech settings that have been made using the setting levers 382 to 394 described with reference to FIG. 23, thereby generating speech data to be reproduced. The speech data thus generated is supplied to the reproduction control unit 311, and stored in the speech database 312.

In step S46, the reproduction control unit 311 sequentially reads speech data stored in the speech database 312, outputting it to the speaker 65.

In step S47, the reproduction control unit 311 determines whether reproduction of the speech data being reproduced has been finished based on whether speech data of the same chapter as the speech data being reproduced remains in the speech database 312. If it is determined that the reproduction of the speech data being reproduced has been finished, the process returns to step S42, repeating the subsequent processing steps.

If it is determined in step S47 that the reproduction of the speech data being reproduced has not been finished, in step S48, the reproduction control unit 311 determines whether a reproduction stop instruction has been input based on a control signal corresponding to a user operation, input from the reading control unit 301. If it is determined in step S48 that a reproduction stop instruction has not been input, the process returns to step S46, repeating the subsequent processing steps.

If it is determined in step S48 that a reproduction stop instruction has been input, in step S49, the reproduction control unit 311 stops the reproduction, i.e., stops output of the speech data recorded in the speech database 312 to the speaker. After completion of the process of step S49, the process returns to step S42, repeating the subsequent processing steps.

If it is determined in step S42 that an instruction for acquiring text has not been input, in step S50, the reading control unit 301 determines whether an exit instruction has been input.

Since the description is being made in relation to a speech reproduction process executed in step S8 in FIG. 29, an exit instruction is input from the mail watcher application control unit 281 according to a user operation input from the GUI control unit 283. In the case of speech reproduction process executed in step S108 in a process by a mail reader to be described later with reference to FIG. 42, a signal indicating a user operation is input from a mail reader application control unit 531 to be described later with reference to FIG. 38. Similarly, in the case of a speech reproduction process executed in step S130 in a process by a Web reader to be described later with reference to FIG. 47 or in step S145 in a text reading process to be described later with reference to FIG. 52, a signal indicating a user operation is input from a Web reader application control unit 591 to be described later with reference to FIG. 43 or a text reading application control unit 641 to be described later with reference to FIG. 49.

If it is determined in step S50 that an exit instruction has not been input, the process returns to step S42, repeating the subsequent processing steps. If it is determined in step S50 that an exit instruction has been input, the process is exited. (If the speech reproduction process is executed in step S108 in FIG. 42 to be described later, the process is exited; if executed in step S130 in FIG. 47 to be described later, the process is exited; and if executed in step S145 in FIG. 52 to be described later, the process proceeds to step S146 in FIG. 52.)

By the process described above, speech data generated by converting text data is reproduced according to an operation input by the user.

Next, an external apparatus output process, executed in step S10 in FIG. 29, will be described with reference to a flowchart shown in FIG. 35.

Although the following description will be made in relation to a case where the mail watcher application control unit 281 outputs speech data corresponding to an electronic mail to an external apparatus, substantially the same external apparatus output process is executed, for example, in step S110 in a process by a mail reader to be described later with reference to FIG. 42, step S132 in a process by a Web reader to be described later with reference to FIG. 47, and in step S148 in a text reading process to be described later with reference to FIG. 52.

In step S61, the reading control unit 301 generates a control signal for detecting whether an external apparatus (including an external storage apparatus such as the memory stick 131) that is currently communicative with the personal computer 2, to which the output will be directed, exists, outputting it to the external apparatus output unit 315. The external apparatus output unit 315 detects whether a speech storage apparatus 294 (e.g., the memory stick 131, the PDA 4, the camera-equipped digital cellular phone 5, or the portable music reproduction apparatus 271) that is currently allowed to exchange data with the external apparatus output module 293 exists, outputting the result to the reading control unit 301.

In step S62, the reading control unit 301 determines whether an external apparatus to which the output is to be directed has been detected in step S61 based on the signal input from the external apparatus output unit 315.

If it is determined that an external apparatus to which the output is to be directed has been detected, in step S63, the reading control unit 301 determines whether a plurality of apparatuses has been detected in step S61.

If it is determined in step S63 that a plurality of apparatuses has been detected in step S61, in step S64, the reading control unit 301 generates a control signal for displaying a screen for selecting an apparatus to which the output is to be directed, outputting it to the GUI control unit 283 via the mail watcher application control unit 281. The GUI control unit 283 displays on the LCD 25 the screen for selecting an external apparatus to which the output is to be directed, and receives input of a user operation for selecting an apparatus from the jog dial 23, the keyboard 24, or the touch pad 26, outputting it to the mail watcher application control unit 281.

Since the description is being made in relation to an external apparatus output process executed in step S10 in FIG. 29, in step S63, the control signal for displaying a screen for selecting an external apparatus to which the output is to be directed is output to the GUI control unit 283 via the mail watcher application control unit 281. In the case of an external apparatus output process executed in step S110 in FIG. 42 to be described later, the control signal for displaying the screen for selecting an external apparatus to which the output is to be directed is output to a GUI control unit 533 via a mail reader application control unit 531 to be described later with reference to FIG. 38. In the case of an external apparatus output process executed in step S132 in FIG. 47 to be described later, the control signal for displaying the screen for selecting an external apparatus to which the output is to be directed is output to a GUI control unit 593 via a Web reader application control unit 591 to be described later with reference to FIG. 43. In the case of an external apparatus output process executed in step S148 in FIG. 52 to be described later, the control signal for displaying the screen for selecting an external apparatus to which the output is to be directed is output to a GUI control unit 642 via a text reading application control unit 641 to be described later with reference to FIG. 49.

In step S65, the reading control unit 301 sets the value N of an internal register for selection of an external apparatus to the ID of an apparatus selected by the user.

If it is determined in step S63 that a plurality of apparatuses has not been detected (i.e., a single apparatus has been detected) in step S61, in step S66, the reading control unit 301 sets the value N of the internal register for selection of an external apparatus to 0. If the value N of the register is 0, it indicates that only a single apparatus is ready for output of speech data.

After completion of the process of step S65, or after completion of the process of step S66, in step S67, the reading control unit 301 selects the external apparatus indicated by the value N of the register.

In step S68, the reading control unit 301 determines whether display of a dialog box for confirming deletion of past data is set, i.e., the check box 461 in the setting screen 331 described with reference to FIG. 27 is checked.

Figure 36:
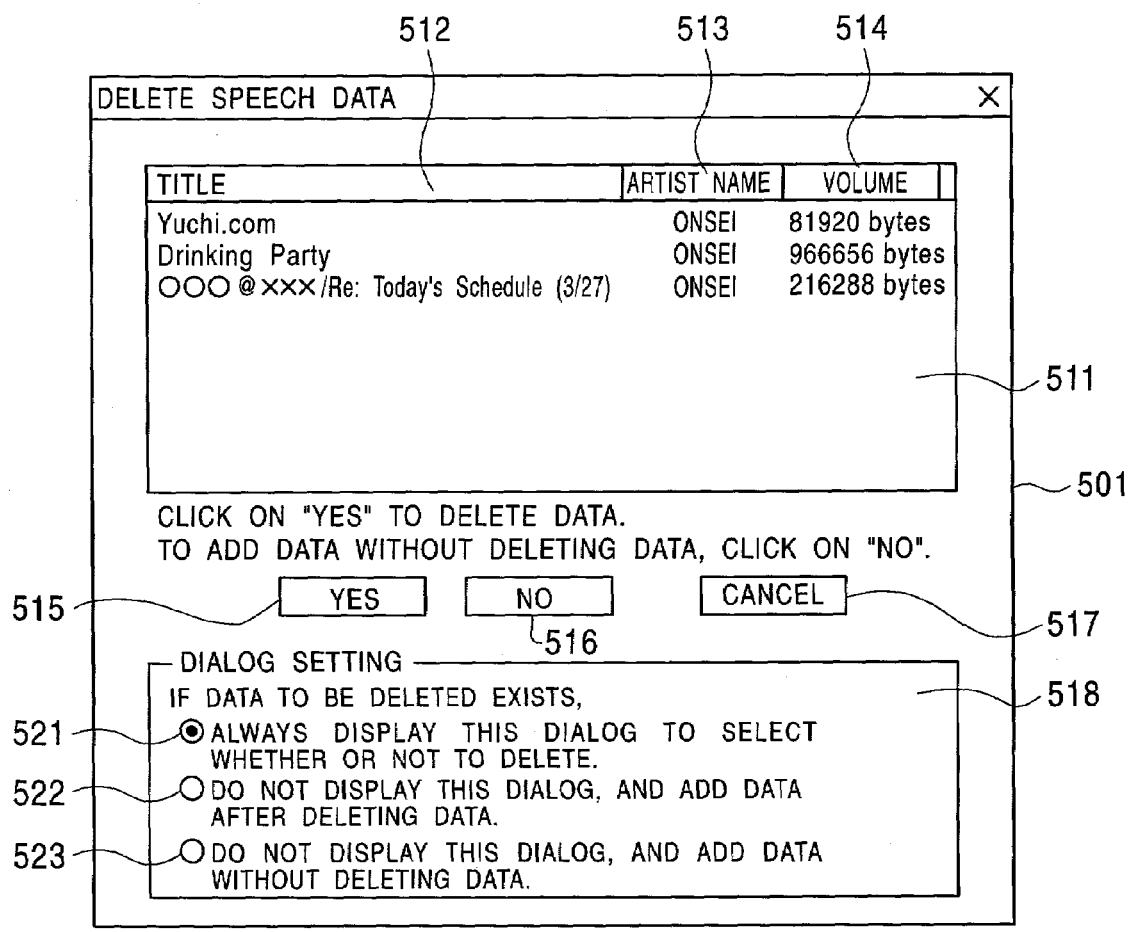
FIG. 36 is an illustration of a dialog box.

If it is determined in step S68 that display of a dialog box for confirming deletion of past data is set, in step S69, the reading control unit 301 displays a dialog box 501 shown in FIG. 36 to receive an operation input from the user.

FIG. 36 shows an example display of the dialog box 501. In a display area 511, a list of data with an artist name of "ONSEI" in information recorded in the external apparatus or external recording medium to which the music data is to be output is displayed. In the fields of display area 511, title 512, artist name 513, and volume 514 are displayed.

Data with the artist name 513 being "ONSEI" includes speech data generated by processes by a mail reader application, a Web reader application, and a text reading application to be described later, as well as a process by the mail watcher application. The title 512 in display is the one determined in step S24 in the reading speech setting process described with reference to FIG. 32.

If the user selects a "Yes" button 515, data with the artist name being "ONSEI" displayed in the display area 511 is deleted from the associated speech storage apparatus 294, and new speech data is recorded.

If the user selects a "No" button 516, the data with the artist name being "ONSEI" displayed in the display area 511 is not deleted from the associated speech storage apparatus 294, and new speech data is recorded in a region where no data has been recorded.

If the user selects a "Cancel" button 517, the instruction for outputting the speech data to the external apparatus is cancelled, and the dialog box 501 is exited.

In a dialog setting area 518, radio buttons 521 to 523 for making setting as to display of the dialog box 501 are provided. The radio buttons 521 to 523 are arranged such that only one of them can be selected.

If the radio button 521 is selected, in an external apparatus output process executed next time, if any data to be deleted exists in the speech storage apparatus 294, the dialog box 501 is always displayed so that whether or not to delete the data is determined according to a user operation input. If the radio button 522 is selected, in an external apparatus output process executed next time, if any data to be deleted exists in the speech storage apparatus 294, the dialog box 501 is not displayed, and new speech data is recorded after deleting the data. If the radio button 523 is selected, in an external apparatus output process executed next time, even if data to be deleted exits in the speech storage apparatus 294, the dialog box 501 is not displayed, and new speech data is additionally recorded without deleting the data.

If it is determined in step S68 that display of a dialog box for confirming deletion of past data is not set, or after completion of the process of step S69, in step S70, the reading control unit 301 determines whether past data must be deleted based on the setting in the dialog setting area 518 in the dialog box 501 described with reference to FIG. 36 or the user operation input in step S69.

Figure 37:
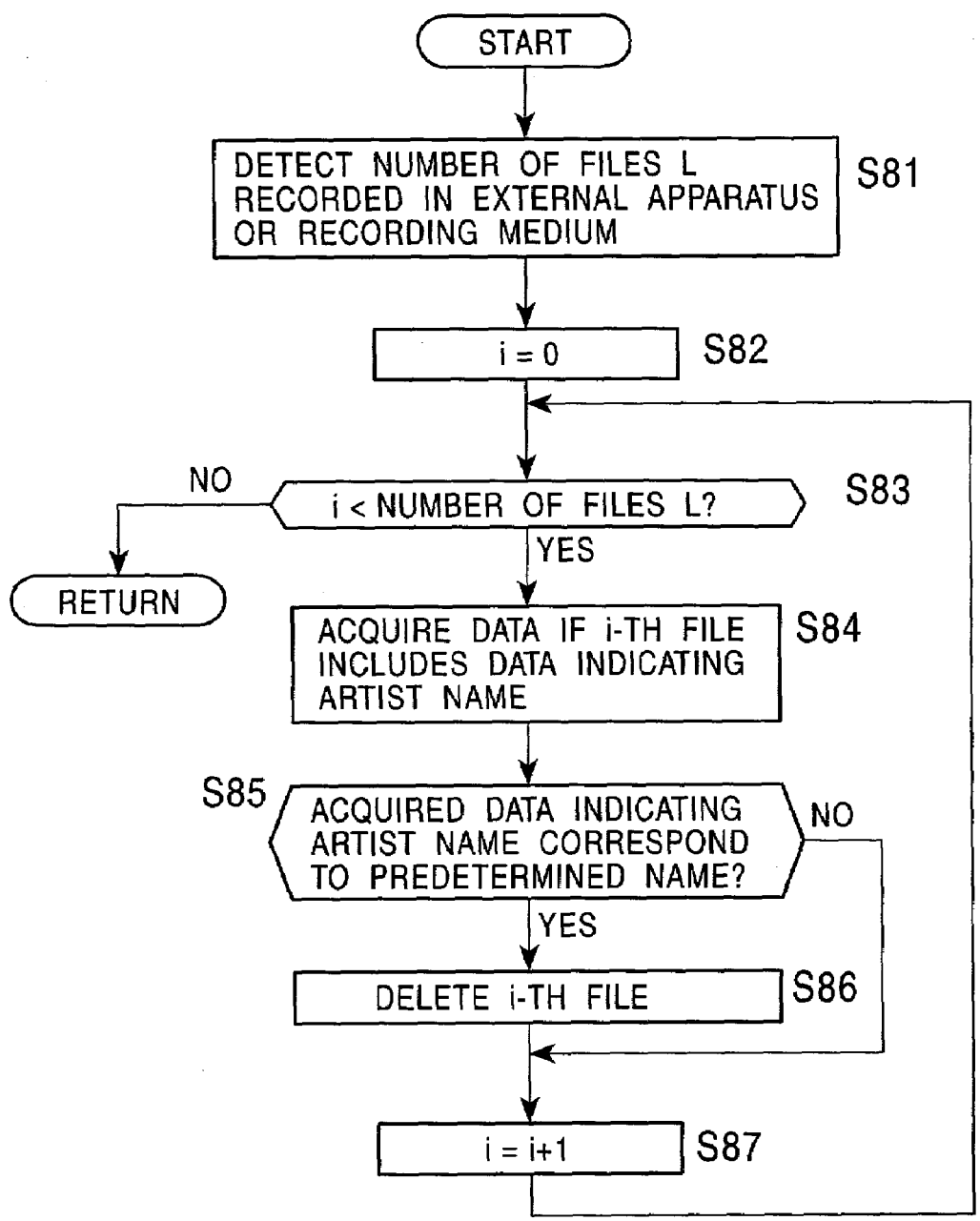
FIG. 37 is a flowchart of a data deletion process.

If it is determined in step S70 that past data must be deleted, in step S71, a data deletion process to be described later with reference to FIG. 37 is executed.

If it is determined in step S70 that past data need not be deleted, or after completion of the process of step S71, in step S72, the reading control unit 301 converts the relevant speech data into a format compatible with the speech storage apparatus 294 to which the output is directed.

That is, the reading control unit 301 generates a control signal for outputting, according to an external output instruction, speech data recorded in the speech database 312 to the data conversion unit 314 via the external apparatus output unit 315, outputting it to the reproduction control unit 311, and also generates a control signal for converting the speech data into a format compatible with the speech storage apparatus 294, outputting it to the data conversion unit 314. The reproduction control unit 311 searches the speech database 312 for the relevant speech data according to the control signal input thereto, outputting it to the data conversion unit 314 via the external apparatus output unit 315. The data conversion unit 314 exchanges information with the data conversion module 293 as required, and converts the speech data input thereto into a compatible data format, supplying it to the external apparatus output unit 315.

In step S73, the external apparatus output unit 315 outputs the converted data to the external apparatus, i.e., the speech storage apparatus 294, via the external apparatus output module 293, and the process is then exited.

If it is determined in step S62 that an external apparatus to which the output is to be directed has not been detected, in step S74, the reading control unit 301 generates a control signal for outputting an error message, outputting it to the GUI control unit 283 via the mail watcher application control unit 281. The GUI control unit 283 displays the error message on the LCD 25, and the process is then exited.

Since the description is being made in relation to an external apparatus output process executed in step S10 in FIG. 29, the control signal for displaying an error message is output to the GUI control unit 283 via the mail watcher application control unit 281 in step S74. In the case of an external apparatus output process executed in step S110 in FIG. 42 to be described later, the control signal for outputting an error message is output to a GUI control unit 533 via a mail reader application control unit 531 to be described later with reference to FIG. 38. In the case of an external apparatus output process executed in step S132 in FIG. 47 to be described later, the control signal for outputting an error message is output to a GUI control unit 593 via a Web reader application control unit 591 to be described later with reference to FIG. 43. In the case of an external apparatus output process executed in step S148 in FIG. 52 to be described later, the control signal for outputting an error message is output to a GUI control unit 642 via a text reading application control unit 641 to be described later with reference to FIG. 49.

Furthermore, since the description is being made in relation to an external apparatus output process executed in step S10 in FIG. 29, the process is described as being exited after completion of the process of step S73 or step S74. In the case of an external apparatus output process executed in step S110 in FIG. 42 to be described later, in step S132 in FIG. 47 to be described later, or in step S148 in FIG. 52 to be described later, the process is also exited.

By the process described above, speech data generated by converting text data is output to and recorded on the speech storage apparatus 294, i.e., an external apparatus or external recording medium to which the speech data is directed, for example, the memory stick 131, the PDA 4, the camera-equipped digital cellular phone 5, or the portable music reproduction apparatus 271.

Next, a data deletion process, executed in step S71 in FIG. 35, will be described with reference to a flowchart shown in FIG. 37.

In step S81, the external apparatus output unit 315 detects the number of files L recorded in the speech storage apparatus 293, i.e., an external apparatus or external recording medium to which the output is directed, for example, the memory stick 131, the PDA 4, the camera-equipped digital cellular phone 5, or the portable music reproduction apparatus 271, via the external apparatus output module 293.

In step S82, the external apparatus output unit 315 sets the value i of a register indicating the number of songs under deletion process to 0. In step S83, the external apparatus output unit 315 determines whether the value i of the register is smaller than the number of files L.

If it is determined in step S83 that the value i of the register is smaller than the number of files L, in step S84, the external apparatus output unit 315 acquires data of an i-th file if the data includes an artist name.

In step S85, the external apparatus output unit 315 determines whether the data indicating an artist name, acquired in step S84, corresponds to a predetermined name ("ONSEI" in this case).

If it is determined in step S85 that the acquired data indicating an artist name corresponds to the predetermined name, in step S86, the external apparatus output unit 315 deletes the i-th file.

If it is determined in step S85 that the acquired data indicating an artist name does not correspond to the predetermined artist name, or after completion of the process of step S86, in step S87, the external apparatus output unit 315 increments the value i of the register by one, and the process then returns to step S83, repeating the subsequent processing steps.

If it is determined in step S83 that the value i of the register is not smaller than the number of files L, i.e., if it is determined that the process has been finished for all the files, the process returns to step S72 in FIG. 35.

Figure 38:
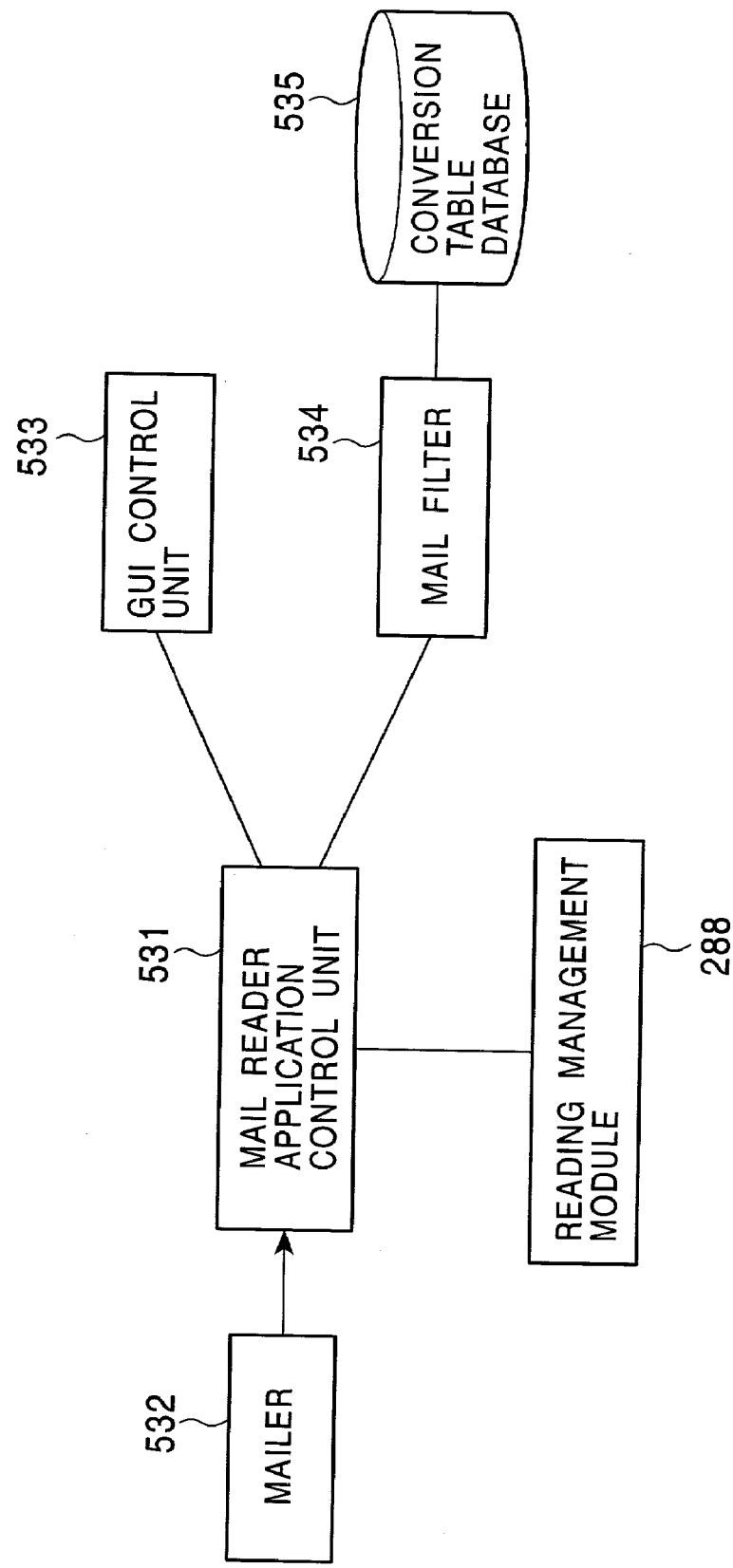
FIG. 38 is a functional block diagram in relation to a mail reader application being activated.

FIG. 38 is a functional block diagram in relation to a mail reader application, which is one of the application programs 67H recorded in the HDD 67 described with reference to FIG. 6, being loaded in the RAM 54 and executed by the CPU 51 in the personal computer 2.

A mail reader application control unit 531, when a mailer (need not be an MAPI mailer) 352 corresponding to the electronic mail program 67A in FIG. 6 is activated, reads data of an electronic mail according to a user operation, and executes various operations based on user settings supplied from a GUI control unit 533.

When the mail reader application control unit 531 executes the processes, the mailer 352 must be activated (i.e., the electronic mail program 67A must be loaded in the RAM 54 and executed by the CPU 51).

The GUI control unit 533, under the control of the mail reader application control unit 531, controls display of GUI components such as dialog boxes and display windows for making various settings of a mail reader application to be described later. Also, the GUI control unit 533 generates a signal indicating an operation input executed by the user on the GUI in display, supplying it to the mail reader application control unit 531.

A mail filter 534 executes substantially the same process as the mail filter of the mail watcher application control unit 281 described with reference to FIG. 15. That is, the mail filter 534 filters the body of an electronic mail written in text format based on a conversion table stored in a conversion table database 535.

The conversion table database 535 stores symbols added to indent portions, which indicates quotations in the body of an electronic mail when a received electronic mail is replied to or transferred, such as ">", "|", and ":". The information stored in the conversion table database 535 may be the same as or different from the information stored in the conversion table database 285. That is, the information stored in the conversion table database 535 and the conversion table database 285 is determined according to the kinds of symbols that can be used as indents in a reply in settings of the corresponding mailers.

The mail filter 534 executes substantially the same process as the mail filter of the mail watcher application control unit 281 described with reference to FIG. 15. That is, the mail filter 534 divides (e.g., adds marks to) the body of the electronic mail by authors based on symbols added to each line of the body of the electronic mail and the number of occurrences of the symbol. For example, when an electronic mail shown in FIG. 16 is supplied, the mail filter 534 divides it into a text A (a portion written by the sender herein), which is the beginning portion of the body of the electronic mail; a text B (a quotation herein), which differs from the text A; a text C, which differs from the text B (in the number of symbols in quotation); a text D, which differs from the text C (in the number of symbols in quotation); and a text E (a portion written by the sender herein), which differs from the text D.

Figure 39:
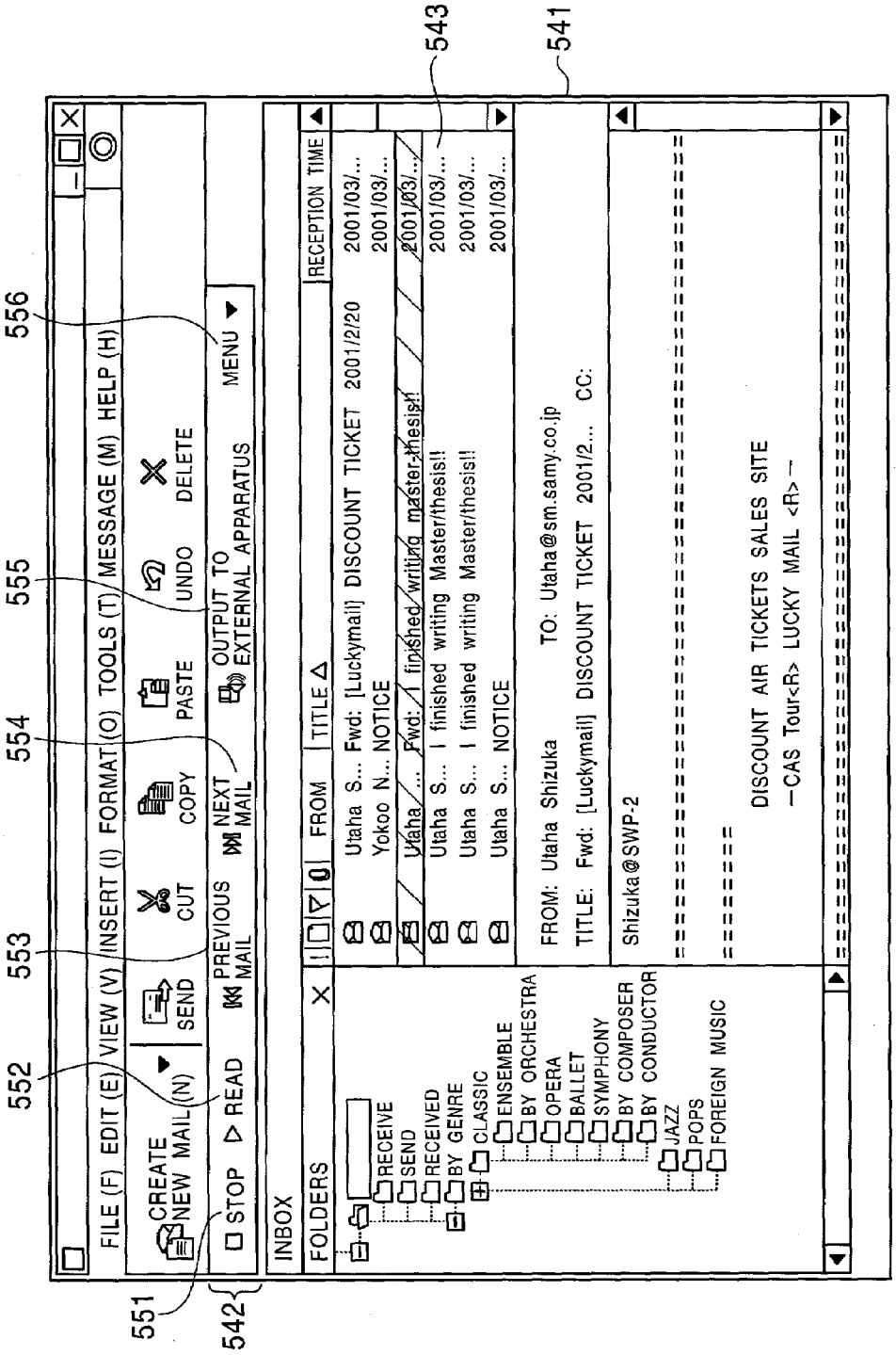
FIG. 39 is an illustration of a mailer display screen in which a mail reader tool bar is displayed.

FIG. 39 shows a display screen in a case where the mailer 532 and a mail reader application is activated.

In a mailer display screen 541, in addition to components of an ordinary mailer 352, a mail reader tool bar 542 is displayed, on which various buttons that are used when reproducing an electronic mail selected from electronic mails displayed in an electronic mail list display area 543 in which a list of electronic mails in a folder is displayed (it is to be understood that a plurality of electronic mails may be selected) in the form of speech, or outputting it to an external apparatus.

A stop button 551 is selected when stopping reproduction of speech data. A reading button 552 is selected when reading the content of a selected electronic mail, i.e., when reproducing speech data. A previous mail button 553 is selected when reproducing an electronic mail immediately preceding the electronic mail currently under reproduction or reproduction of which is suspended. A next mail button is selected when reproducing an electronic mail next to the electronic mail currently under reproduction or reproduction of which is suspended.

An output to external apparatus button 555 is selected when outputting speech data corresponding to a selected electronic mail to the speech storage apparatus 294 for recording thereon by the same process as the process described with reference to FIG. 35. A menu button 556 is selected when displaying a list box including various menus for instructing operations, for example, for displaying a setting window 561 to be described later with reference to FIG. 40.

When the menu button 556 is selected, a list box of various menus including "setting" item is displayed. If the user selects the "setting" item, a signal indicating the user operation is input from the GUI control unit 533 to the mail reader application control unit 531. The mail reader application control unit 531 generates a control signal for displaying a setting window 561 shown in FIG. 40, outputting it to the GUI control unit 533 to display the setting window 561.

As opposed to the setting window 331 described with reference to FIGS. 21 to 28, the setting window 561 shown in FIG. 40 has only two types of display screen, so that the setting window 561 includes only two tabs, namely, a reading tab 571 and an output to external apparatus/medium tab 572.

Figure 40:
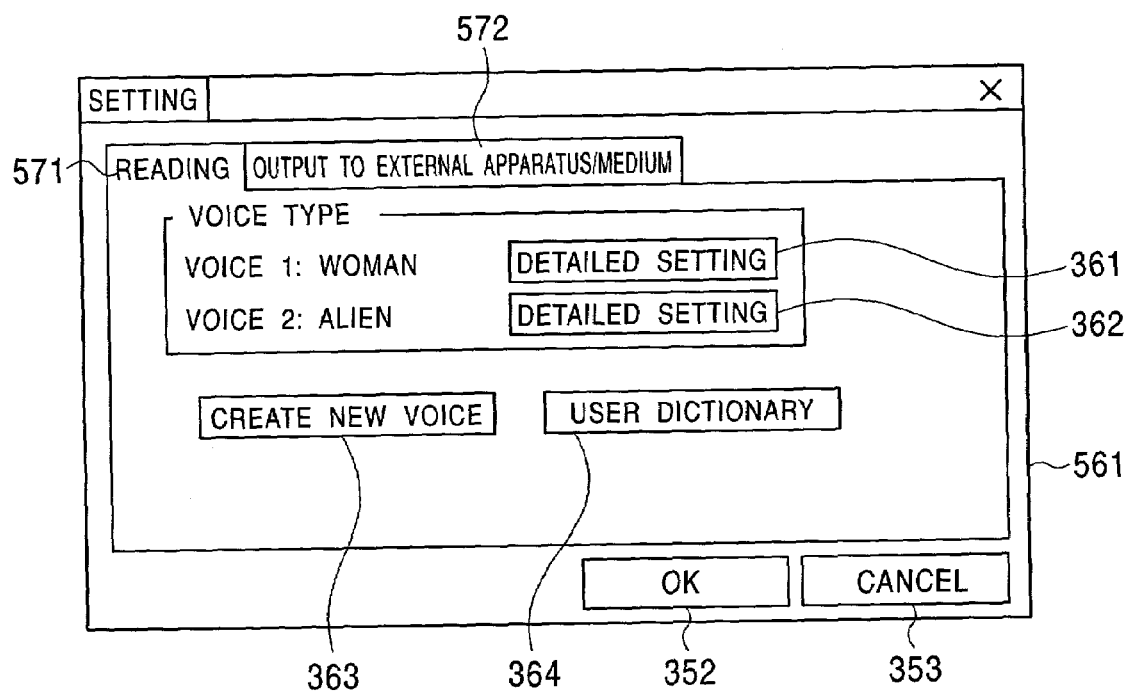
FIG. 40 is an illustration of a setting window that is displayed when a reading tab is selected.

FIG. 40 shows the setting window 561 in a case where the reading tab 571 is selected. An OK button 352, a cancel button 353, and detailed setting button 361 to user dictionary button 364 displayed in this case are substantially the same as their counterparts in FIG. 22, and descriptions thereof will be omitted.

Figure 41:
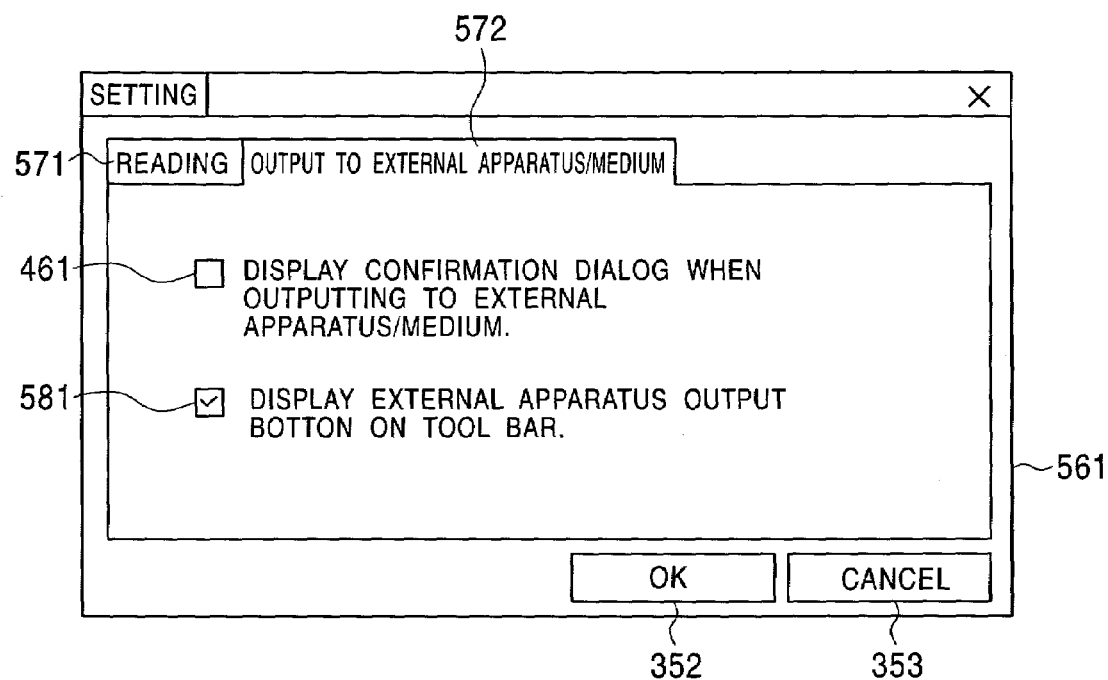
FIG. 41 is an illustration of a setting window that is displayed when an output to external apparatus/medium tab is selected.

FIG. 41 shows the setting window 561 in a case where the output to external apparatus/medium tab 572 is selected. A check box 461 displayed in this case is substantially the same as its counterpart in FIG. 27, and description thereof will be omitted. When a check box 581 is checked, the output to external apparatus button 555 described with reference to FIG. 39 is displayed on the tool bar 542, and when the check box 581 is not checked, the output to external apparatus button 555 is not displayed on the tool bar 542.

Next, a process executed by the CPU 51 when the mail reader application is loaded in the RAM 54 will be described with reference to a flowchart shown in FIG. 42.

In step S101, the mail reader application control unit 531 determines whether an instruction for speech reproduction of an electronic mail or for output of an electronic mail to an external apparatus has been input, i.e., the reading button 552, the previous mail button 553, the next mail button 554, or the output to external apparatus button 555 has been selected, based on the signal indicating a user operation, input from the GUI control unit 533. If it is determined in step S101 that an instruction for speech reproduction of an electronic mail nor for output of an electronic mail to an external apparatus has not been input, the process of step S101 is repeated until an instruction for one of the operations is input.

If it is determined in step S101 that an instruction for speech reproduction of an electronic mail or output of an electronic mail to an external apparatus has been input, in step S102, the mail reader application control unit 531 counts the number of electronic mails M selected from a list of electronic mails displayed in the electronic mail list display area 543 in the mailer display screen 541, based on the signal indicating a user operation, input from the GUI control unit 533, storing it in an internal register. For example, in a state shown in FIG. 39, the number of selected electronic mails M=1.

In step S103, the mail reader application control unit 531 determines whether the value M of the register is greater than 0.

If it is determined in step S103 that the value M of the register is greater than 0, in step S104, a reading speech setting process, described with reference to a flowchart shown in FIG. 32, is executed.

In step S105, the mail reader application control unit 531 decrements the value M of the register by one, and the process then returns to step S103.

If it is determined in step S103 that the value M of the register is not greater than 0, in step S106, the mail reader application control unit 531 determines whether the user instruction received in step S101 is for speech reproduction of an electronic mail.

If it is determined in step S106 that the user instruction is for speech reproduction of an electronic mail, in step S107, the mail reader application control unit 531 generates a control signal for requesting reproduction of corresponding speech data, outputting it to the reading management module 288.

In step S108, the speech reproduction process described with reference to the flowchart shown in FIG. 34 is executed, and the process is then exited.

If it is determined in step S106 that the user instruction is not for speech reproduction of an electronic mail, the user instruction is for output of speech data to an external apparatus. Thus, in step S109, the mail reader application control unit 531 generates a control signal requesting output of corresponding speech data to an external apparatus, outputting it to the reading management module 288.

In step S110, the external apparatus output process described with reference to the flowchart shown in FIG. 35 is executed, and the process is then exited.

As described with reference to FIG. 42, by the process by the mail reader application, of electronic mails received in the process by the mailer 532, information of electronic mails desired by the user is converted into speech data so that the speech data will be reproduced or output to external apparatus.

Furthermore, in the process, predetermined information, for example, the subject of an electronic mail, is selected and set as a title of speech data output to an external apparatus, regardless of setting by the user. Also in this case, similarly to the process by the mail watcher application described earlier, the arrangement may be such that information used for determining a title is selected by the user.

Figure 43:
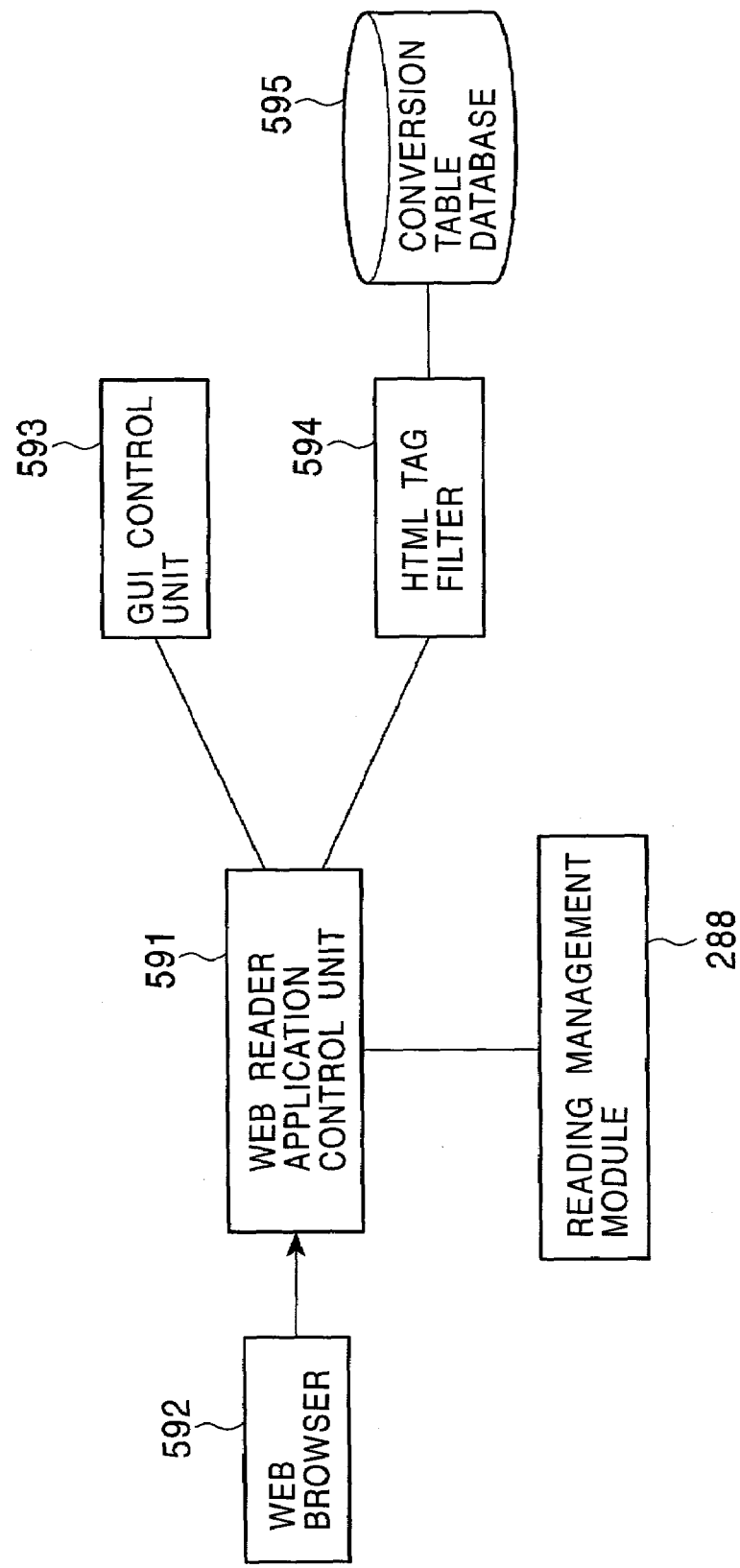
FIG. 43 is a functional block diagram in relation to a Web reader application being activated.

FIG. 43 is a functional block diagram in relation to the Web reader application, which is one of the application programs 67H recorded in the HDD 67 described with reference to FIG. 6, being loaded in the RAM 54 and executed by the CPU 51.

A Web reader application control unit 591, when a Web browser 592 (the Web browser 67G in FIG. 6) is activated, reads data of a Web page (data written in a markup language such as HTML) according to a user operation, and executes various processes based on user settings supplied from a GUI control unit 593.

When the Web reader application control unit 591 executes the processes, the Web browser 592 must be activated (i.e., the Web browser 67G must be loaded in the RAM 54 and executed by the CPU 51).

The GUI control unit 593, under the control of the Web reader application control unit 591, controls display of GUI components such as dialog boxes and display windows for making various settings of a Web reader application to be described later, and generates a signal indicating an operation input executed by the user on the GUI in display, supplying it to the Web reader application control unit 591.

An HTML tag filter 594 filters data written in HTML, supplied from the Web reader application control unit 591, based on a conversion table stored in a conversion table database 595.

FIG. 44 shows an example of data of a Web page (the source of a Web page) written in HTML.

In the source of a Web page, shown in FIG. 44, the portion enclosed between <HTML> and </HTML> corresponds to the entire source written in HTML. The portion enclosed between <HEAD> and </HEAD> (indicated by L in FIG. 44) corresponds to the header of the Web page.

The portion enclosed between <body bgcolor="#BDFFFF" link="#0000FF" vlink="#800080"> and </body>, partially omitted in FIG. 44, corresponds to the body of the Web page. Each portion enclosed between <p align="display position"> and </p> corresponds to a paragraph in the body. All tags are written between < >, and portions not enclosed between < > corresponds to text data portions.

An HTML tag filter 594, for example, divides the body and the header with reference to HTML tags (portions enclosed between < >) based on the conversion table stored in the conversion table database 595, and further divides the body into paragraphs, converting the data into a form that can be processed by the reading management module 288. Other methods of conversion process may be used by modifying the conversion table stored in the conversion table database 595.

Although the description has been made in relation to a Web page written in HTML, markup languages other than HTML may be used by providing corresponding conversion tables in the conversion table database 595.

Figure 45:
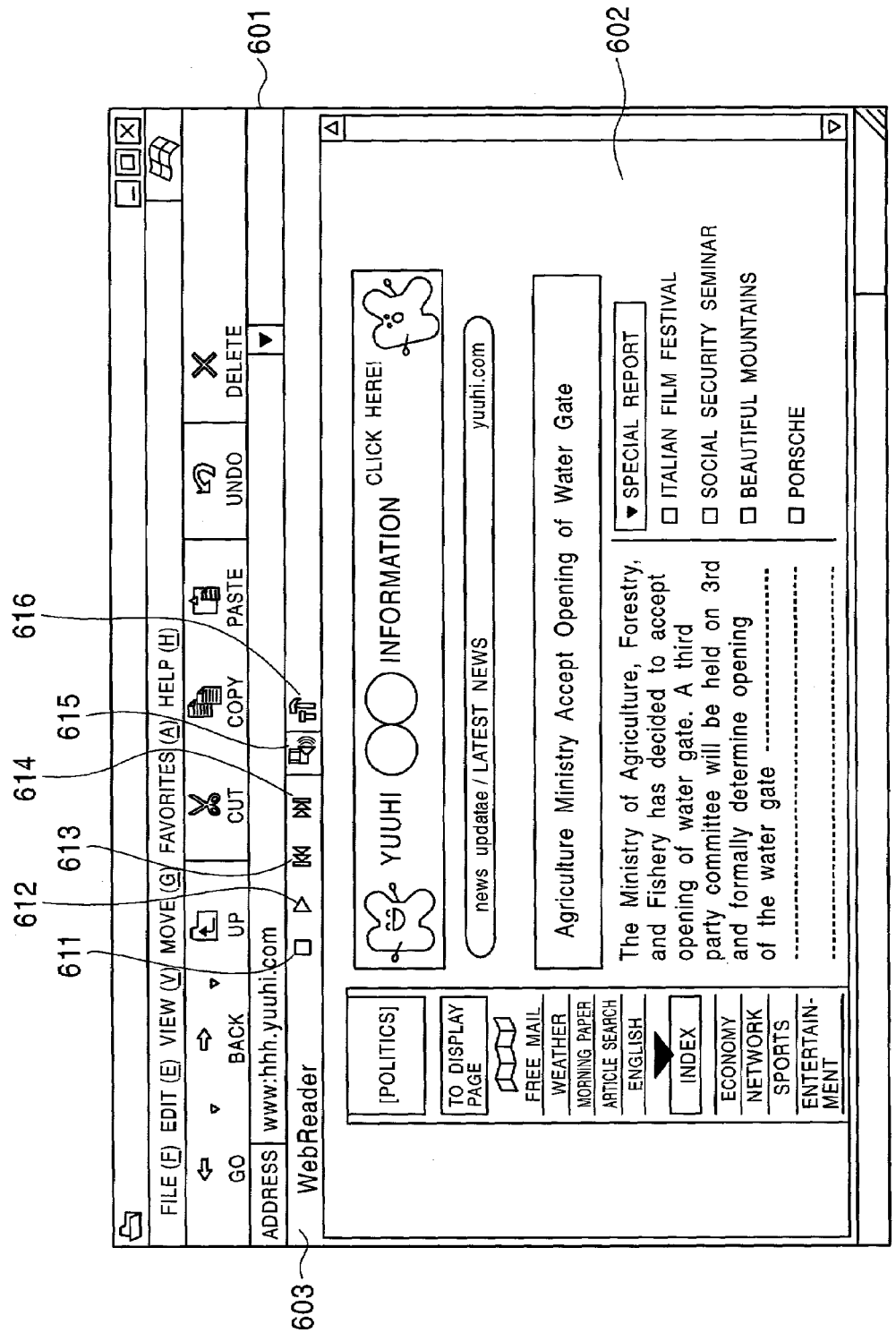
FIG. 45 is an illustration of a Web browser display window in which a Web reader tool bar is displayed.

FIG. 45 shows a display screen in a case where the Web browser 592 is activated.

In a Web browser display window 601, a display area 602 for displaying a Web page, and a Web reader tool bar 603, in addition to an ordinary tool bar of the Web browser, are displayed. When speech reproduction is not being executed, the Web reader tool bar 603 includes a stop button 611, a play button 612, a rewind button 613, a fast-forward button 614, an output to external apparatus button 615, and a setting button 616.

When the user selects the play button 612 with none of text data shown in the display area 602 selected, the text data is sequentially reproduced until all the text data shown in the display area is reproduced or the stop button 611 is selected. When the user selects text data shown in the display area 602 and then selects the play button 612, only the selected text is reproduced as speech data.

When the rewind button 613 or the fast-forward button 614 is selected, the point of reproduction of the speech data is changed. When the output to external apparatus button 615 is selected, the relevant speech data is output to the speech storage apparatus 294, for example, the memory stick 131, for recording thereon.

Figure 46:
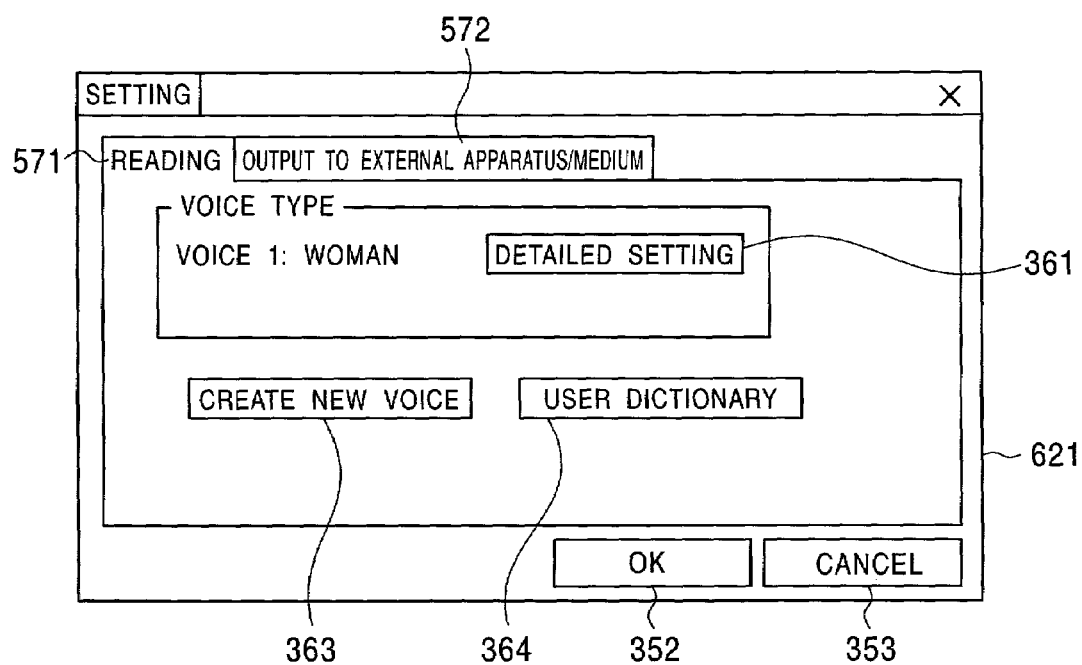
FIG. 46 is an illustration of a setting window that is displayed when a reading tab is selected.

When the setting button 616 is selected, a setting window shown in FIG. 46 is displayed. FIG. 46 shows the setting window 621 in a case where a reading tab 571 is selected. An OK button 352, a cancel button 353, a detailed setting button 361, a create new voice button 363, and a user dictionary button 364 are substantially the same as their counterparts in FIG. 22, and descriptions thereof will be omitted. That is, when text data of a Web page is converted into speech data by a process of the Web reader application, the voice for reading is fixed to a single type of voice that has been set, and voice 2 is not used. The setting window 621 in a case where an output to external apparatus/medium tab 572 is selected is substantially the same as the setting window 561 described with reference to FIG. 41, and description thereof will be omitted.

Next, a process executed by the CPU 151 with the Web reader application loaded in the RAM 54 will be described with reference to a flowchart shown in FIG. 47.

In step S121, the Web reader application control unit 591 determines whether the user has selected the play button 612 or the output to external apparatus button 615, i.e., whether an instruction for speech reproduction of a Web page or output of a Web page to an external apparatus has been input, based on the signal indicating a user operation, input from the GUI control unit 593. If it is determined in step S121 that neither speech reproduction of a Web page nor output of a Web page to an external apparatus has been input, the process of step S121 is repeated until an instruction for one of the operations is detected.

If it is determined that an instruction for speech reproduction of a Web page or output of a Web page to an external apparatus has been input, in step S122, the Web reader application control unit 591 acquires text data with associated HTML tabs from the Web browser 592.

In step S123, the Web reader application control unit 591 outputs the data acquired to the HTML tag filter 594. The HTML tag filter 594 filters the data input thereto, outputting the result to the Web reader application control unit 591. That is, based on the HTML tags of the Web page described with reference to FIG. 44, the HTML tag filter 594, for example, extracts the portion of text enclosed between <title> and </title> from the header data (indicated by L in FIG. 44) as a title of the Web page, and extracts the text portion in the body with reference to tags enclosed in < >, outputting them to the Web reader application control unit 591.

In step S124, the Web reader application control unit 591 creates a chapter based on the result of the filtering input from the HTML tag filter 594. A chapter is a unit of information that forms a single unit of speech data (corresponding to a single file of speech data), and one chapter is created for each Web page.

In step S125, the Web reader application control unit 591 determines a title of the chapter, i.e., information corresponding to a song title or an artist name in music data, based on the result of the filtering. In this example, the artist name is designated as "ONSEI" so that the speech data generated by the Web reader application can be distinguished from other types of information. The title is determined with reference to the title of a corresponding Web page.

In step S126, the Web reader application control unit 591 sets the reading speech set in the setting window 621 described with reference to FIG. 46 as voice 1. In step S127, the Web reader application control unit 591 sets (outputs) the title and the text for reading in the reading management module 288.

In step S128, the Web reader application control unit 591 determines whether the instruction from the user, detected in step S121, is for speech reproduction of a Web page.

If it is determined in step S128 that the instruction from the user is for speech reproduction of a Web page, in step S129, the Web reader application control unit 591 generates and outputs a signal requesting reproduction of corresponding speech data to the reading management module 288.

In step S130, the speech reproduction process described with reference to FIG. 32 is executed, and the process is then exited.

Figure 48:
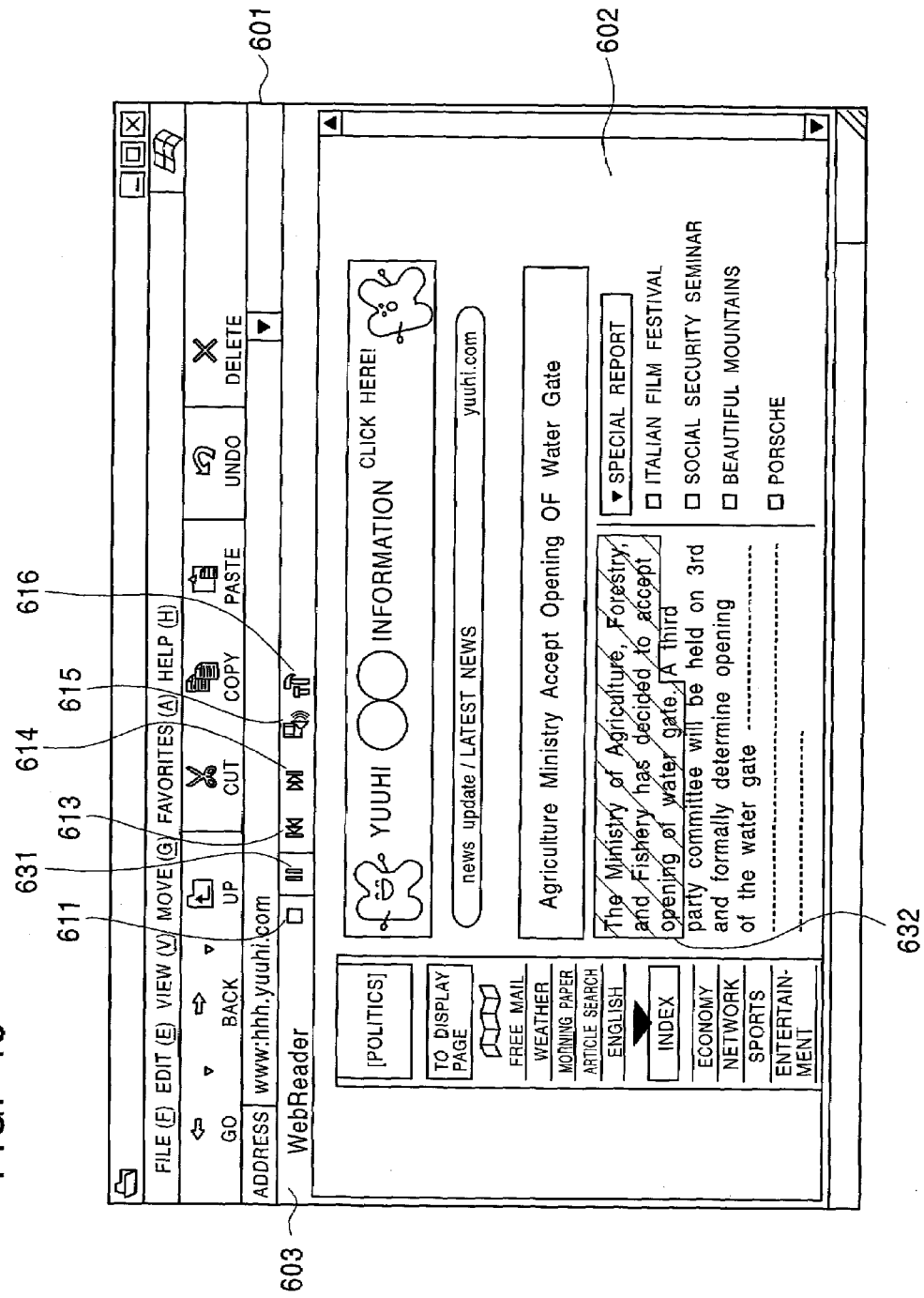
FIG. 48 is an illustration of a Web browser display window during a speech output.

FIG. 48 shows an example of display screen of the Web browser 592 when speech is being reproduced. As opposed to the buttons displayed on the tool bar 603 in the process of the Web browser 592 not under speech reproduction, in FIG. 48, since speech is being reproduced, a suspend button 631 is provided instead of the play button 612, the stop button 611 is active to allow operation thereof, and the output to external apparatus button 616 is inactive to inhibit operation thereof. As indicated as text 632, text that is currently being read is displayed in highlight.

If it is determined in step S128 that the user instruction is not for speech reproduction of a Web page, the user instruction is for output of speech data to an external apparatus. Thus, in step S131, the Web reader application control unit 591 generates and outputs a control signal requesting output of corresponding speech data to an external apparatus to the reading management module 288.

In step S132, the external apparatus output process described with reference to FIG. 35 is executed, and the process is then exited.

By the process described above, similarly to the case of an electronic mail, information written in a Web page can is converted into speech data so that the speech data can be reproduced or output to the speech storage apparatus 294, for example, the memory stick 131.

Figure 49:
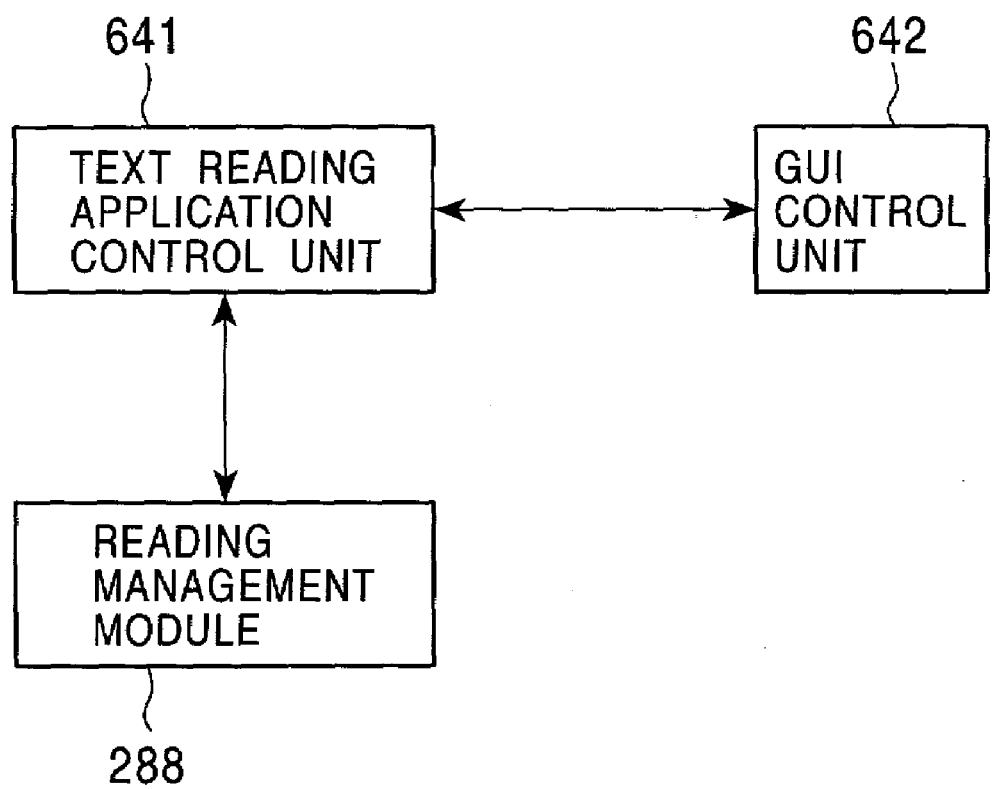
FIG. 49 is a functional block diagram in relation to a text reading application being activated.

FIG. 49 is a functional block diagram in relation to a case where the text reading application, which is one of the application programs 67H recorded in the HDD 67 described with reference to FIG. 6, being loaded in the RAM 54 and executed by the CPU 51 in the personal computer 2.

Figure 50:
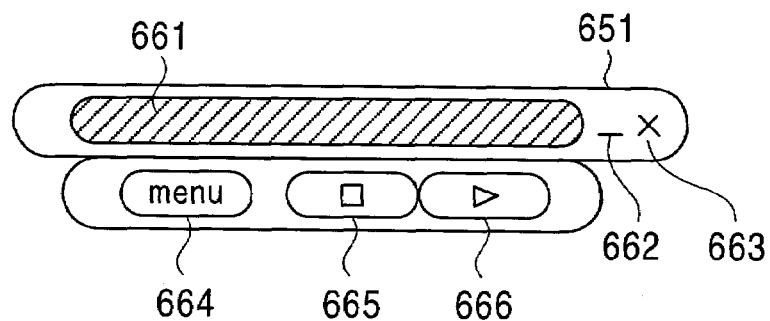
FIG. 50 is an illustration of an operation panel.

A text reading application control unit 641, upon activation of a text reading application, generates a control signal for displaying an operation panel 651 shown in FIG. 50, outputting it to a GUI control unit 642. Furthermore, the text reading application control unit 641 executes processes such as making settings and supplying input text data to the reading management module 288 based on a signal indicating a user operation, input from the GUI control unit 642.

FIG. 50 shows the operation panel 651 that is displayed when the text reading application is activated.

The operation panel 651 includes a text box 661, a minimize button 662, a close button 663, a menu button 664, a stop button 665, and a play button 666.

The text box 661 is used to input text data for outputting speech. The text box 661 allows input of text by the user using the keyboard 24, input of a file using the touch panel 25 or a mouse not shown, and input of data corresponding to selected text by cut and paste (drag and drop) operation.

The GUI control unit 642 outputs text data input to the text box 661 to the text reading application control unit 641.

The minimize button is used to minimize display of the operation panel 651 without exiting the text reading application, displaying, for example, an icon on a tool bar in the lower portion of the display screen. The close button 663 is used to exit the text reading application and to exit display of the operation panel 651.

Figure 51:
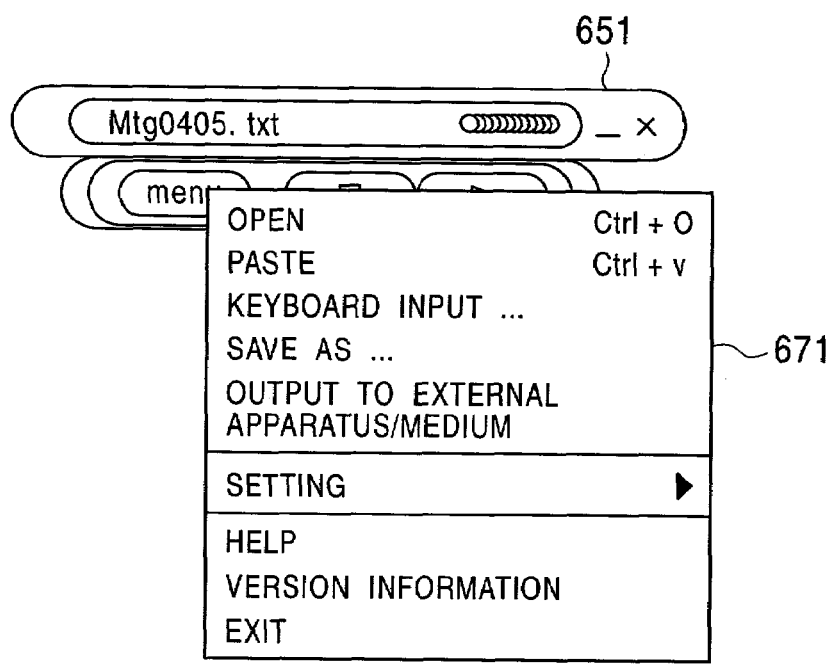
FIG. 51 is an illustration of a menu.

When the menu button 666 is selected, a command box 671 shown in FIG. 51 is displayed.

The user is allowed to execute various operations by selecting various commands displayed in the command box 671. For example, if the user wishes to output speech data corresponding to input text data to an external apparatus, the user selects the "output to external apparatus/medium" item to execute a process for outputting corresponding speech data, for example, to the memory stick 131.

When "setting" item is selected from the command box 671, a dialog box 621 similar to the one shown in FIG. 46 is displayed. In the dialog box 621, in a display screen that is displayed when an output to external apparatus/medium tab 572 is selected, a check box 581 may be displayed similarly to FIG. 41, and the check box 581 need not be displayed, similarly to FIG. 27. For example, if the check box 581 is displayed and selected, an output to external apparatus/medium button is additionally displayed next to a play button 666 in FIG. 50 so that an instruction for output to an external apparatus can be directly input.

Next, a process executed by the CPU 51 with the text reading application loaded in the RAM 54 will be described with reference to a flowchart shown in FIG. 52.

In step S141, the text reading application control unit 641 determines whether input of text data has been received from the GUI control unit 642, for example, by text being input (drag and drop operation) or entered by the user in the text box 661. If it is determined in step S141 that input of text data has not been received, the process of step S141 is repeated until input of text data is detected.

If it is determined in step S141 that input of text data has been received, in step S142, the text reading application control unit 641 sets voice 1 that has been set as the voice for reading.

In step S143, the text reading application control unit 641 sets (outputs) the text for reading that has been input to the text box 661 in the reading management module 288.

In step S144, the text reading application control unit 641 generates a control signal requesting reproduction of speech data corresponding to the input text data, outputting it to the reading management module 288.

In step S145, the speech reproduction process described with reference to FIG. 34 is executed.

In step S146, the text reading application control unit 641 determines whether an operation input for "output to external apparatus/medium" has been received from the user, based on the signal indicating a user operation, input from the GUI control unit 462.

If it is determined in step S146 that an operation input for "output to external apparatus/medium" has been received, in step S147, the text reading application control unit 641 generates a control signal for requesting output of speech data corresponding to the input text data to an external apparatus or external recording medium, outputting it to the reading management module 288.

In step S148, the external apparatus output process described with reference to FIG. 35 is executed, and the process is then exited.

If it is determined in step S146 that an operation input for "output to external apparatus/medium" has not been received, the process is exited.

By the process described above, the user is allowed to convert text data into speech data as desired so that the speech can be reproduced or output to the external speech storage apparatus 294.

As described hereinabove, according to the present invention text data in a plurality of application programs is allowed to be converted in to speech data by speech synthesis by the same mechanism (the functionality of the reading management module 288 herein) so that the speech can be reproduced or output to the outside. Although the description has been made in relation to four application programs as examples, it is to be understood that the present invention may be applied generally to application programs dealing with text data.

Furthermore, by providing GUI that is easier to understand for the user, setting process by the user is facilitated, considerably improving entertaining factors as well as convenience of application programs.

The present invention may be implemented by the PDA 4 or the camera-equipped digital cellular phone 5 without limitation to the personal computer 2. In that case, the CPU 171 of the PDA 4 or the main control unit 251 of the camera-equipped digital cellular phone 5 executes a process similar to the process described above (a process executed by the mail watcher application, the Web reader application, the mail reader application, or the text reading application).

Furthermore, the present invention may be applied to an apparatus that sends and receives electronic mails, an apparatus that allows browsing of Web pages, and generally to apparatuses that are at least capable of processing text data and outputting speech, such as a desktop personal computer, a PHS (Personal Handyphone System) terminal apparatus, a digital cellular phone without imaging capability, and a car navigation system.

The series of processes described above may be executed in software. A program constituting the software is installed, for example, from a recording medium on a computer embedded in a dedicated hardware, or on a general-purpose personal computer that is capable of executed various functions in cooperation with various programs installed.

Figure 10:
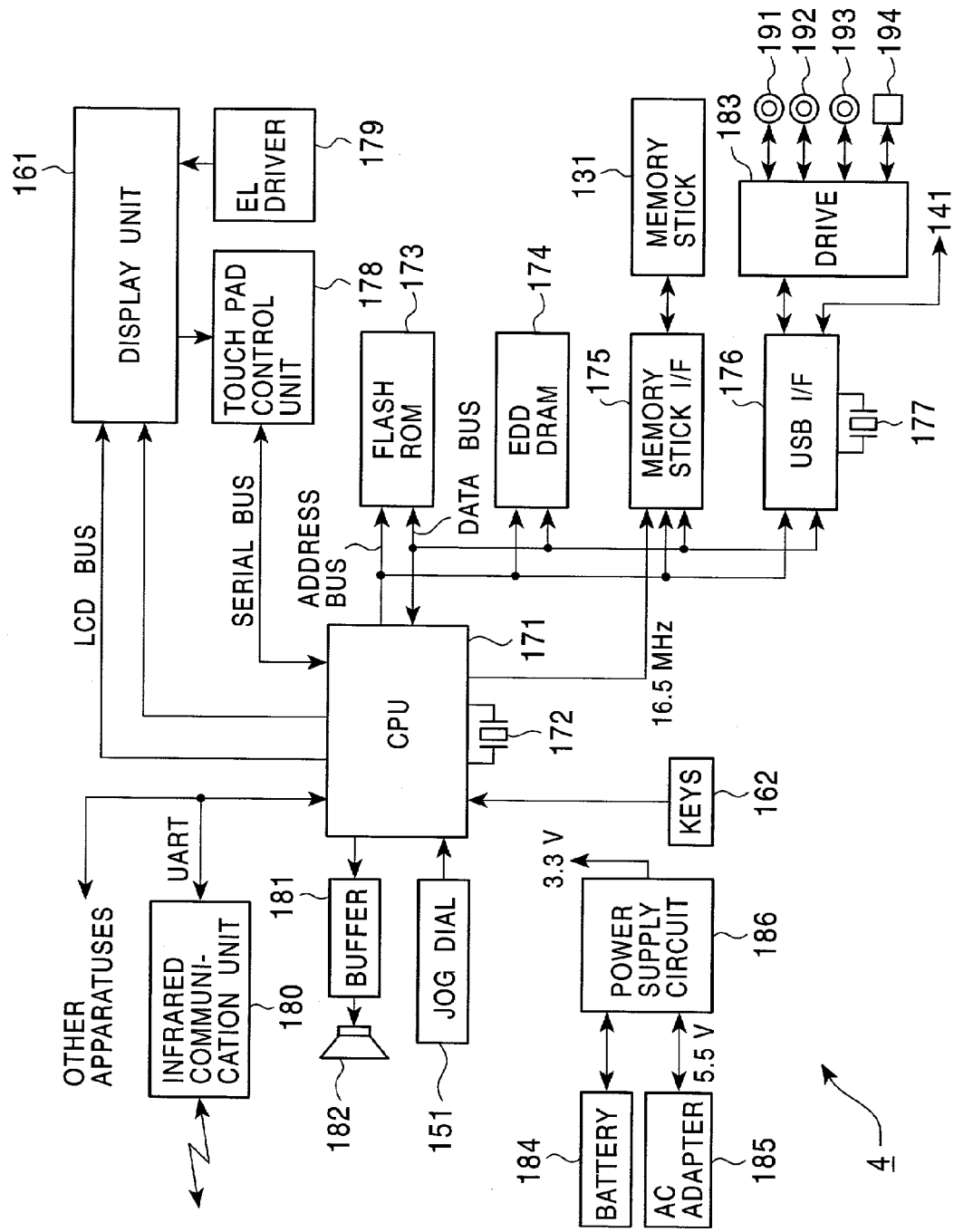
FIG. 10 is a block diagram showing the internal construction of the PDA.

The recording medium may be a package media that is distributed separately from the computer to provide a program to a user, for example, a magnetic disk 121 or 191 (including a flexible disk), an optical disk 122 or 192 including a CD-ROM.(Compact Disk Read-Only Memory)) and a DVD (Digital Versatile Disk)), a magneto optical disk 123 or 193 (including an MD (Mini Disc) (trademark)), or a semiconductor memory 124 or 194, as shown in FIG. 6 or FIG. 10.

Furthermore, steps of the program recorded on the recording medium need not necessarily be executed sequentially in the described order, and may be executed in parallel or individually.

In this specification, a system refers to the entire construction constituted of a plurality of apparatuses.

What is claimed is:

1. An information processing apparatus comprising:
   text input means for receiving electronic mail text data;
   means for executing speech synthesis to generate speech data corresponding to said electronic mail text data;
   means for generating title information corresponding to the electronic mail text data as additional information of said speech data from header information of said electronic mail text data;
   means for creating a speech data audio file from said speech data wherein said additional information is used to title the audio file;
   recording control means for controlling recording of various information;
   obtaining means for obtaining additional information of the various information, recording of which is controlled by said recording control means;
   extraction means for extracting information that has a predetermined character string as additional information from the additional information of the various information obtained by said obtaining means; and
   record deletion means for deleting information, recording of which is controlled by said recording control means, based on a result of the extraction by said extraction means.

2. An information processing apparatus according to claim 1, further comprising:
   display control means for controlling a display screen that aids a user to select a predetermined item in the header information of the electronic mail so that the item will be set as the additional information; and
   input means for receiving input of the item selected by the user with reference to the display screen controlled by said display control means;
   wherein said setting means sets the item selected by the user, input via said input means, as the additional information of the speech data.

3. An information processing apparatus according to claim 2, wherein said input means receives input of a plurality of items selected by the user, and said setting means generates single title information from the plurality of items selected by the user, input via said input means, setting the title information as the additional information of the speech data.

4. An information processing apparatus according to claim 2, wherein the item includes information regarding a sender of the electronic mail.

5. An information processing apparatus according to claim 2, wherein the item includes a subject of the electronic mail.

6. An information processing apparatus according to claim 2, wherein the item includes information regarding date and time of transmission of the electronic mail.

7. An information processing apparatus according to claim 1, further comprising:
   information input means for receiving input of information written in a markup language;
   parsing means for parsing tag information of the information written in the markup language, input via said information input means; and extraction means for extracting text data from the information written in the markup language based on the result of the parsing by said parsing means;

wherein said text input means receives input of the text data extracted by said extraction means, and said setting means sets the additional information of the speech data based on the result of the parsing by said parsing means.

8. An information processing apparatus according to claim 7, wherein the markup language is Hypertext Markup Language (HTML).

9. An information processing apparatus according to claim 7, wherein the information written in the markup language, input via said information input means, includes the electronic mail text data written in a markup language format.

10. An information processing apparatus according to claim 7, wherein the information written in the markup language, input via said information input means, includes data of a Web page, and said setting means sets a title of the Web page as the additional information of the speech data based on the result of the parsing by said parsing means.

11. An information processing apparatus according to claim 1, wherein said means for generating title information uses a name of an application program as the additional information.

12. An information processing method comprising:
receiving input of an electronic mail text data;
executing speech synthesis to generate speech data corresponding to said electronic mail text data;
generating title information corresponding to the electronic mail text data as additional information of said speech data from header information of said electronic mail text data;
creating a speech data audio file from said speech data wherein said additional information is used to title the audio file;
controlling recording of various information;
obtaining additional information of the various information, recording of which is controlled by said controlling;
extracting information that has a predetermined character string as additional information from the additional information of the various information obtained by said obtaining; and
deleting information, recording of which is controlled by said controlling, based on a result of the extracting.

13. A computer readable medium including computer program instructions for causing a computer to implement a method of speech synthesis, comprising:
receiving input of an electronic mail text data;
executing speech synthesis to generate speech data corresponding to said electronic mail text data;
generating title information corresponding to the electronic mail text data as additional information of said speech data from header information of said electronic mail text data;
creating a speech data audio file from said speech data wherein said additional information is used to title the audio file;
controlling recording of various information;
obtaining additional information of the various information, recording of which is controlled by said controlling;
extracting information that has a predetermined character string as additional information from the additional information of the various information obtained by said obtaining; and
deleting information, recording of which is controlled by said controlling, based on a result of the extracting.

14. An information processing apparatus comprising:
a text input unit configured to receive electronic mail text data;
a speech generation unit configured to execute speech synthesis to generate speech data corresponding to said electronic mail text data;
a unit configured generate title information corresponding to the electronic mail text data;
a unit configured to create a speech data audio file from said speech data wherein said additional information is used to title the audio file;
a recording controller configured to control recording of various information;
an obtaining unit configured to obtain additional information of the various information, recording of which is controlled by said recording controller;
an extraction unit configured to extract information that has a predetermined character string as additional information from the additional information of the various information obtained by said obtaining unit; and
a record deletion unit configured to delete information, recording of which is controlled by said recording controller, based on a result of the extraction by said extraction unit.

* * * * *